United States Patent [19]
Itoi

[11] Patent Number: 5,590,101
[45] Date of Patent: Dec. 31, 1996

[54] TRACK JUMP CONTROLLER FOR OPTICAL DISK RECORDING

[75] Inventor: Satoshi Itoi, Tokyo, Japan

[73] Assignee: NEC Corporation, Japan

[21] Appl. No.: 455,980

[22] Filed: May 31, 1995

[30] Foreign Application Priority Data

| May 31, 1994 | [JP] | Japan | 6-117779 |
| Jul. 27, 1994 | [JP] | Japan | 6-175613 |
| Oct. 24, 1994 | [JP] | Japan | 6-257816 |

[51] Int. Cl.$^6$ .................................................. G11B 17/22
[52] U.S. Cl. .......................................... 369/32; 369/44.28
[58] Field of Search .................................. 369/32, 48, 47, 369/54, 58, 44.28, 44.29, 44.27, 44.35, 44.31

[56] References Cited

U.S. PATENT DOCUMENTS 4,873,679  10/1989  Murai et al. ................................ 369/32

FOREIGN PATENT DOCUMENTS 63-161532  7/1988  Japan .

*Primary Examiner*—Georgia Y. Epps
*Assistant Examiner*—Tan Dinh
*Attorney, Agent, or Firm*—Ostrolenk, Faber, Gerb & Soffen, LLP

[57] ABSTRACT

In an optical disk apparatus, an optical disk has clock blocks and rotates at a constant rotational speed. An optical head optically records data on the disk. Data to be recorded is written in a recording buffer memory at a constant bit rate. A recording control section reads out the data from the buffer memory while changing the bit rate for each clock block, and records the data on the disk with an almost constant recording wavelength. A pause track calculator sets a track next to a track defined by $R<Nt$ as a pause track for performing timing adjustment by a pause track operation, with the number of data blocks per track being Nt and R being a constant determined by the capacity of the buffer memory. The pause track calculator notifies the control section of a pause track timing upon setting a track next to a track defined by $R<Nt$ as a pause track.

41 Claims, 34 Drawing Sheets

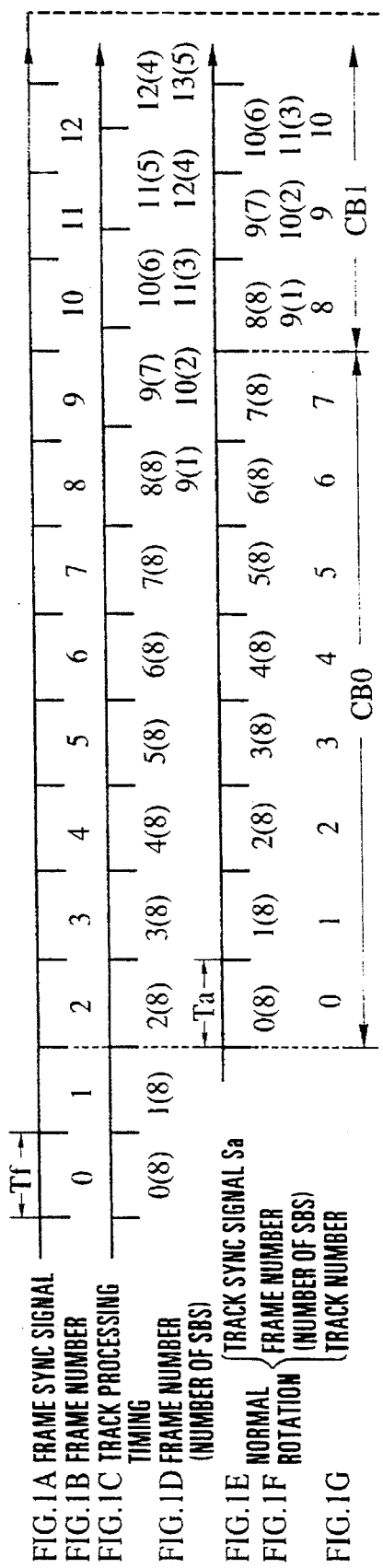
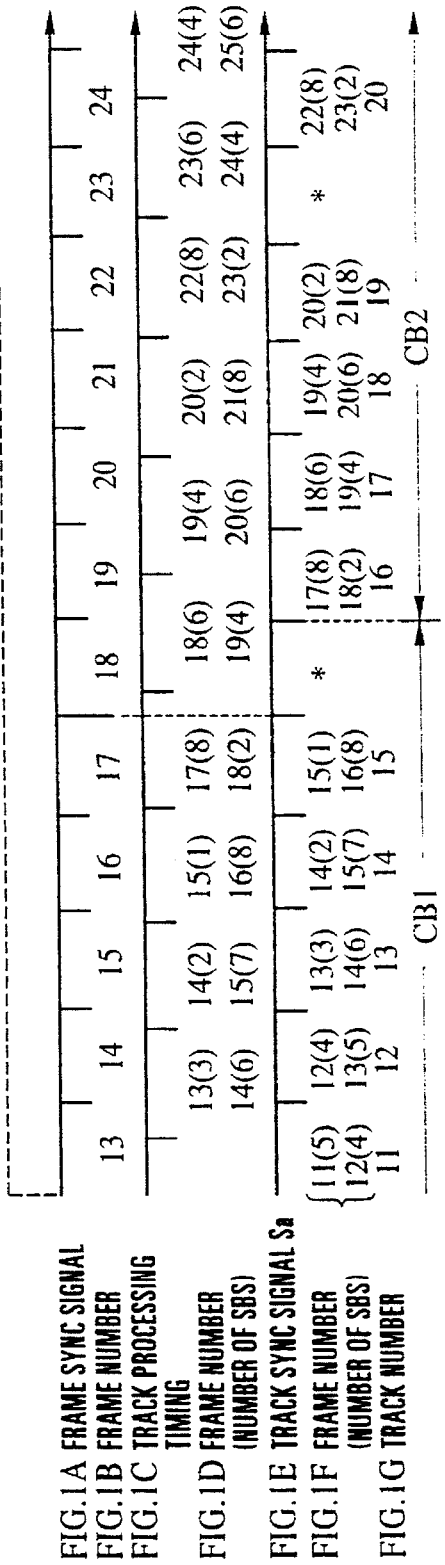

FIG.1A FRAME SYNC SIGNAL
FIG.1B FRAME NUMBER
FIG.1C TRACK PROCESSING TIMING
FIG.1D FRAME NUMBER (NUMBER OF SBS)
FIG.1E TRACK SYNC SIGNAL Sa
FIG.1F NORMAL ROTATION {FRAME NUMBER (NUMBER OF SBS) / TRACK NUMBER}
FIG.1G

FIG.1A FRAME SYNC SIGNAL
FIG.1B FRAME NUMBER
FIG.1C TRACK PROCESSING TIMING
FIG.1D FRAME NUMBER (NUMBER OF SBS)
FIG.1E TRACK SYNC SIGNAL Sa
FIG.1F FRAME NUMBER (NUMBER OF SBS)
FIG.1G TRACK NUMBER

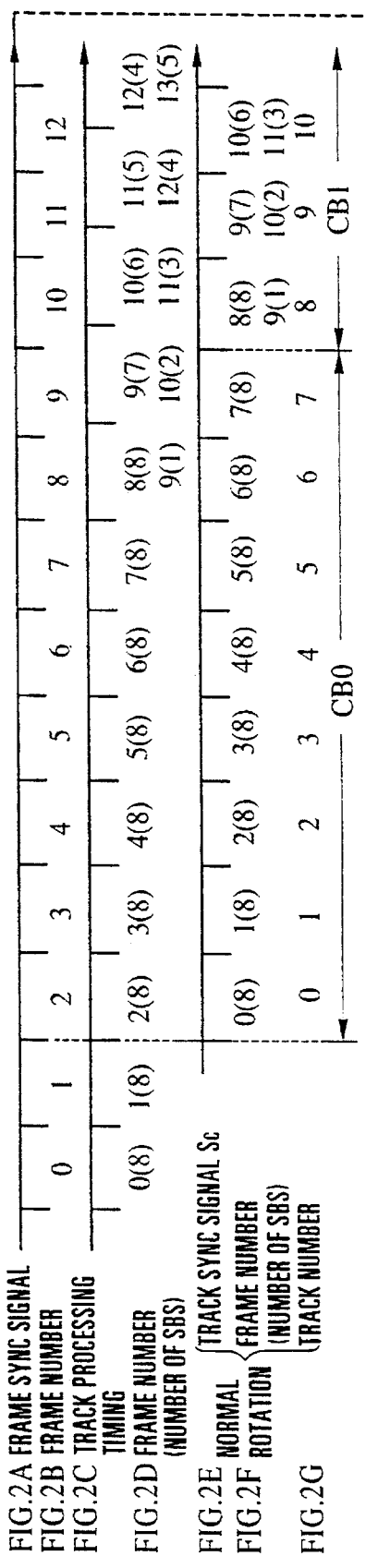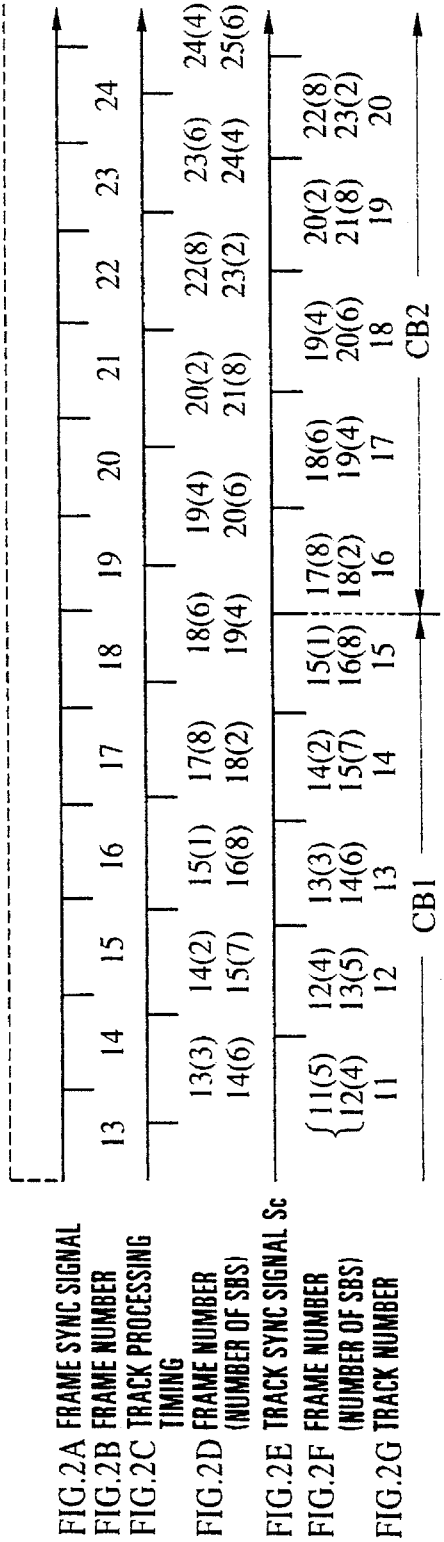

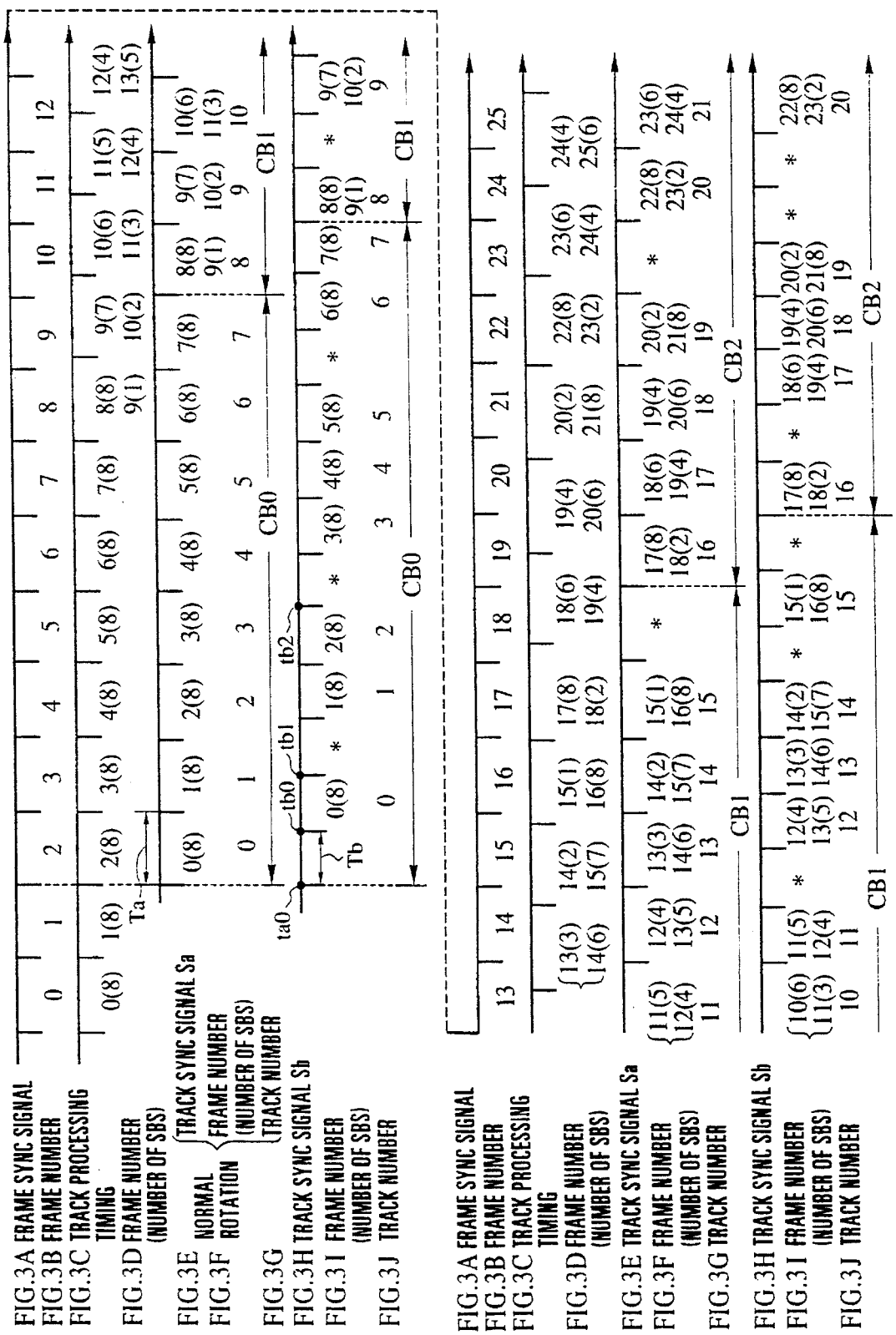

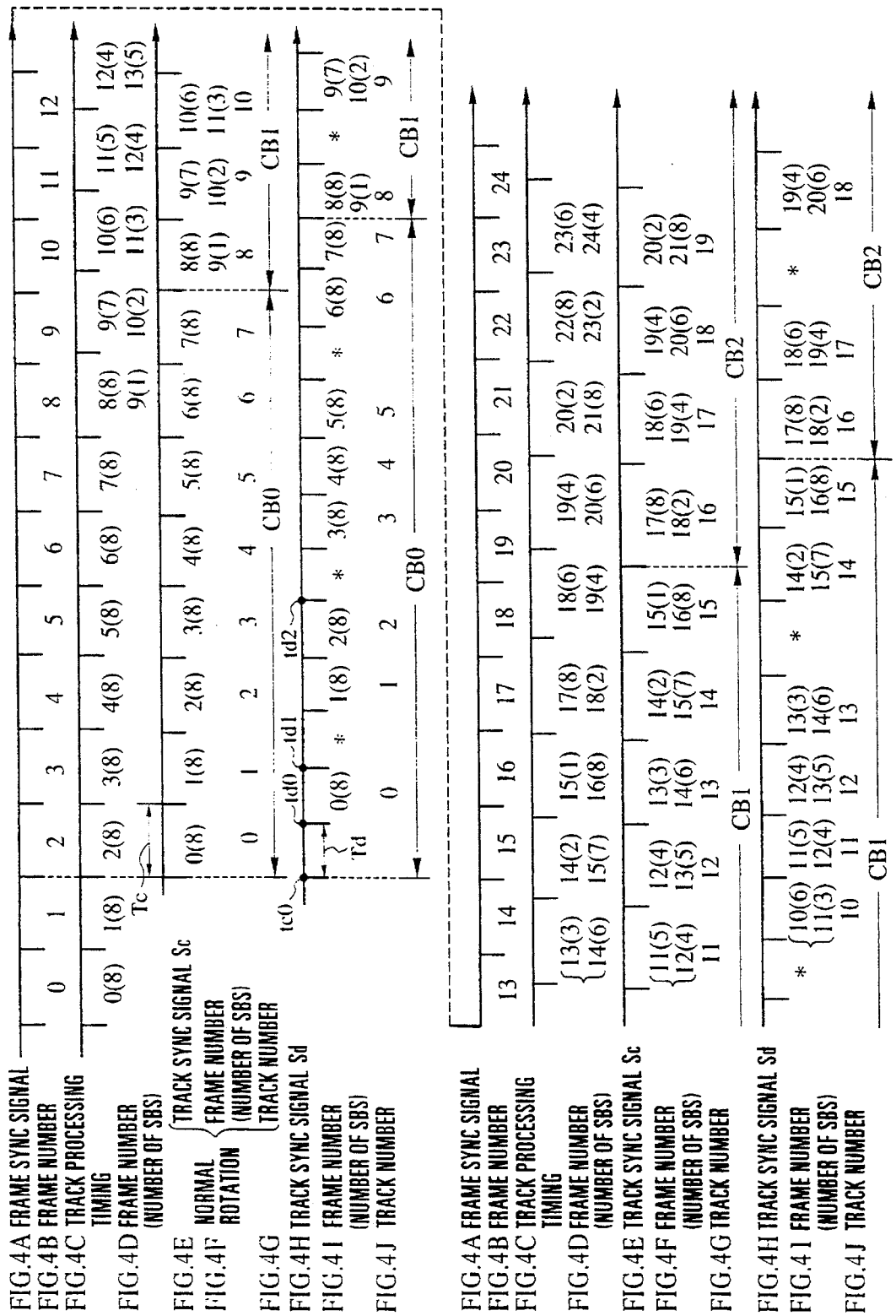

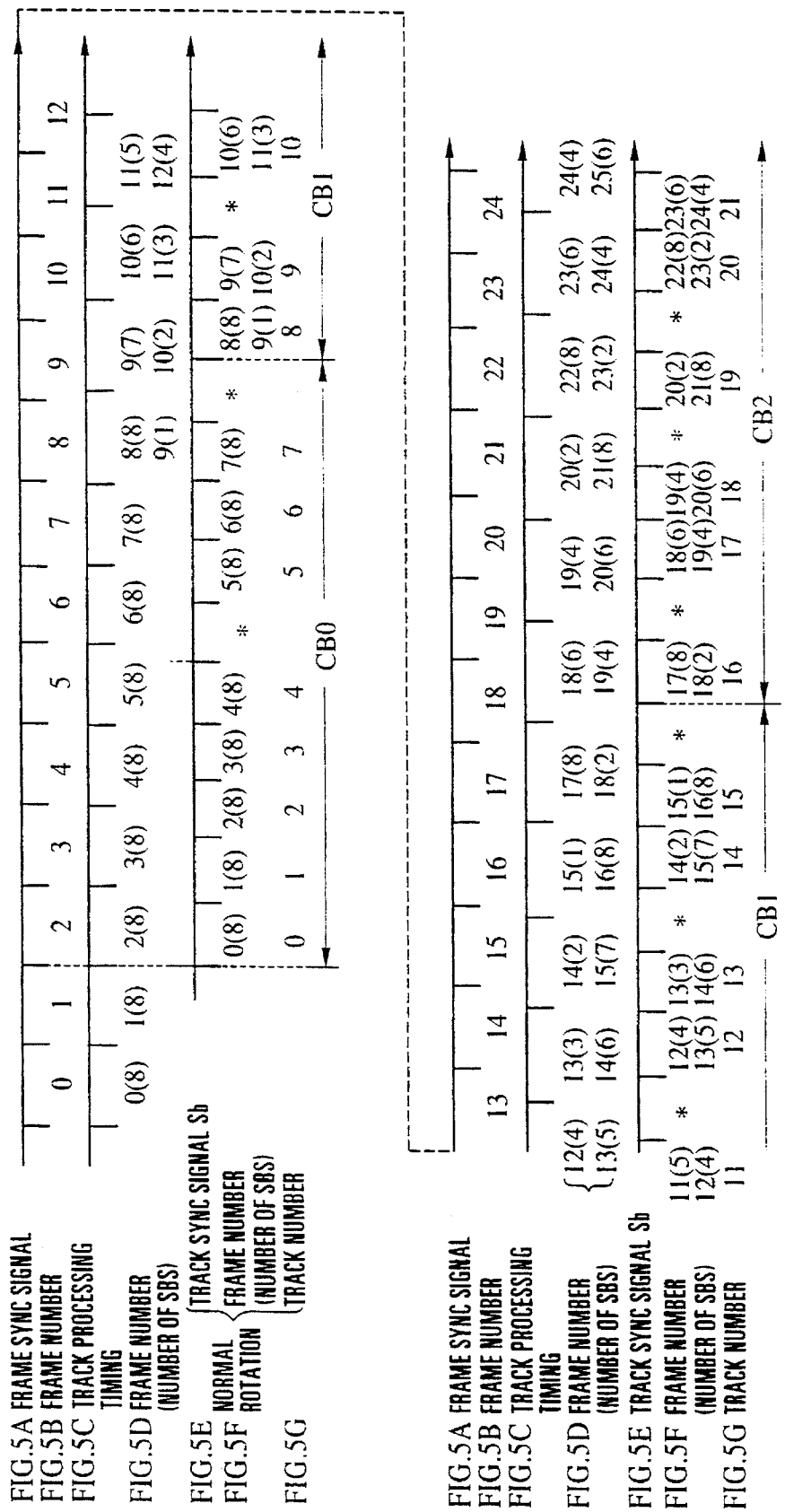

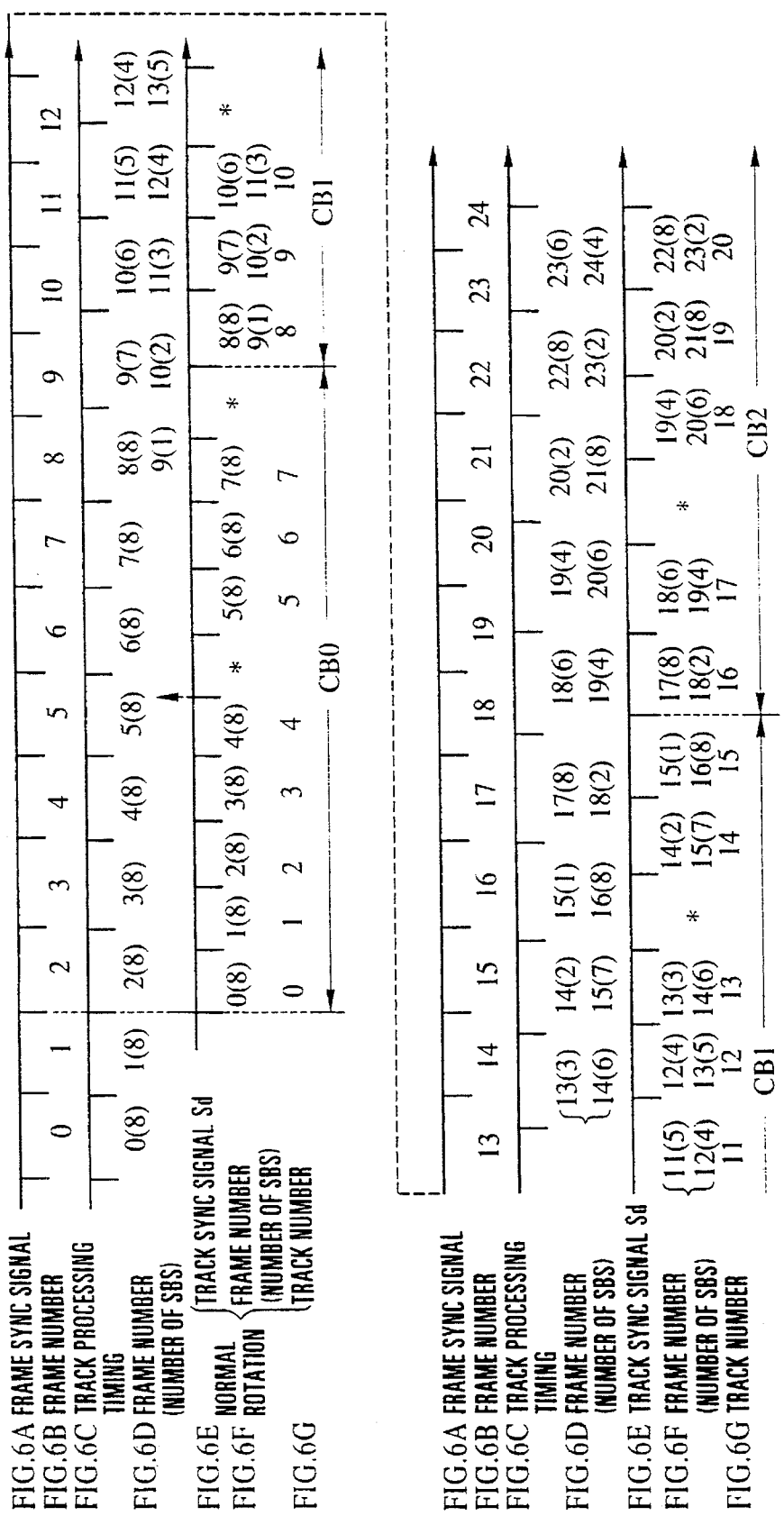

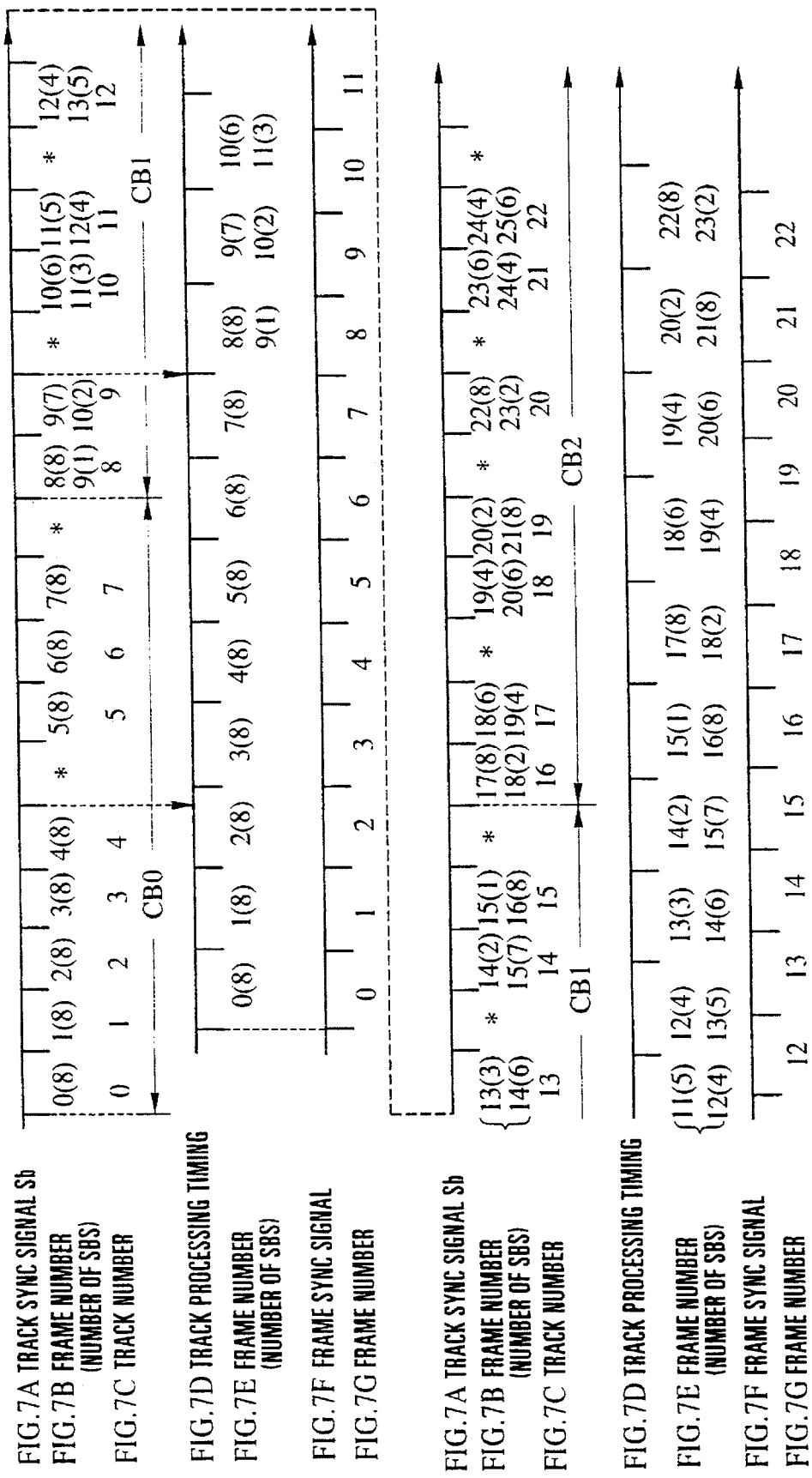

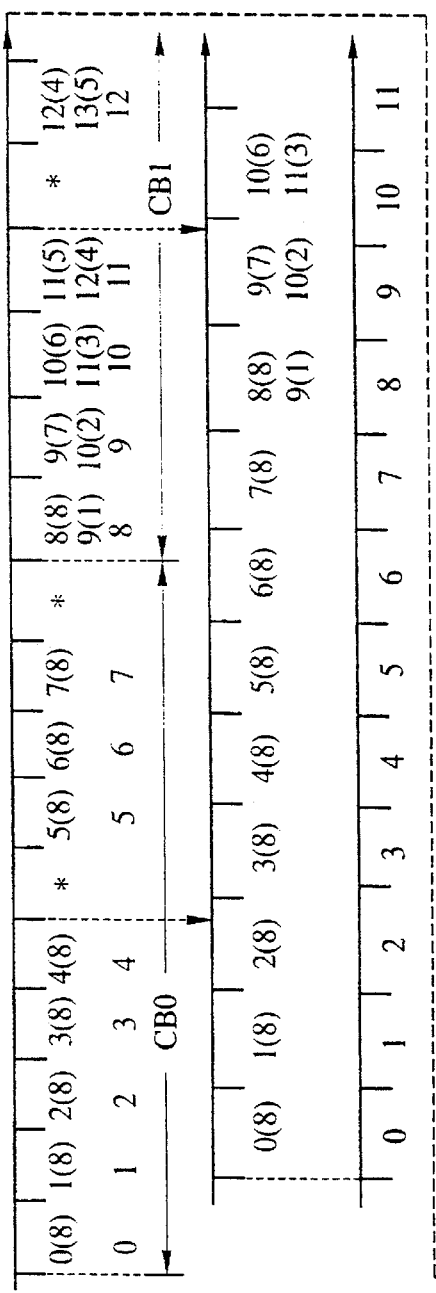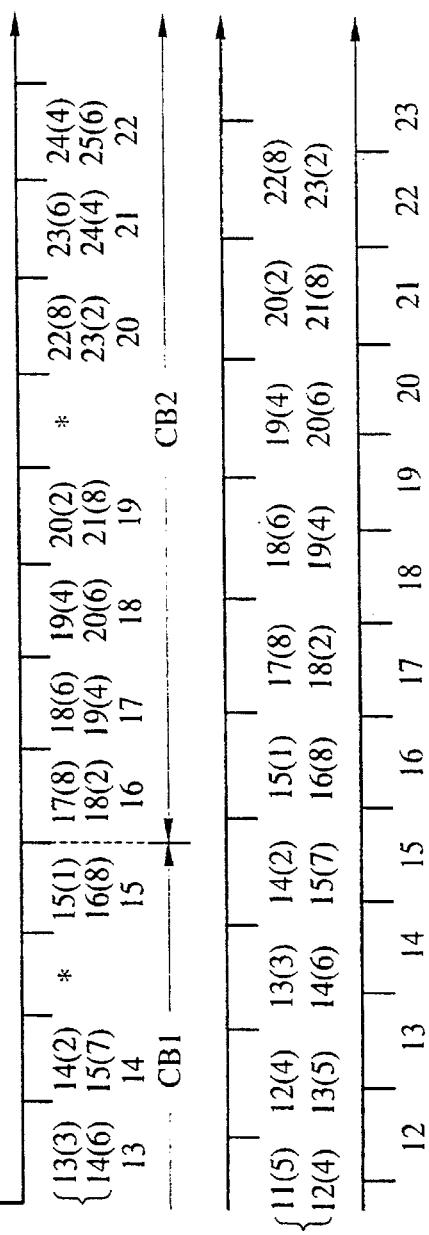

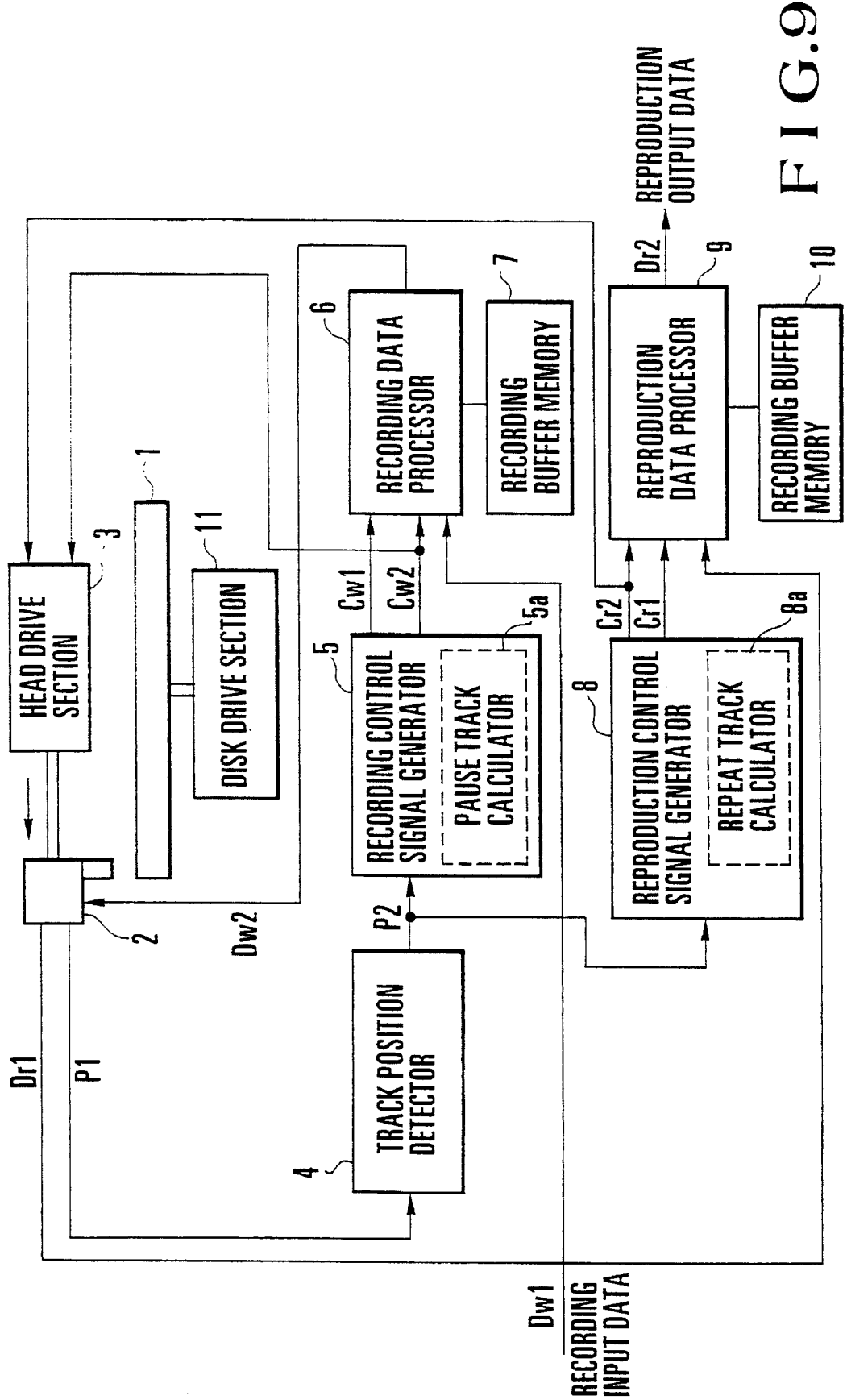

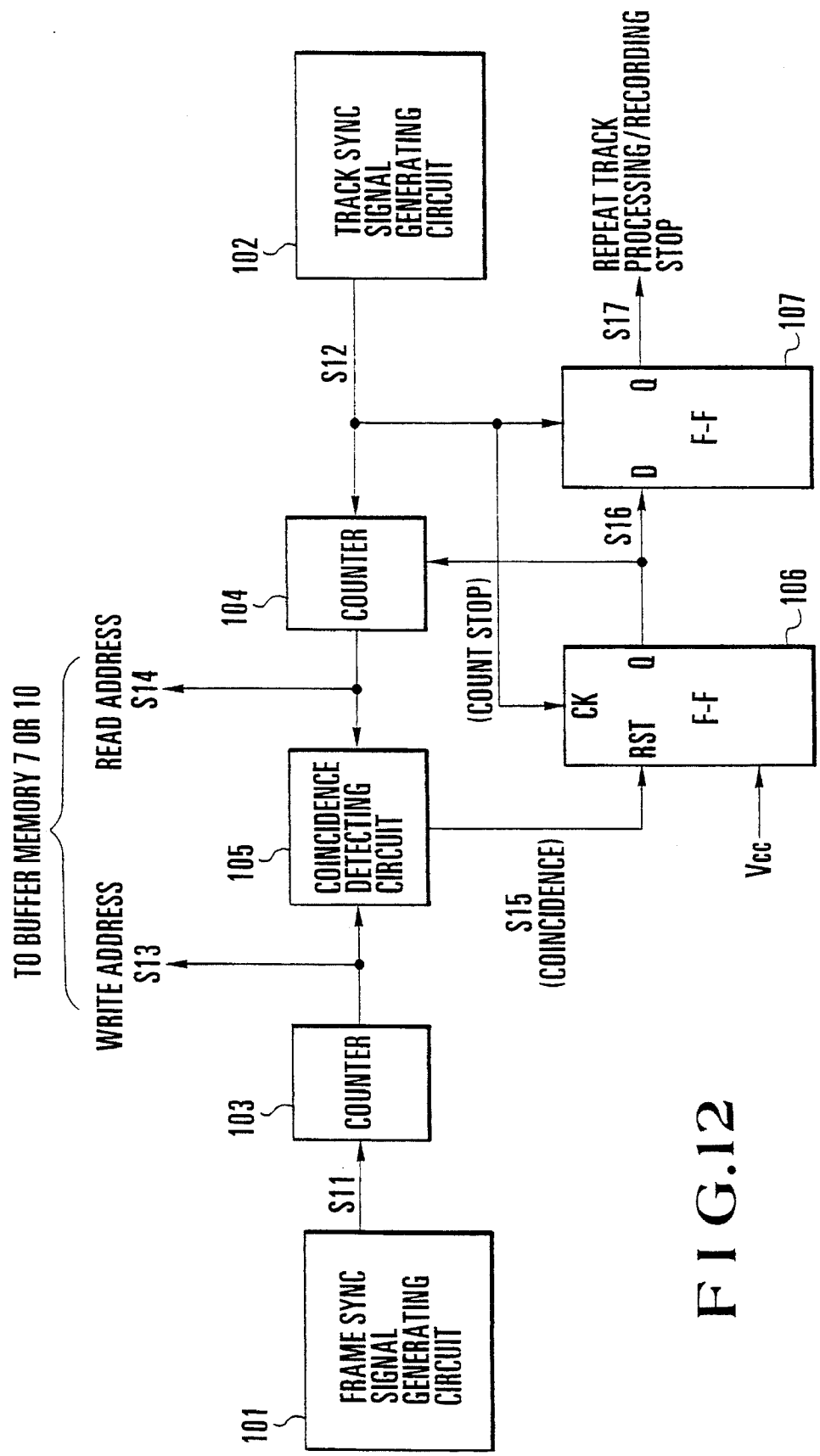
F I G. 12

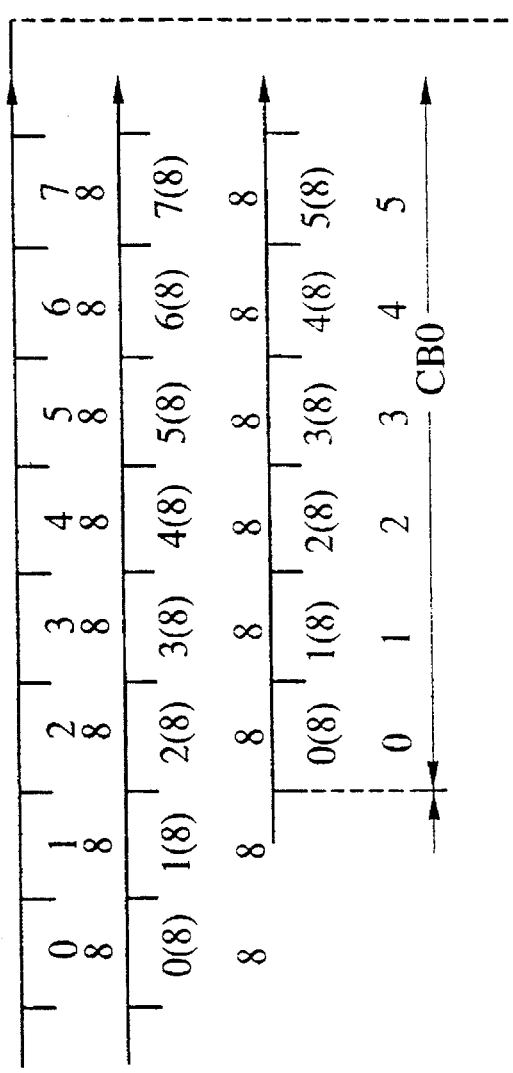
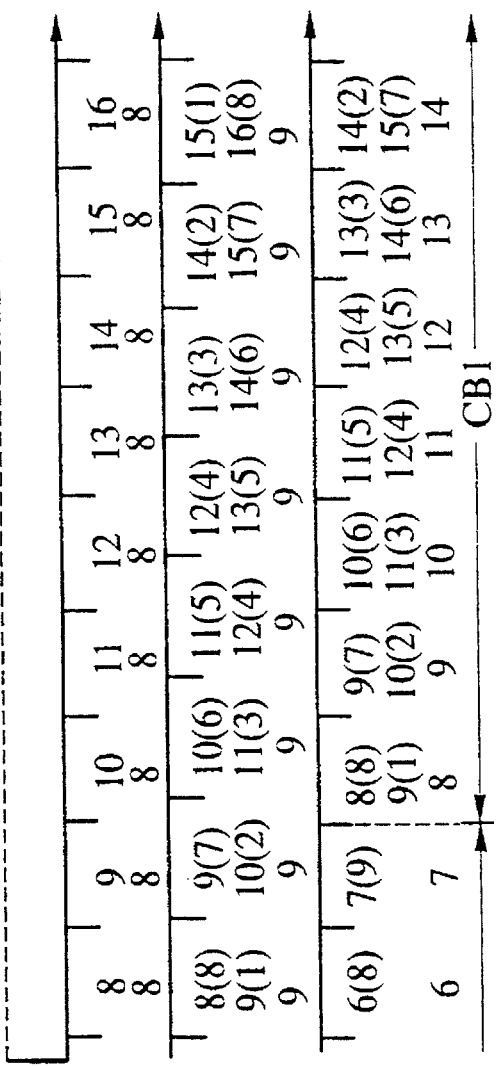
FIG.13A FIELD SYNC SIGNAL
FIG.13B FIELD NUMBER
FIG.13C NUMBER OF SBS
FIG.13D TRACK PROCESSING TIMING
FIG.13E {FIELD No. 1 / FIELD No. 2}
FIG.13F NUMBER OF SBS
FIG.13G TRACK SYNC SIGNAL
FIG.13H {WRITE FIELD No. 1 / WRITE FIELD No. 2}
FIG.13I TRACK NUMBER
FIG.13J CLOCK BLOCK

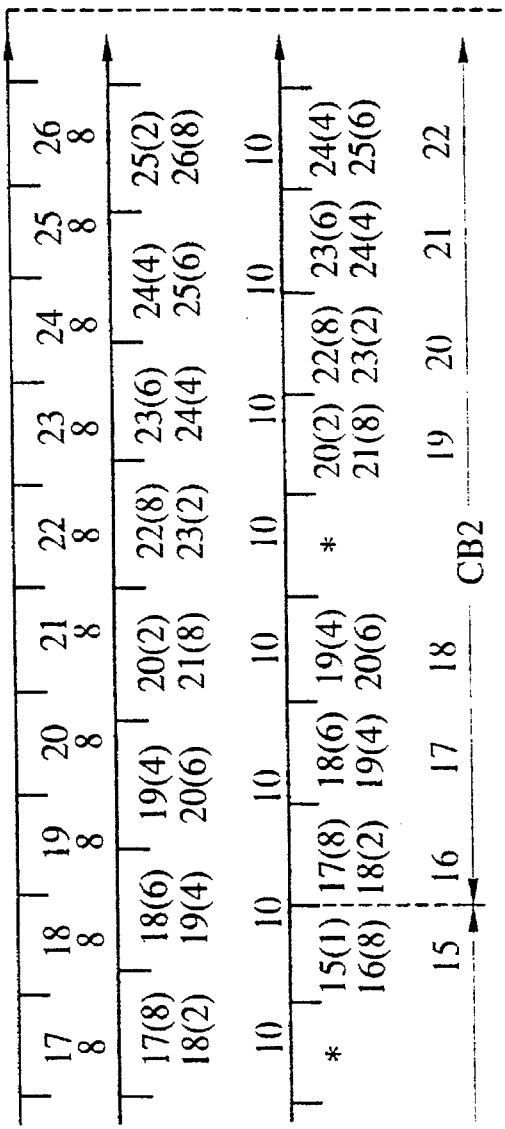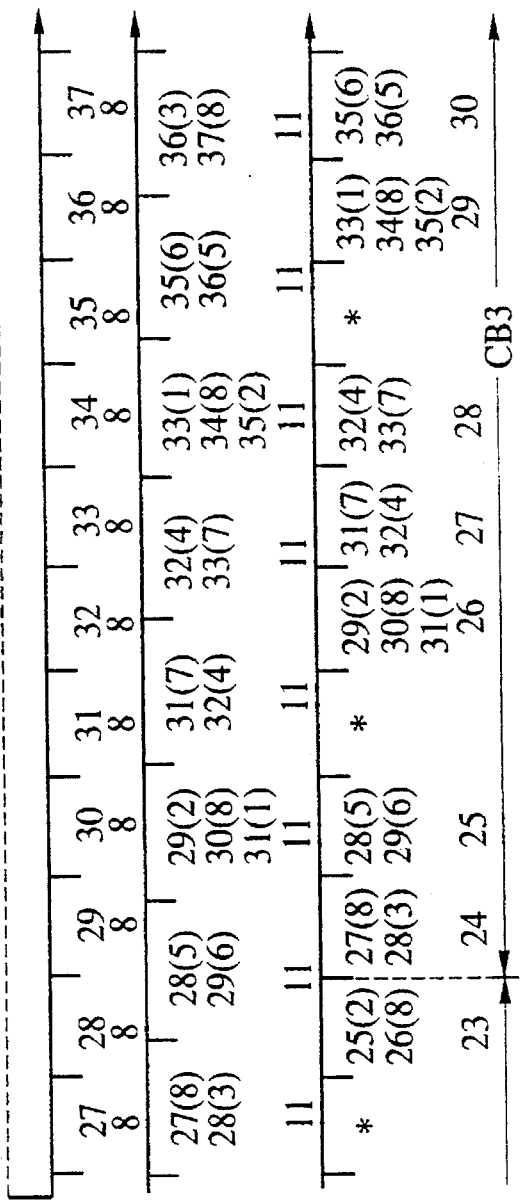
FIG. 14A FIELD SYNC SIGNAL
FIG. 14B FIELD NUMBER
FIG. 14C NUMBER OF SBS
FIG. 14D TRACK PROCESSING TIMING
FIG. 14E {FIELD No. 1
FIELD No. 2
FIELD No. 3
FIG. 14F NUMBER OF SBS
FIG. 14G TRACK SYNC SIGNAL
FIG. 14H {WRITE FIELD No. 1
WRITE FIELD No. 2
WRITE FIELD No. 3
FIG. 14I TRACK NUMBER
FIG. 14J CLOCK BLOCK FIG. 15A FIELD SYNC SIGNAL
FIG. 15B FIELD NUMBER
FIG. 15C NUMBER OF SBS
FIG. 15D TRACK PROCESSING TIMING
FIG. 15E { FIELD No. 1
         FIELD No. 2
         FIELD No. 3 }
FIG. 15F NUMBER OF SBS
FIG. 15G TRACK SYNC SIGNAL
FIG. 15H { WRITE FIELD No. 1
         WRITE FIELD No. 2
         WRITE FIELD No. 3 }
FIG. 15I TRACK NUMBER
FIG. 15J CLOCK BLOCK FIG. 15A FIELD SYNC SIGNAL
FIG. 15B FIELD NUMBER
FIG. 15C NUMBER OF SBS
FIG. 15D TRACK PROCESSING TIMING
FIG. 15E { FIELD No. 1
         FIELD No. 2
         FIELD No. 3 }
FIG. 15F NUMBER OF SBS
FIG. 15G TRACK SYNC SIGNAL
FIG. 15H { WRITE FIELD No. 1
         WRITE FIELD No. 2
         WRITE FIELD No. 3 }
FIG. 15I TRACK NUMBER
FIG. 15J CLOCK BLOCK

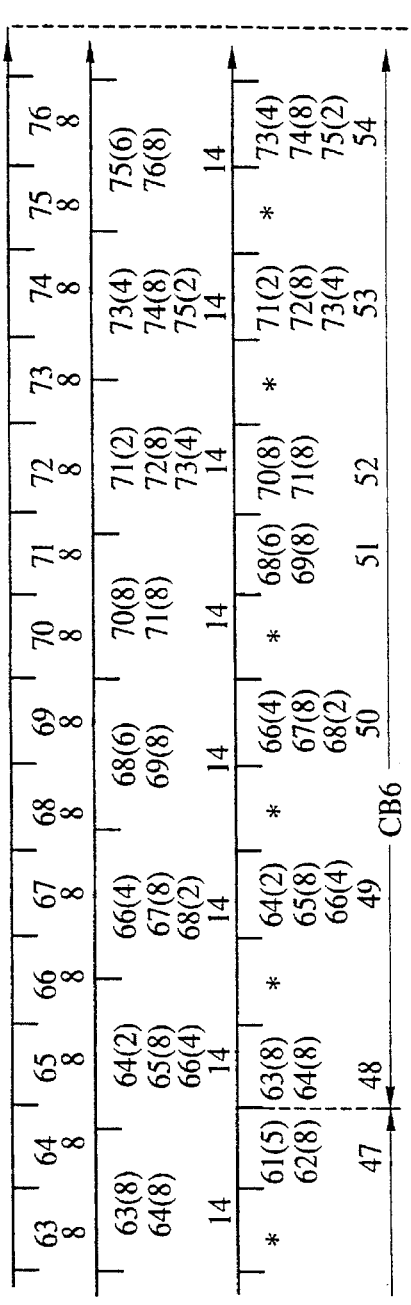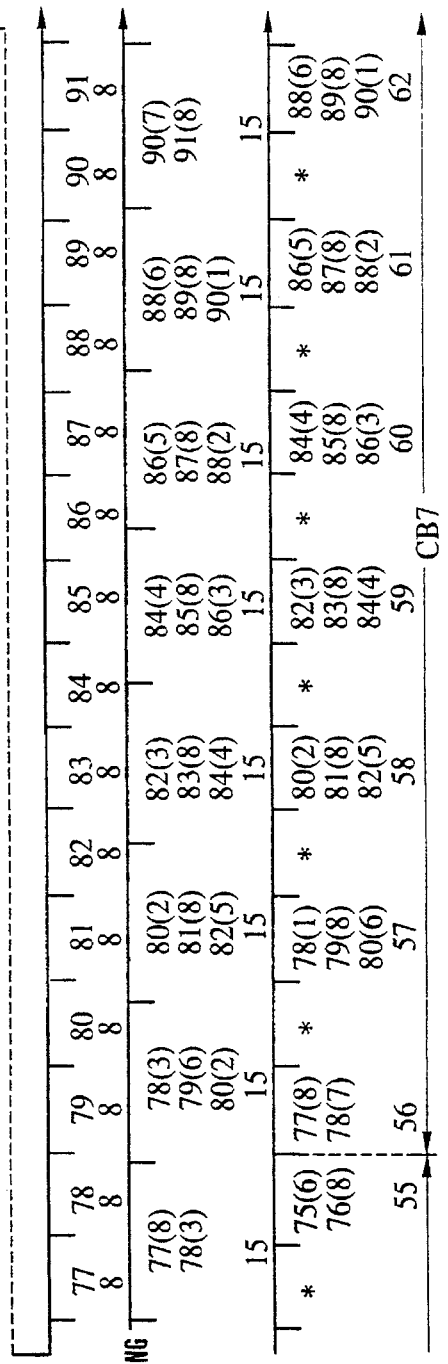

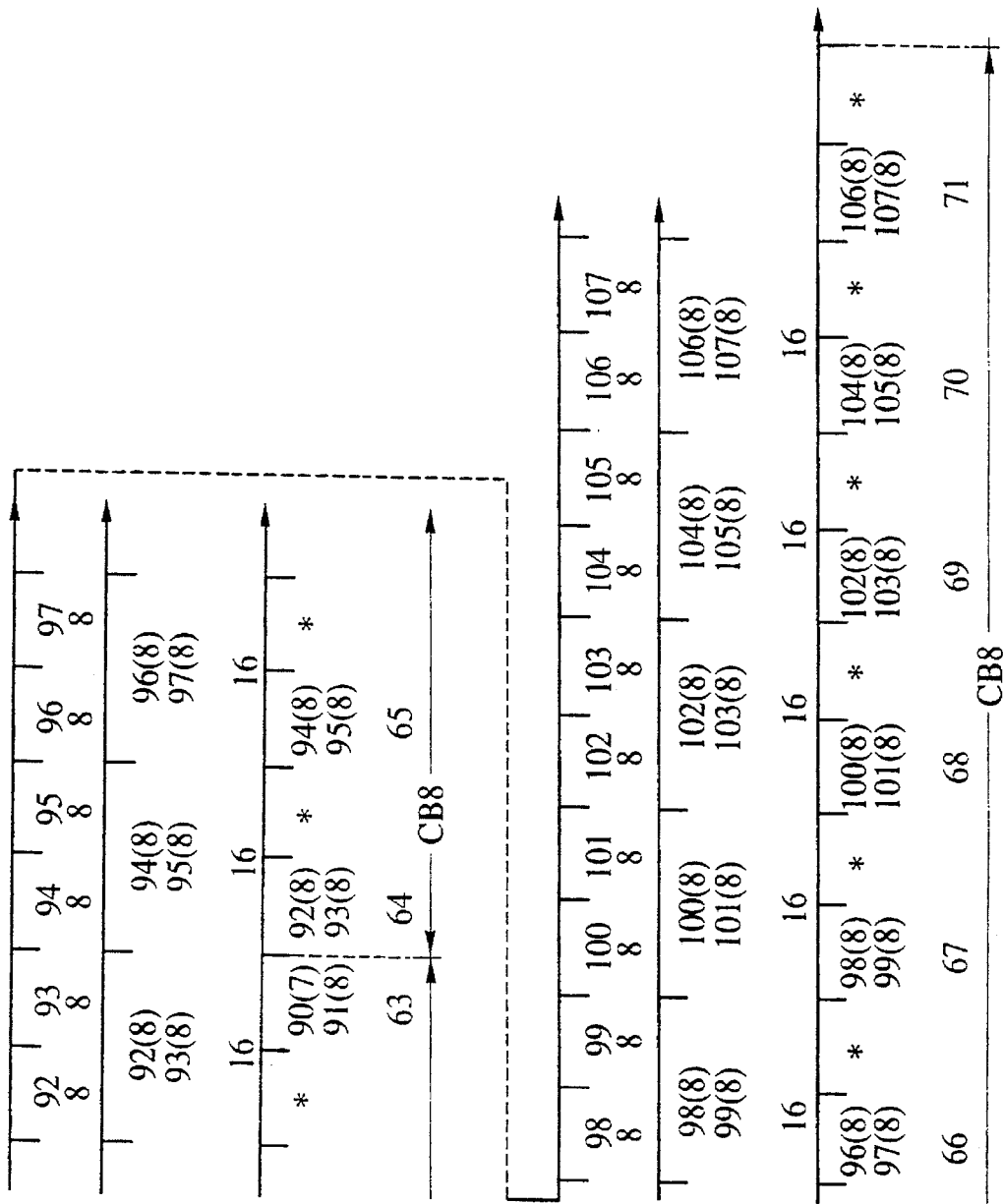

FIG. 18

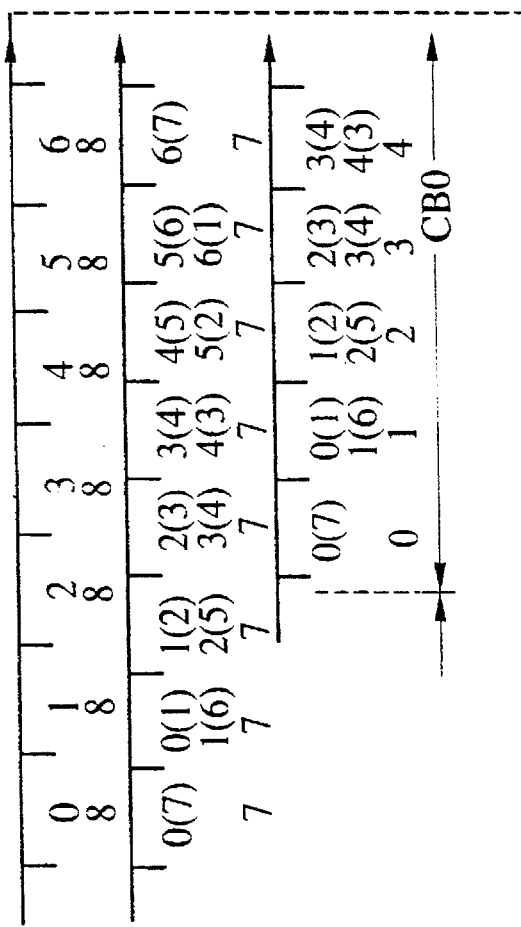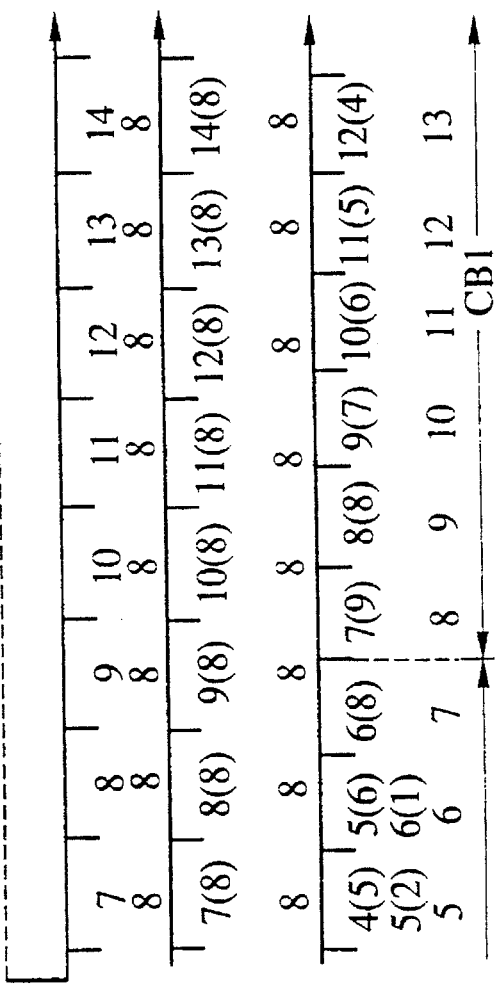
FIG. 19A 611 ~ FIELD SYNC SIGNAL
FIG. 19B 612 ~ FIELD NUMBER
FIG. 19C 613 ~ NUMBER OF SBS
FIG. 19D 621 ~ TRACK PROCESSING TIMING
FIG. 19E 622 ~ {FIELD No. 1 / FIELD No. 2}
FIG. 19F 623 ~ NUMBER OF SBS
FIG. 19G 631 ~ TRACK SYNC SIGNAL
FIG. 19H 632 ~ {WRITE FIELD No. 1 / WRITE FIELD No. 2}
FIG. 19I 633 ~ TRACK NUMBER
FIG. 19J 64 ~ CLOCK BLOCK

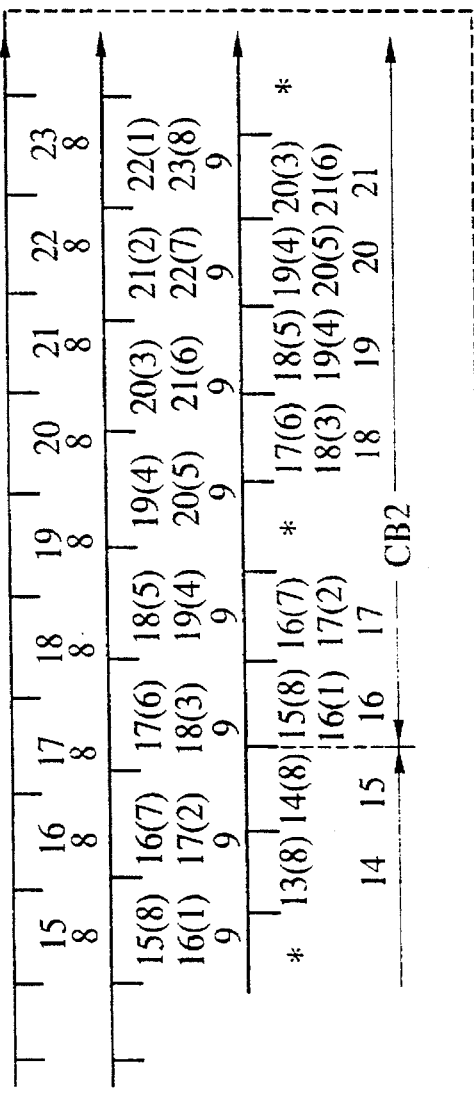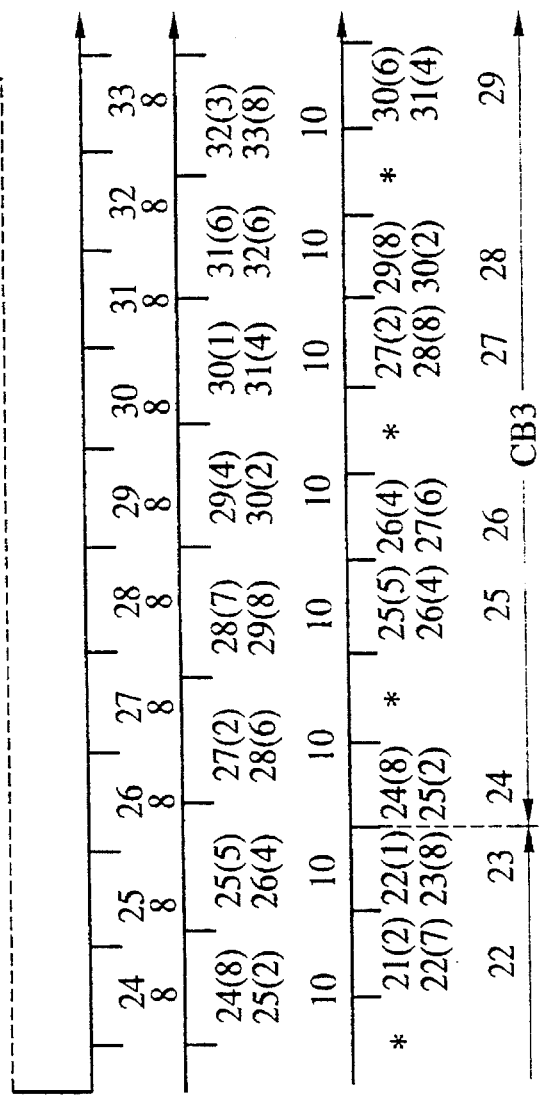

FIG. 20A FIELD SYNC SIGNAL
FIG. 20B FIELD NUMBER
FIG. 20C NUMBER OF SBS
FIG. 20D TRACK PROCESSING TIMING
FIG. 20E { FIELD No. 1
         { FIELD No. 2
FIG. 20F NUMBER OF SBS
FIG. 20G TRACK SYNC SIGNAL
FIG. 20H { WRITE FIELD No. 1
         { WRITE FIELD No. 2
FIG. 20I TRACK NUMBER
FIG. 20J CLOCK BLOCK

FIG. 20A FIELD SYNC SIGNAL
FIG. 20B FIELD NUMBER
FIG. 20C NUMBER OF SBS
FIG. 20D TRACK PROCESSING TIMING
FIG. 20E { FIELD No. 1
         { FIELD No. 2
         { FIELD No. 3
FIG. 20F NUMBER OF SBS
FIG. 20G TRACK SYNC SIGNAL
FIG. 20H { WRITE FIELD No. 1
         { WRITE FIELD No. 2
         { WRITE FIELD No. 3
FIG. 20I TRACK NUMBER
FIG. 20J CLOCK BLOCK

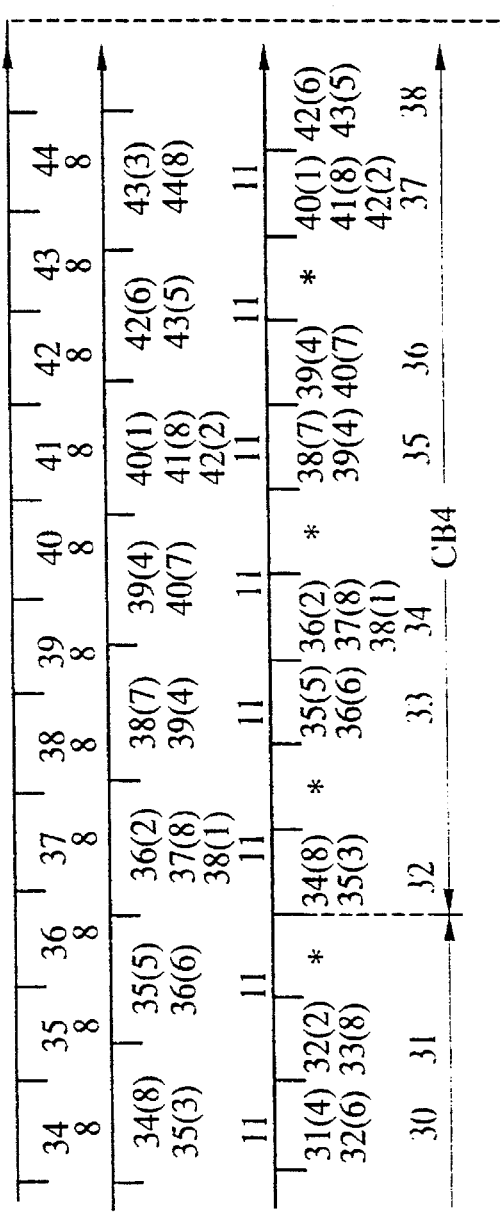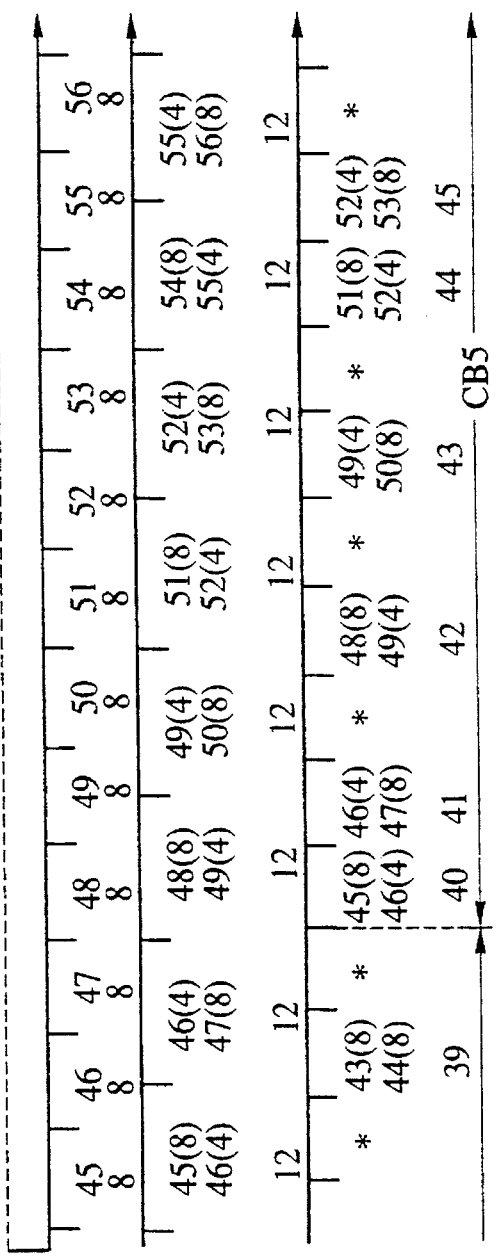

FIG.22A FIELD SYNC SIGNAL
FIG.22B FIELD NUMBER
FIG.22C NUMBER OF SBS
FIG.22D TRACK PROCESSING TIMING
FIG.22E { FIELD No. 1
          FIELD No. 2
          FIELD No. 3
FIG.22F NUMBER OF SBS
FIG.22G TRACK SYNC SIGNAL
FIG.22H { WRITE FIELD No. 1
          WRITE FIELD No. 2
          WRITE FIELD No. 3
FIG.22I TRACK NUMBER
FIG.22J CLOCK BLOCK

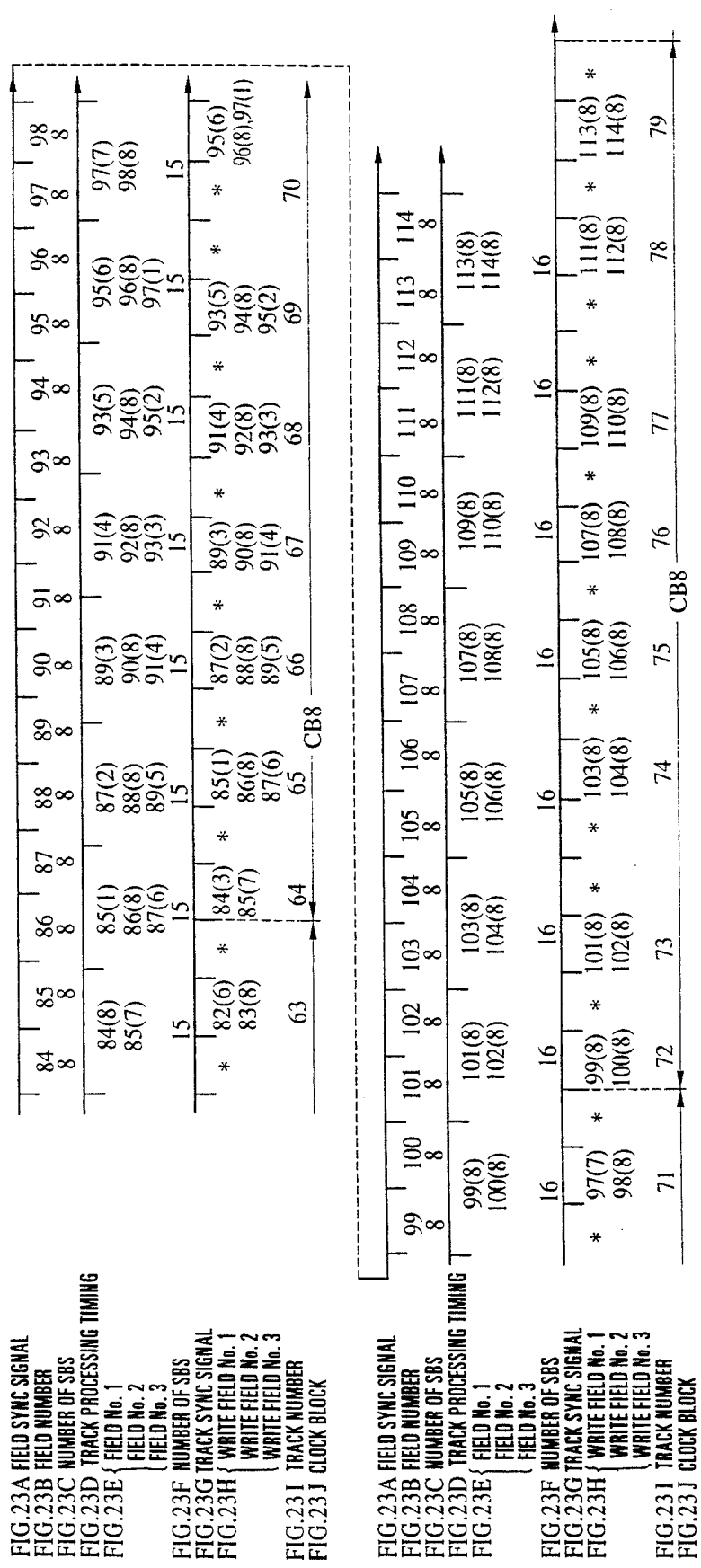

FIG. 27

| | 0 | 1 | 2 | 3 | | | | 317 | 318 | 319 |
|---|---|---|---|---|---|---|---|---|---|---|
| 0 | MARKER CODE | 64 | 128 | 224 | | 672 | 61 | | | 611 |
| 1 | | | | | | | | | 547 | |
| 2 | | | 160 | | | | 93 | 157 | | 643 |
| 3 | | 96 | | | | 29 | | 189 | | |
| 4 | 0 | | | | | | 125 | | 579 | SPACE |
| 5 | | | 192 | | | | | 221 | | |
| ... | 32 | | | | | | | 451 | 483 | |
| 164 | | | | | | | | | | |
| 165 | | | | | | | | | 515 | |
| 166 | | | | | | | | 419 | | |
| 167 | | | | | | | | | | |

MACRO-BLOCK NUMBER MB

TRACK JUMP CONTROLLER FOR OPTICAL DISK RECORDING

BACKGROUND OF THE INVENTION

The present invention relates to an optical disk apparatus for recording digital image data, digital audio data, system data, and the like on optical disk media including magneto-optical disks and, more particularly, to an optical disk apparatus for recording data at a high density with an almost constant recording wavelength and for reproducing the data.

Conventional methods for recording data on an optical disk at a high density with a constant recording wavelength have included a constant angular velocity (CAV) scheme and a constant linear velocity (CLV) scheme. With respect to the constant angular velocity scheme, in performing a recording operation, the rotational speed of a disk is kept constant, whereas the recording bit rate is increased in proportion to the radius of each track. In the constant linear velocity scheme, when performing a recording operation, the recording bit rate is kept constant, whereas the rotational angular velocity of a disk is decreased in proportion to the radius of each track.

FIG. 34 shows an optical disk apparatus for recording data with an almost constant recording wavelength by the constant angular velocity scheme. This apparatus is disclosed in U.S. Ser. No. 08/334,272 filed by the present applicant. This invention is characterized in that data is recorded/reproduced on/from only one surface of an optical disk by using one head.

Referring to FIG. 34, an optical disk 1 is driven by a disk drive section 11 to rotate at a constant angular velocity. An optical head 2 is driven by a head drive section 3 to move in the radial direction from the inner periphery to the outer periphery of the optical disk 1, as indicated by the arrow in FIG. 34, write recording data Dw2 on the optical disk 1 or read data recorded on the optical disk 1, and output it as reproduction data Dr1. A track position detector 4 receives position information P1 from the optical head 2 and outputs a signal P2 indicating the position of a track.

A recording control signal generator 5 outputs a recording clock signal Cw1 on the basis of the track position signal P2 so as to increase the recording bit rate in proportion to the radius of each track. A recording data processor 6 performs video/audio synthesis, shuffling, addition of an error correction code, modulation, addition of a sync signal, and the like with respect to recording input data Dw1, and temporarily writes the resultant data in a recording buffer memory 7. At the same time, the recording data processor 6 reads data from the recording buffer memory 7 in response to the recording clock signal Cw1, and outputs the data, as the recording data Dw2, to the optical head 2.

A reproduction control signal generator 8 outputs a reproduction clock signal Cr1 on the basis of the track position signal P2. A reproduction data processor 9 temporarily writes the reproduction data Dr1 read by the optical head 2 in a reproduction buffer memory 10 in response to the reproduction clock signal Cr1. The reproduction data processor 9 also performs sync signal detection/demodulation, error correction, deshuffling, video/audio separation, and the like with respect to data read out from the reproduction buffer memory 10 at a predetermined rate. The reproduction data processor 9 then outputs the resultant data as reproduction output data Dr2.

Assume that data to be recorded is intraframe-coded data having a frame frequency of 29.97 Hz (30/1.001 Hz). In this case, the rotational speed of the optical disk 1 is set to be 29.97 rps, which is synchronized with the frame frequency, and the optical head 2 is moved from the innermost track to the outermost track, thereby recording the data. Note that the rotational speed of the optical disk 1 may be synchronized with the field frequency.

In addition, the track area of the optical disk 1 is divided into equal areas in the radial direction, and data is recorded on each divided area at the same bit rate. For sake of descriptive convenience, assume that the radius ratio between the innermost periphery and the outermost periphery of the track area is 1:2, the track area is divided into nine equal areas in the radial direction, and the amount of data per frame is eight sync blocks. A sync block (abbreviated as SB) is a fixed-length data string consisting of a sync signal, an ID signal indicating an address, image data, an error correction code, and the like. In practice, the number of sync blocks per frame is about 800.

Each of the nine equal track areas is called a clock block (abbreviated as CB). Let CB0 be the innermost clock block, and CB8 be the outermost clock block. In this case, if the number of tracks per clock block (CB) is eight, the optical disk has a track format like the one shown in FIG. 33. Note that the numbers written on the left ends of the frames of clock blocks CB0 to CB8 are track numbers; the numbers written in the frames, the frame numbers of recording data; and the numbers within the parentheses, the numbers of SBs.

In CB0 on the innermost periphery, a total of 8-frame data are recorded, providing that 1-frame (8 SBs) data is recorded per track. In CB1, a total of 9-frame data are recorded, providing that 9-SB data are recorded per track. In CB2, a total of 10-frame data are recorded, providing that 10-SB data are recorded per track. Subsequently, the amount of data to be recorded per track is increased by 1 SB for each clock block (CB). In CB8 on the outermost periphery, a total of 16-frame data are recorded, providing that 2-frame (16 SBs) data are recorded per track. In this manner, a total of 108 frames, from frame #0 (the symbol "#" represents "number") to frame #107, are recorded within the range of track #0 to track #71 on the optical disk.

In order to record data on tracks at a bit rate corresponding to each divided track area, i.e., each clock block (CB), data written in the recording buffer memory 7 at the frame period is read out at a period shorter than the frame period. For this reason, a data shortage occurs in the recording buffer memory 7. Therefore, timing adjustment (called pause track processing) is executed to stop recording data on a track when a data shortage occurs. More specifically, the recording control signal generator 5 outputs a pause track control signal Cw2 to the recording data processor 6 on the basis of the track position signal P2. In this case, since data shortages occur in the recording buffer memory 7 at specific track positions, the track positions where pause track processing is to be executed are stored in a storage device such as a ROM in advance.

In the reproduction mode, data reproduced from tracks is written in the reproduction buffer memory 10 at a period shorter than the frame period and is read out at the frame period. Consequently, an overflow of data occurs. For this reason, when an overflow occurs, the optical head is moved backward by one track to read data from the same track twice (this processing is called repeat track processing). More specifically, the reproduction control signal generator 8 generates a repeat track control signal Cr2 on the basis of the track position signal P2. In this case, since overflows occur in the reproduction buffer memory 10 at specific track positions, these track positions are stored in ROM or the like in advance.

In the above optical disk apparatus is designed on the basis of a normal state in which the rotational speed of the optical disk 1 is synchronized with the frame period. For this reason, the apparatus uses a ROM or the like in which track positions where timing adjustment is executed are stored in advance, and executes pause track processing and repeat track processing in accordance with the track positions. If, therefore, the rotational angular velocity of the optical disk 1 exceeds a predetermined frame period owing to a servo shift or the like, a data shortage occurs in the recording buffer memory 7, or an overflow occurs in the reproduction buffer memory 10. As a result, a normal recording/reproducing operation cannot be performed.

Assume that 1-frame data is recorded on a track per revolution. In this case, when the optical disk 1 normally rotates at 29.97 rps in reproducing data from this track, data is reproduced at a rate of 29.97 frames per second, and hence no problem is posed. If, however, the rotational speed of the optical disk 1 exceeds the normal rotational speed and becomes, e.g., 31 rps, the amount of data to be reproduced increases to 31 frames per second. Even if, therefore, a certain increase in data amount can be absorbed by the reproduction buffer memory 10, an overflow occurs in the reproduction buffer memory 10 to finally cause a data error.

Furthermore, in this optical disk apparatus, the positions where pause track processing is executed are determined according to one pattern. For this reason, it is difficult to execute pause track processing at the optimal positions corresponding to changes in the capacity of a buffer memory for absorbing jitter.

Since the size of the innermost periphery of an optical disk must be matched with the minimum recording unit, it is difficult to realize high-efficiency use of the disk and high-capacity recording by using the innermost periphery.

In addition, the above apparatus is designed in consideration of only recording of a 525/60 component television signal in the NTSC zone, but no consideration is given to the common use of the apparatus for recording of a 625/50 component television signal in the PAL zone.

Moreover, no consideration is given to shuffling to be performed in recording compressed data by MCAV.

SUMMARY OF THE INVENTION

It is an object of the present invention to provide an optical disk apparatus for recording data on an optical disk with an almost constant recording wavelength, in which even if the rotational speed of the optical disk becomes higher than a normal rotational speed owing to a servo shift, data shortages in recording and reproduction buffer memories or data errors due to overflows can be prevented.

It is another object of the present invention to provide an optical disk apparatus which can realize high-efficiency use of an optical disk and large-capacity recording thereon by utilizing the inner peripheral portion of the optical disk.

It is still another object of the present invention to provide an optical disk apparatus which can generate optimal pause tracks for a buffer capacity for absorbing jitter.

It is still another object of the present invention to provide an optical disk apparatus which can cope with both 525/60 signal recording and 626/50 signal recording.

It is still another object of the present invention to provide an optical disk apparatus which can perform optimal shuffling.

It is still another object of the present invention to provide an optical disk apparatus which can prevent degradation in image quality due to data reproduction omissions in variable speed reproduction.

In order to achieve the above objects, according to the present invention, there is provided an optical disk apparatus comprising an optical disk which has a recording area constituted by a plurality of equal clock blocks obtained by dividing a track area in a radial direction and rotates at a constant rotational speed in synchronism with one of a frame frequency and a field frequency of recording data, an optical head for optically recording data on the optical disk, recording buffer memory means in which data to be recorded on the optical disk is temporarily written at a constant bit rate, recording control means for reading out the data from the recording buffer memory while changing the bit rate for each clock block of the optical disk, and recording the readout recording data on the optical disk with an almost constant recording wavelength, and pause track calculation means for setting a track next to a track defined by R<Nt as a pause track for performing timing adjustment by moving the optical head backward by one track, providing that a track number in a clock block is Ct (Ct=0, 1, 2, ..., n), the number of data blocks per track is Nt, the number of data blocks per frame or field is Nf, a constant determined by a capacity of the buffer memory is R, and a value of R−(Nt−Nf) is substituted into a value of the constant R as track number Ct is incremented from 0 to 1, 2, ..., and notifying the recording control means of a pause track timing upon setting a track next to a track defined by R<Nt as a pause track when the value of R−(Nt−Nt) is substituted into an updated value of the constant R obtained by adding the number (Nf) of data blocks to the value of the constant R obtained when timing adjustment is performed as track number Ct is incremented with respect to all track numbers in each of subsequent clock blocks.

BRIEF DESCRIPTION OF THE DRAWINGS

FIGS. 1A to 1G are timing charts for explaining the recording operation of an optical disk apparatus according to the first embodiment of the present invention;

FIGS. 2A to 2G are timing charts for explaining the recording operation of an optical disk apparatus according to the first embodiment of the present invention;

FIGS. 3A to 3J are timing charts for explaining the recording operation of an optical disk apparatus according to the third embodiment of the present invention;

FIGS. 4A to 4J are timing charts for explaining the recording operation of an optical disk apparatus according to the fourth embodiment of the present invention;

FIGS. 5A to 5G are timing charts for explaining the recording operation of an optical disk apparatus according to the fifth embodiment of the present invention;

FIGS. 6A to 6G are timing charts for explaining the recording operation of an optical disk apparatus according to the sixth embodiment of the present invention;

FIGS. 7A to 7G are timing charts for explaining the recording operation of an optical disk apparatus according to the seventh embodiment of the present invention;

FIGS. 8A to 8G are timing charts for explaining the recording operation of an optical disk apparatus according to the eighth embodiment of the present invention;

FIG. 9 is a block diagram showing the optical disk apparatus of the first embodiment in FIG. 1A to 1G;

FIG. 12 is a circuit diagram for explaining a pause track generator and a repeat track generator in FIG. 10 to explain the fifth to eighth embodiments;

FIGS. 13A to 13J are timing charts showing a recording operation based on the recording format shown in FIG. 33 and Table 1 to explain the ninth embodiment of the present invention;

FIGS. 14A to 14J are timing charts showing a recording operation based on the recording format shown in FIG. 33 and Table 1 to explain the ninth embodiment of the present invention;

FIGS. 15A to 15J are timing charts showing a recording operation based on the recording format shown in FIG. 33 and Table 1 to explain the ninth embodiment of the present invention;

FIGS. 16A to 16J are timing charts showing a recording operation based on the recording format shown in FIG. 33 and Table 1 to explain the ninth embodiment of the present invention;

FIGS. 17A to 17J are timing charts showing a recording operation based on the recording format shown in FIG. 33 and Table 1 to explain the ninth embodiment of the present invention;

FIG. 18 is a view showing another recording format;

FIGS. 19A to 19J are timing charts showing a recording operation based on the recording format shown in FIG. 18 and Table 2 to explain the 10th embodiment of the present invention;

FIGS. 20A to 20J are timing charts showing a recording operation based on the recording format shown in FIG. 18 and Table 2 to explain the 10th embodiment of the present invention;

FIGS. 21A to 21J are timing charts showing a recording operation based on the recording format shown in FIG. 18 and Table 2 to explain the 10th embodiment of the present invention;

FIGS. 22A to 22J are timing charts showing a recording operation based on the recording format shown in FIG. 18 and Table 2 to explain the 10th embodiment of the present invention;

FIGS. 23A to 23J are timing charts showing a recording operation based the recording format shown in FIG. 18 and Table 2 to explain the 10th embodiment of the present invention;

FIG. 27 is a view showing an example of shuffling for the 525 signal;

FIG. 33 is a view showing a recording format; and

DESCRIPTION OF THE PREFERRED EMBODIMENTS

Figure 10:
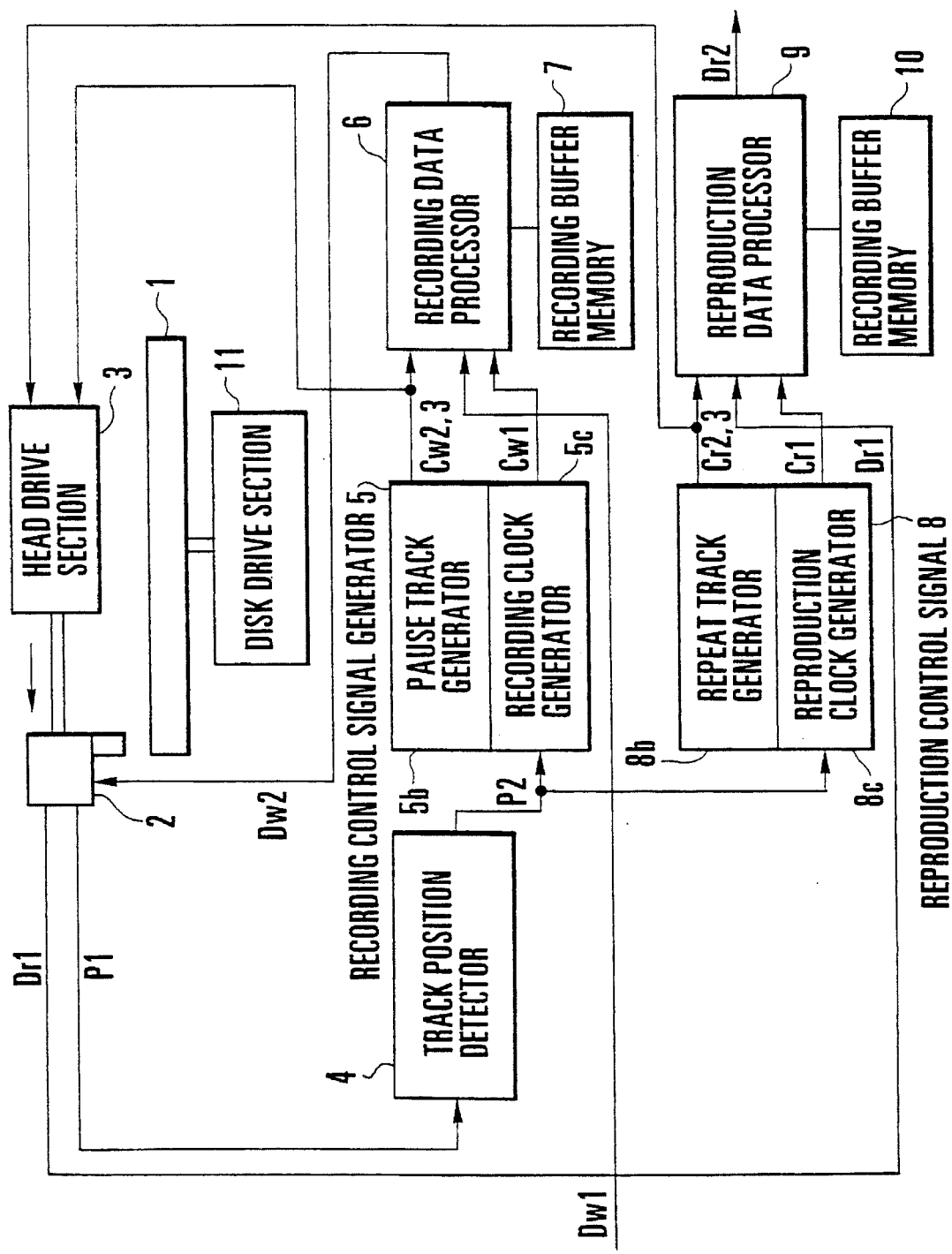
FIG. 10 is a block diagram showing the optical disk apparatus common to the third to eighth embodiments in FIGS. 3A to 8G.

The present invention will be described below with reference to the accompanying drawings.

FIGS. 1A to 1G show a recording operation in the first embodiment of the present invention. In this case, data is recorded according to the track format shown in FIG. 31 with an almost constant recording wavelength by the constant angular velocity scheme. Assume that the disk normally rotates in synchronism with a frame frequency of 29.97 Hz, and the recording buffer memory has a capacity of 16 SBs.

The frame sync signal shown in FIG. 1A is a signal synchronized with a frame frequency of 29.97 Hz of input data. The frame numbers shown in FIG. 1B are the frame numbers of input data having each frame constituted by 8 SBs. The track processing timing shown in FIG. 1C indicates the range of input data to be recorded on each track. The track processing frame numbers shown in FIG. 1D are frame numbers to be recorded on tracks. The numbers within the parentheses in FIG. 1D are the numbers of SBs of the respective frames. A track sync signal Sa shown in FIG. 1E is a signal indicating the timing at which data is read out from the recording buffer memory and recorded on the optical disk. This signal is synchronized with the rotation of the optical disk. The track numbers shown in FIG. 1F and the frame numbers and the clock blocks (CBs) shown in FIG. 1G correspond to those shown in FIG. 33.

Since the disk normally rotates at a constant rotational speed (29.97 rps) in synchronism with a frame frequency of 29.97 Hz, a period Ta (to be referred to as a track period Ta) of the track sync signal Sa in FIG. 1E coincides with a period Tf (to be referred to as a frame period Tf) of the frame sync signal in FIG. 1A. Therefore, data of each frame which is written in the buffer memory at the frame period Tf is sequentially read out at the track period Ta equal to the frame period Tf to be recorded. More specifically, 1-frame (8 SBs) data is recorded on each of tracks #0 to #7 of CB. That is, the data of frames #0 to #7 in FIG. 1B which are written in the recording buffer memory at the frame period are sequentially read out at the same period as the frame period Tf in response to the track sync signal Sa in FIG. 1E and are respectively recorded on tracks #0 to #7 in FIG. 1G. Nine SBs are recorded on each of tracks #8 to #15 of CB1. That is, as shown in FIGS. 1F and 1G, a total of 9 SBs of frame #8 (8 SBs) and frame #9 (1 SB) are recorded on track #8 at the track period Ta, and frame #9 (7 SBs) and frame #10 (2 SBs) are recorded on track #9 at the track period Ta. Subsequently, data is recorded in the same manner, and frame #15 (1 SB) and frame #16 (8 SBs) are recorded on track #15 at the track period Ta.

10 SBs are recorded on each of tracks #16 to #23 of next CB2. More specifically, frame #17 (8 SBs) and frame #18 (2 SBs) are recorded on track #16. At this time, however, there is a shortage of the data of frame #18 (2 SBs) to be recorded on track #16, as shown in FIGS. 1B and 1D. This is because in CB1, the amount of data read out from the recording buffer memory is larger than the amount of data written therein. For this reason, as shown in FIGS. 1F and 1G, after data is recorded on track #15, the optical head is moved backward by one track and data recording is stopped. During this interval, data is written in the buffer memory and is recorded on track #16 in the next track recording interval. A track for which such an operation is executed will be referred to as a pause track, and this operation will be referred to as a pause track operation, which is indicated by the symbol "*" in FIG. 1F. In CB2, pause track operations are respectively executed after data is recorded on tracks #19 and #23 in FIG. 1G.

In this case, pause tracks are obtained by a pause track calculator (FIG. 9) in the following manner. Let Ct (Ct=0 to 7) be the track number in a clock block (CB), Nt be the number of recording SBs per track, Nf (Nf=8 SBs) be the number of SBs per frame, and R (R=16) be the constant determined by the capacity of the buffer memory. While Ct is incremented from 0 to 1, 2, . . . , R−(Nt−Nf) is substituted into the value of R to calculate R. When R<Nt, the first pause track is obtained next to Ct. R is updated by a value (R+Nf) obtained by adding Nf to the value of R, and the value of Ct is kept incremented to obtain the next pause track in the same manner as described above.

For example, in CB1, Nt=9, Nf=8, and R=16. When Ct=0, R=16−1=15. When Ct=2, R=15−1=14. When Ct is 3, 4, . . . , 6, and 7, R is 13, 12, . . . , 9, and 8, respectively. When Ct=7, R<Nt. Therefore, a track having the number next to track number Ct=7 is a pause track.

Similarly, in CB2, Nt=10, Nf=8, and R=16. When Ct=0, R=16−2=14. When Ct=1, R=14−2=12. When Ct is 2 and 3, R is 10 and 8, respectively. When Ct=3, R<Nt. Therefore, the first pause track is next to track number Ct=3. R is updated by a value (16) obtained by adding the value (8) of R to Nf (8), and similar calculations are continued. That is, when Ct=4, R=16−2=14. When Ct is 5, 6, and 7, R is 12, 10, and 8, respectively. When Ct=7, R<Nt. Therefore, a pause track is next to Ct=7. Similarly, pause tracks in CB3, CB4, . . . can be calculated.

Pause tracks are calculated in this manner to perform timing adjustment. With this operation, data can be recorded on the disk with an almost constant recording wavelength. In the reproduction mode, data can be reproduced while timing adjustment is performed by moving the optical head backward by one track in each repeat track obtained by similar calculations. Since pause tracks and repeat tracks can be obtained by calculations, tracks for which timing adjustment is executed need not be stored in a ROM or the like in advance.

FIGS. 2A to 2G show a recording operation in the second embodiment of the present invention. In this case, data is recorded on a disk, which is controlled to normally rotate, according to the track format shown in FIG. 33 with an almost constant recording wavelength by the constant linear velocity scheme.

The frame sync signal, the frame numbers, the track processing timing, and the track processing frame numbers shown in FIGS. 2A to 2D are identical to those shown in FIGS. 1A to 1D. A track sync signal Sc shown in FIG. 2E is a sync signal used for reading out data from the recording buffer memory and recording the data on an optical disk. The track sync signal Sc is synchronized with the rotation of the optical disk. Therefore, the track period changes for each clock block (CB). Note that the track numbers shown in FIG. 2G and the frame numbers and the clock blocks (CBs) shown in FIG. 2F correspond to the track numbers, the frame numbers, and the clock blocks (CBs) shown in FIG. 33.

If, for example, a constant bit rate of 1 frame/sec is set, and the rotational speed of the disk is controlled to be 29.97 rps in CB0 on the innermost periphery and 14.98 rps in CB8 on the outermost periphery, data can be recorded with an almost constant recording wavelength. In this case, since data is always written/read in/from the recording buffer memory at a constant bit rate, neither data shortage nor overflow occurs.

FIGS. 3A to 3J show a recording operation in the third embodiment of the present invention. In this case, a disk rotates at a rotational speed higher than a normal rotational speed owing to a servo shift or the like in the constant angular velocity scheme.

The frame sync signal, the frame numbers, the track processing timing, the track processing frame numbers, a track sync signal Sa in a normal rotation state, the track numbers, the frame numbers, and the clock blocks (CBs) shown in FIGS. 3A to 3G are identical to those in the first embodiment shown in FIGS. 1A to 1G. FIGS. 3H to 3J show a track sync signal Sb in a servo shift state, frame numbers (the numbers of SBs), and track numbers.

In this case, since the rotational speed of the optical disk is higher than a normal rotational speed (29.97 rps), a period Tb (to be referred to as a track period Tb hereinafter) of the track sync signal Sb in FIG. 3H, which is synchronized with the rotation of the optical disk, is shorter than a track period Ta in a normal rotation state shown in FIG. 3E. Since the track period Ta coincides with the frame period, data written in the recording buffer memory at the frame period is read out at the track period Tb shorter than the frame period. Consequently, a data shortage occurs in the recording buffer memory earlier than in the first embodiment. For this reason, timing adjustment is performed by executing pause track operations more frequently than in a normal rotation state in the first embodiment.

In this case, pause track operations are executed as follows. First of all, as shown in FIG. 3H, recording start time tb0 at which frame #0 is recorded on track #0 of CB0 is delayed by the track period Tb with respect to recording start time ta0 at which data recording on track #0 is started in a normal rotation state. Thereafter, frame #1 is to be recorded on track #1. However, at recording end time tb1 (FIG. 3J) at which data recording on track #0 is terminated, the track recording timing in the normal rotation state corresponds to a timing in the interval in which data is recorded on track #1, as shown in FIGS. 3F and 3G. It is, therefore, highly possible that the data of frame #1 cannot be reliably read out from the recording buffer to be recorded. For this reason, a pause track operation (indicated by the symbol "*" in FIG. 3H) is executed after data recording on track #0 in FIG. 3J is completed. After the execution of this pause track operation, frames #1 and #2 shown in FIG. 3I are respectively recorded on tracks #1 and #2 in FIG. 3J. Thereafter, at recording end time tb2 (FIG. 3H) at which data recording on track #2 in FIG. 3J is terminated, a state in which the data of frame #3 cannot be reliably recorded is set. Therefore, a pause track operation is executed again. Subsequently, data recording is performed while pause track operations are executed in the same manner as described above.

In the above embodiment, recording start time tb0 is delayed by the track period Tb with respect to recording start time ta0 in a normal rotation state. However, the delay time may be changed. In addition, in the above embodiment, the condition for determining execution of a pause track operation is that the recording start time, at which data recording on each track is started, is within the interval in which data is recorded on a corresponding track in a normal rotation state. However, the condition may be that the time difference between the recording start time at which data recording on each track is started and the recording start time at which data recording on a corresponding track is started in a normal rotation state falls within a predetermined range. The track recording timing in a normal rotation state is not limited to that in the first embodiment. For example, the timing disclosed in U.S. Ser. No. 08/334,272 may be used.

In this manner, rotational speed shifts are absorbed by executing pause track operations while referring to the track recording timing in a normal rotation state. With this operation, even if the rotational speed of a disk becomes higher than a normal rotational speed owing to a servo shift or the like, a data shortage in the recording buffer memory can be prevented to allow a normal recording operation.

A reproducing operation is similar to a recording operation and can be described with reference to the timing charts shown in FIGS. 3A to 3J. In this case, timing adjustment is performed by executing a repeat track operation, i.e., moving the optical head backward by one track, instead of a pause track operation executed in the recording mode.

Assume that the disk rotates at a constant rotational speed in synchronism with the track period Tb in response to the track sync signal Sb in the case shown in FIGS. 3H to 3J. First of all, frame #0 is reproduced from track #0 at time tb0 which is delayed by one track period Tb with respect to reproduction start time ta0 in a normal rotation state. Thereafter, frame #1 is to be reproduced from track #1. However, at reproduction end time tb1 at which reproduction from track #0 is terminated, the track reproduction timing in a normal rotation state corresponds to a timing within the interval in which data is reproduced from track #1, and hence it is highly possible that the data of frame #1 cannot be reliably written in the reproduction buffer memory. For this reason, timing adjustment is performed by executing a repeat track operation, i.e., moving the optical head backward by one track, after reproduction from track #0 is completed. In this manner, rotational speed shifts are absorbed by moving the optical head backward by one track while referring to the track reproduction timing in a normal rotation state. With this operation, even if the rotational speed of a disk becomes higher than a normal rotational speed owing to a servo shift or the like, an overflow in the reproduction buffer memory can be prevented to allow a normal reproducing operation.

FIGS. 4A to 4J show a recording operation in the fourth embodiment of the present invention. In this case, data is recorded on a disk which is rotated at a rotational speed higher than a normal rotational speed owing to a servo shift or the like in the constant linear velocity scheme.

The frame sync signal, the frame numbers, the track processing timing, the track processing frame numbers, a track sync signal Sc, the track numbers, the frame numbers, and the clock blocks shown in FIGS. 4A to 4G are identical to those in the second embodiment shown in FIGS. 2A to 2G. FIGS. 4H to 4J respectively show a track sync signal Sd, frame numbers, and track numbers in a servo shift state.

In this case, since the rotational speed of a disk is higher than a normal rotational speed (29.97 rps), a period Td of the track sync signal Sd (FIG. 4H) synchronized with the rotation of the optical disk is shorter than a track period Tc (FIG. 4E) in a normal rotation state, i.e., the frame period. Consequently, data written in the recording buffer memory at the frame frequency is read out and recorded on tracks at the period Td shorter than the frame period. For this reason, a data shortage occurs in the recording buffer memory. Therefore, pause track operations are executed.

These pause track operations are executed as follows. First of all, as shown in FIG. 4H, recording start time td0 at which frame #0 is recorded on track #0 of CB0 is delayed by the period Td with respect to recording start time tc0 at which data recording on track #0 is started in a normal rotation state. Thereafter, frame #1 is to be recorded on track #1. However, when a track recording timing in a normal rotation state is referred to at recording end time td1 (FIG. 4H) at which data recording on track #0 in FIG. 4J is terminated, it is apparent that this recording end time corresponds to a timing within the interval in which data is recorded on track #1 in a normal rotation state, as shown in FIGS. 4F and 4G. It is, therefore, highly possible that the data of frame #1 cannot be reliably read out from the recording buffer memory to be recorded. Therefore, a pause track operation is executed after data recording on track #0 in FIG. 4J is completed. After the execution of this pause track operation, frames #1 and #2 in FIG. 4I are respectively recorded on tracks #1 and #2 in FIG. 4J. Thereafter, at recording end time td2 (FIG. 4H) at which data recording on track #2 in FIG. 4J is terminated, a state in which the data of frame #3 cannot be reliably recorded is set, and hence a pause track operation is executed again. Subsequently, pause track operations are executed to record data in the same manner as described above.

In this manner, rotational speed shifts are absorbed by executing pause track operations while referring to the track reproduction timing in a normal rotation state. With this operation, even if the rotational speed of a disk becomes higher than a normal rotational speed owing to a servo shift or the like, a data shortage in the recording buffer memory can be prevented to allow a normal recording operation.

Note that a reproducing operation is similar to a recording operation. In this case, timing adjustment is performed by executing a repeat track operation, i.e., moving the optical head backward by one track, instead of a pause track operation executed in the recording mode.

FIGS. 5A to 5G show a recording operation in the fifth embodiment of the present invention. In this case, a disk rotates at a rotational speed higher than a normal rotational speed in the constant angular velocity scheme. The frame sync signal, the frame numbers, the track processing timing, and the track processing frame numbers shown in FIGS. 5A to 5D are identical to those shown in FIGS. 1A to 1D. FIGS. 5E to 5G respectively show a track sync signal Sb, frame numbers (the numbers of SBs), and track numbers in a servo shift state.

In this case, data is written in the recording buffer memory in synchronism with the track processing timing. In addition, data is read out from the recording buffer memory and recorded on tracks in response to the track sync signal Sb synchronized with the rotation of the disk. In this case, a pause track operation is executed when the amount of data written in the recording buffer memory is smaller than 1-track data. When, for example, a track processing timing is referred to at the time at which recording of frame #4 (FIG. 5F) on track #4 in FIG. 5G is completed, it is apparent that writing of frame #5 in the recording buffer memory is not completed, and the amount of data written in the recording buffer memory is smaller than 1-track data, as shown in FIG. 5D. Therefore, after data is recorded on track #4 in FIG. 5G, a pause track operation is executed. Subsequently, data is recorded while pause track operations are executed in the same manner as described above. The condition for determining the execution of a pause track operation may be that the amount of data written in the recording buffer memory is smaller than m-track data (m is a positive real number) or m-frame data. Alternatively, determination may be made on the basis of the time difference between the time at which data recording on a track is started and the time at which a write operation for the track corresponding to the track processing timing is started.

FIGS. 6A to 6G show a recording operation in the sixth embodiment of the present invention. In this case, data is recorded on a disk which is rotated at a rotational speed higher than a normal rotational speed owing to a servo shift or the like in the constant linear velocity scheme. FIGS. 6A to 6G correspond to FIGS. 4H to 4J.

In this case, data is written in the recording buffer memory in synchronism with a track processing timing, and data recording on tracks is executed in response to a track sync signal Sd (FIG. 6F) synchronized with the rotation of the optical disk. Similar to the fifth embodiment shown in FIGS. 5A to 5G, a pause track operation is executed when the amount of data written in the recording buffer memory is smaller than 1-track data. When, for example, a track processing timing is referred to at the time at which recording of frame #4 in FIG. 6F on track #4 in FIG. 6G is completed, recording of frame #5 in the recording buffer memory is not completed, as shown in FIG. 6D, and the amount of data written in the recording buffer memory is smaller than 1-track data. Therefore, after data is recorded on track #4 in FIG. 6G, a pause track operation is executed. Subsequently, data recording is performed while pause track operations are executed. The condition for determining the execution of a pause track operation may be that the amount of data written in the recording buffer memory is smaller than m-track data (m is a positive real number) or m-frame data. Alternatively, determination may be made on the basis of the time difference between the time at which data recording on a track is started and the time at which a write operation for the track corresponding to the track processing timing is started.

FIGS. 7A to 7G show a reproducing operation in the seventh embodiment of the present invention. In this case, the rotational speed of an optical disk is higher than a normal rotational speed in a reproducing operation performed by the constant angular velocity scheme. Assume that the amount of data to be written in the reproduction buffer memory is set to be 3-track data. Therefore, the storage capacity of the reproduction buffer memory is at least 3×16=48 SBs. FIGS. 7A to 7C correspond to FIGS. 5E to 5G. FIGS. 7D and 7E correspond to FIGS. 5C and 5D. FIGS. 7F and 7G correspond to FIGS. 5A and 5B.

In the reproduction mode, data is reproduced from tracks in response to a track sync signal Sb (FIG. 7A) synchronized with the rotation of the disk, and is written in the reproduction buffer memory. In addition, data is read out from the reproduction buffer memory in accordance with the track processing timing in FIG. 7D which is synchronized with the frame sync signal in FIG. 7F. When data is to be reproduced from four or more tracks and written in the reproduction buffer memory, a repeat track operation is executed at a certain track by one track to perform timing adjustment. Note that the amount of data to be stored in the reproduction buffer memory may be m-track (m is a positive real number) data or m-frame data.

Assume that frame #4 in FIG. 7B is reproduced from track #4 in FIG. 7C in response to the track sync signal Sb in FIG. 7A, and is completely written in the reproduction buffer memory. In this case, at the time at which frame #5 in FIG. 7B is to be reproduced from track #5 in FIG. 7C to be written in the reproduction buffer memory, frame #2 is being read out from the reproduction buffer memory, as shown in FIGS. 7D and 7E, so that frames #2, #3, and #4, i.e., 3-track data, are stored in the reproduction buffer memory. Therefore, the data of track #5 is not reproduced and written in the reproduction buffer memory after data reproduction from track #4 in FIG. 7C is completed. Instead, as shown in FIG. 7B, a repeat track operation (indicated by the symbol "*" in FIG. 7B) is executed after data reproduction from track #4 is completed, as shown in FIG. 7B. Similarly, assume that frames #9 (7 SBs) and #10 (2 SBs) are reproduced from track #9 and are completely written in the reproduction buffer memory. In this case, at the time at which frames #10 (6 SBs) and #11 (3 SBs) are to be reproduced from track #10 to be written in the reproduction buffer memory, frames #7 (8 SBs), #8 (8 SBs), #9 (1 SB), #9 (7 SBs), and #10 (2 SBs), i.e., 3-track data, are stored in the reproduction buffer memory. Therefore, as shown in FIG. 7B, a repeat track operation is executed after data reproduction from track #9 is completed. Subsequently, data reproduction is performed while repeat track operations are executed to absorb rotational speed shifts.

FIGS. 8A to 8G show a reproducing operation in the eighth embodiment of the present invention. In this case, the rotational speed of an optical disk is higher than a normal rotational speed in a reproducing operation performed by the constant linear velocity scheme. FIGS. 8A to 8G correspond to FIGS. 7A to 7G.

Similar to the seventh embodiment, the amount of data to be written in the reproduction buffer memory is set to be 3-track data. Therefore, the storage capacity of the reproduction buffer memory is at least 3×16=48 SBs. In the reproduction mode, data is reproduced from tracks in response to a track sync signal Sd (FIG. 8A) synchronized with the rotation of the optical disk, and is written in the reproduction buffer memory. In addition, data is read out from the reproduction buffer memory in accordance with a track processing timing synchronized with the frame sync signal in FIG. 8F. When data is to be reproduced from four or more tracks and written in the reproduction buffer memory, a repeat track operation is executed at a certain track by one track to perform timing adjustment. Note that the amount of data to be stored in the reproduction buffer memory may be m-track (m is a positive real number) data or m-frame data.

Assume that frame #4 in FIG. 8B is reproduced from track #4 in FIG. 8C in response to the track sync signal Sb in FIG. 8A, and is completely written in the reproduction buffer memory. In this case, at the time at which frame #5 in FIG. 8B is to be reproduced from track #5 in FIG. 8C to be written in the reproduction buffer memory, frame #2 is being read out from the reproduction buffer memory, as shown in FIGS. 8D and 8E, so that frames #2, #3, and #4, i.e., 3-track data, are stored in the reproduction buffer memory. Therefore, the data of track #5 is not reproduced and written in the reproduction buffer memory after data reproduction from track #4 in FIG. 8C is completed. Instead, as shown in FIG. 8B, a repeat track operation (indicated by the symbol "*" in FIG. 8B) is executed after data reproduction from track #4 is completed, as shown in FIG. 8B. Similarly, assume that frames #11 (5 SBs) and #12 (4 SBs) are reproduced from track #11 and are completely written in the reproduction buffer memory. In this case, at the time at which reproduced data from track #12 is to be written in the reproduction buffer memory, frames #9 (7 SBs), #10 (2 SBs), #10 (6 SB), #11 (3 SBs), #11 (5 SBs), #11 (4 SBs), and #12 (4 SBs) i.e., 3-track data, are stored in the reproduction buffer memory. Therefore, as shown in FIG. 8B, a repeat track operation is executed after data reproduction from track #9 is completed. Subsequently, data reproduction is performed while repeat track operations are executed to absorb rotational speed shifts.

Figure 34:
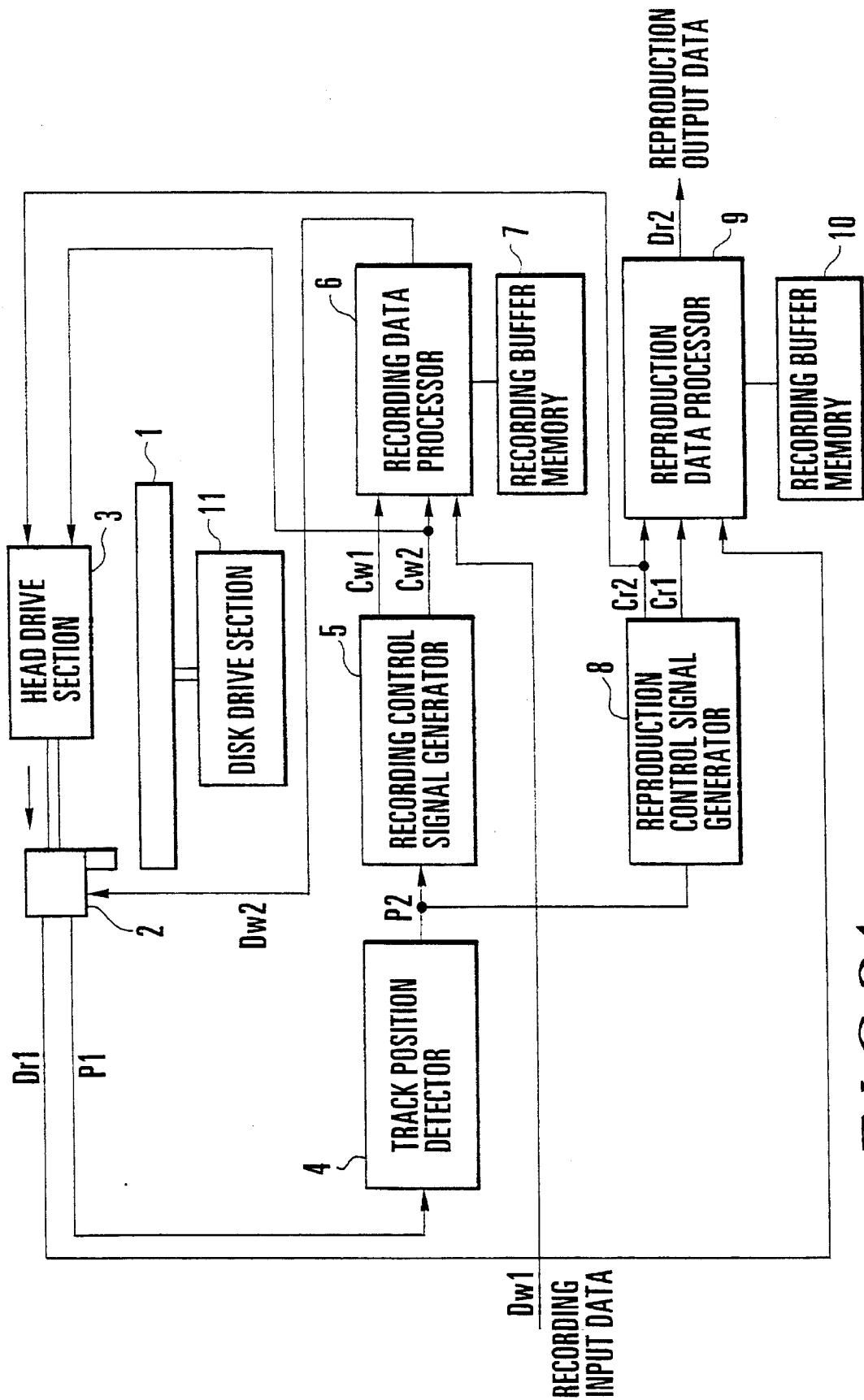
FIG. 34 is a block diagram showing an optical disk apparatus which has been proposed by the present applicant.

FIG. 9 shows an optical disk apparatus for realizing the first embodiment of the present invention. The same reference numerals in FIG. 9 denote the same parts as in FIG. 34, and a description thereof will be omitted. Referring to FIG. 9, a recording control signal generator 5 includes a pause track calculator 5a for calculating a pause track timing. A reproduction control signal generator 8 includes a repeat track calculator 8a for calculating a repeat track timing. The pause track calculator 5a and the repeat track calculator 8a calculate pause track and repeat track timings by the above described methods.

FIG. 10 shows an optical disk apparatus for realizing the third to eighth embodiments. This apparatus is commonly used for the constant angular velocity scheme and the constant linear velocity scheme. The same reference numerals in FIG. 10 denote the same parts as in FIG. 34, and a description thereof will be omitted. Referring to FIG. 10, a recording control signal generator 5 includes a pause track generator 5b for generating a pause track signal CW1 at a predetermined timing, and a recording clock generator 5c for generating a recording clock Cw2. A reproduction control signal generator 8 includes a repeat track generator 8b for generating a pause track signal Cr1 at a predetermined timing, and a reproduction clock generator 8c for generating a reproduction clock Cr2. The pause track generator 5b also outputs a frame number Cw3 in a recording operation to a head drive section 3 and a recording data processor 6. The reproduction clock generator 8c also outputs a frame number Cr3 in a reproducing operation to the head drive section 3 and a reproduction data processor 9.

The second embodiment can be realized by omitting the pause track generator 5b and the repeat track generator 8b in FIG. 10, and controlling the rotational speed of an optical disk 1 by using a disk drive section 11 to perform a recording/reproducing operation with a constant recording wavelength.

Figure 11:
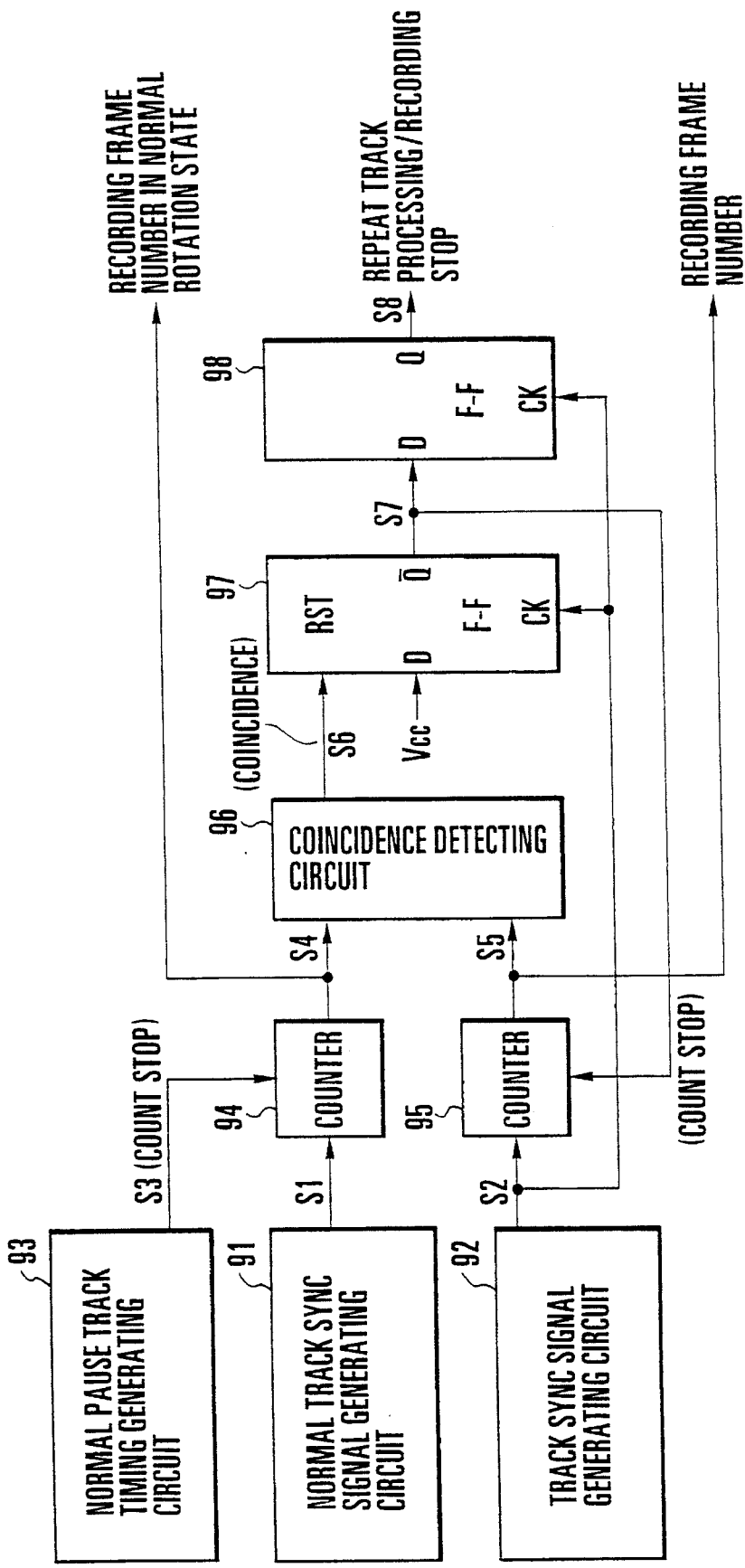
FIG. 11 is a circuit diagram for explaining a pause track generator and a repeat track generator in FIG. 10 to explain the third and fourth embodiments.

FIG. 11 shows a circuit arrangement of the pause track generator 5b and the repeat track generator 8b in FIG. 10, which is used to generate a signal indicating a repeat track operation in the third and fourth embodiments. Circuits having the same arrangement are used for the above components.

Referring to FIG. 11, a normal track sync signal generating circuit 91 generates a normal track sync signal S1 in a normal rotation state. For example, in the constant angular velocity scheme, the normal track sync signal generating circuit 91 generates a signal synchronized with a frame frequency of 29.97 Hz. In the constant linear velocity scheme, the normal track sync signal generating circuit 91 generates a sync signal which is synchronized with a frame frequency of 29.97 Hz in the innermost track area, and decreases in level in accordance with the distance from the disk center in the track area. A track sync signal generating circuit 92 generates a track sync signal S2 synchronized with the rotation of the optical disk. A normal pause track timing generating circuit 93 outputs a signal S3 indicating a pause track timing in a normal rotation state. Note that pause track timings may be calculated and stored in a recording device such as a ROM in advance, or may be obtained by calculations as in the first embodiment.

A counter 94 counts the normal track sync signal S1 and outputs a count value S4. In addition, the counter 94 stops a counting operation in response to the normal pause track timing signal S3. A counter 95 counts the track sync signal S2 synchronized with the rotation of the optical disk, and outputs a count value S5 indicating a recording frame number corresponding to the time at which the rotational speed of the optical disk deviates from a normal rotational speed owing to a servo shift. A coincidence detecting circuit 96 compares the count values of the counters 94 and 95 with each other. When the count values coincide with each other, the coincidence detecting circuit 96 outputs a coincidence pulse S6. A D flip-flop 97 is reset in response to the coincidence pulse S6, and is set in response to the track sync signal S2 as a clock. An output pulse S7 from the D flip-flop 97 stops the counting operation of the counter 95 and is input to a D flip-flop 98. An output pulse S8 from the D flip-flop 98 is used as a signal indicating a repeat track operation in a reproducing operation, and is also used as a signal indicating a repeat track processing/recording stop operation in a recording operation.

A recording frame number in a normal rotation state, which is indicated by the count value S4, is not used in the arrangement shown in FIG. 10. A recording frame number indicated by the count value S5 is equivalent to the signal Cw3 (in the recording mode) and the signal Cr3 (in the reproduction mode) in the arrangement shown in FIG. 10. This signal is used in recording and reproduction data processors 6 and 9 to generate read and write addresses for recording and reproduction buffer memories 7 and 10. A repeat track processing/recording stop signal indicated by the output pulse S8 is equivalent to the pause track signal Cw2 in FIG. 10.

Referring to FIG. 11, a pause-track signal is output when a track count value in a normal rotation state coincides with a track count value in an actual rotation state. The arrangement shown in FIG. 11 can be used for both the constant angular velocity scheme and the constant linear velocity scheme, and can also be used for both the recording and reproduction modes.

FIG. 12 shows a circuit arrangement of the pause track generator 5b and the repeat track generator 8b, which is used to generate a repeat track signal in the fifth to eight embodiments described above.

Referring to FIG. 12, a frame sync signal generating circuit 101 generates a frame sync signal S11 synchronized with a frame frequency. A track sync signal generating circuit 102 generates a track sync signal S12 synchronized with the rotation of the optical disk. A counter 103 counts the frame sync signal S11 and outputs the count value as an address signal S13 for writing frame data in the buffer memory. A counter 104 counts the track sync signal S12 synchronized with the rotation of the optical disk and outputs the count value as an address signal S14 for reading out frame data from the buffer memory. A coincidence detecting circuit 105 compares the count values of the counters 103 and 104 with each other. When the count values coincide with each other, the coincidence detecting circuit 105 outputs a coincidence pulse S15. A D flip-flop 106 is reset in response to the coincidence pulse S15, and is set in response to the track sync signal S12. An output pulse S16 from the D flip-flop 106 stops the counting operation of the counter 104 and is input to a D flip-flop 107. An output pulse S17 from the D flip-flop 107 is used as a signal indicating a repeat track in a reproducing operation, and is also used as a signal indicating a repeat track processing/recording stop operation in a recording operation.

A frame sync count value indicated by the address signal S13 is equivalent to the signal Cw3 (in the recording mode) and the signal Cr3 (in the reproduction mode) in FIG. 10. This signal is used in the recording and reproduction data processors 6 and 9 to generate write and read addresses for the buffer memories 7 and 10. A track number indicated by the address signal S14 is equivalent to the signal Cw3 (in the recording mode) and the signal Cr3 (in the reproduction mode) in FIG. 10. This signal is used in the recording and reproduction data processors 6 and 9 to generate write and read addresses for the buffer memories 7 and 10. A repeat track processing/recording stop signal indicated by the output pulse S17 is equivalent to the pause track signal Cw2 in FIG. 10.

Referring to FIG. 12, a buffer memory write address is generated by counting a frame sync signal input to the system, and a read address is generated for each track. A pause track signal is output when a frame sync count value coincides with a track count value in an actual rotation state, i.e., the amount of data stored in the buffer is smaller than 1-track data. The arrangement shown in FIG. 12 can be used for both the constant angular velocity scheme and the constant linear velocity scheme, and can also be used for both the recording and reproduction modes.

When a servo shift occurs, the recording wavelength varies. In order to absorb such variations in recording wavelength, gaps for track jumps may be arranged in all the tracks to absorb the variations in recording wavelength. That is, each track is constituted by a track jump gap, a track address, and data. With this arrangement, variations in recording wavelength can be absorbed without affecting adjacent tracks.

Each of the third, fourth, fifth, sixth, seventh, and eighth embodiments described above exemplifies the case wherein the rotational speed of the optical disk is higher than the normal rotational speed. It is apparent, however, that the present invention can be used in a normal rotation state, and a proper recording/reproducing operation can be performed by executing proper pause track operations.

As described above, in the optical disk apparatus of the present invention, the track area of an optical disk which is normally rotated at a constant rotational speed is divided into equal areas to set a plurality of clock blocks, and data is recorded with an almost constant recording wavelength by changing the bit rate for each clock block using the buffer memory. Since the apparatus includes the means for calculating a pause track for preventing a data shortage in the buffer memory for each clock block, pause track data need not be stored in a storage device such as a ROM in advance.

In addition, in the optical disk apparatus of the present invention, the track area of an optical disk is divided into equal areas to set a plurality of clock blocks, and data is recorded/reproduced with an almost constant recording wavelength by changing the bit rate for each clock block using the recording and reproduction buffer memories. In this apparatus, a track recording timing during actual rotation of the optical disk is compared with a track recording timing in a normal rotation state, and timing adjustment is performed by moving the optical head backward by one track, thereby allowing a recording operation while absorbing rotational speed shifts when the rotational speed of the optical disk is higher than a normal rotational speed. In the reproduction mode, a normal track reproduction timing in a state wherein the optical disk is normally rotated is compared with a track reproduction timing in a state wherein the optical disk is actually rotated, and timing adjustment is performed by moving the optical head backward by one track, thereby allowing a reproducing operation while absorbing rotation speed shifts when the rotational speed of the optical disk is higher than a normal rotational speed.

Furthermore, in the optical disk apparatus of the present invention, the track area of an optical disk is divided into equal areas to set a plurality of clock blocks, and data is recorded/reproduced with an almost constant recording wavelength by changing the bit rate for each clock block using the recording and reproduction buffer memories. In this apparatus, data is written in the recording buffer memory in accordance with a normal track recording timing when the optical disk is normally rotated. In addition, data is read out from the recording buffer memory in accordance with a track recording timing when the optical disk is actually rotated. When the amount of data stored in the recording buffer memory is smaller than the data amount of a predetermined number of tracks, timing adjustment is performed by moving optical head backward by one track, thereby allowing a recording operation while absorbing rotational speed shifts when the rotational speed of the optical disk is higher than a normal rotational speed. In the reproduction mode, data is written in the reproduction buffer memory in accordance with a track recording timing when the optical disk is actually rotated. In addition, data is read out from the reproduction buffer memory in accordance with a normal track reproduction timing when the optical disk is normally rotated. When the amount of data stored in the reproduction buffer memory is larger than the data amount of a predetermined number of tracks, timing adjustment is performed by moving the optical head backward by one track, thereby allowing a reproducing operation while absorbing rotational speed shifts when the rotational speed of the optical disk is higher than a normal rotational speed.

Optical disk apparatuses according to the ninth and tenth embodiments of the present invention, in which increases in recording density are attained, will be described below with reference to FIGS. 13A to 28.

Since each of the optical disk apparatuses of the ninth and tenth embodiments has the same arrangement as that shown in FIG. 10, a description thereof will be omitted. A pause track generator 5b and a repeat track generator 8b shown in FIG. 10 respectively generate a pause track control signal Cw2 and a repeat track control signal Cr2 at the following timings, thereby performing recording/reproduction control.

Figure 33:
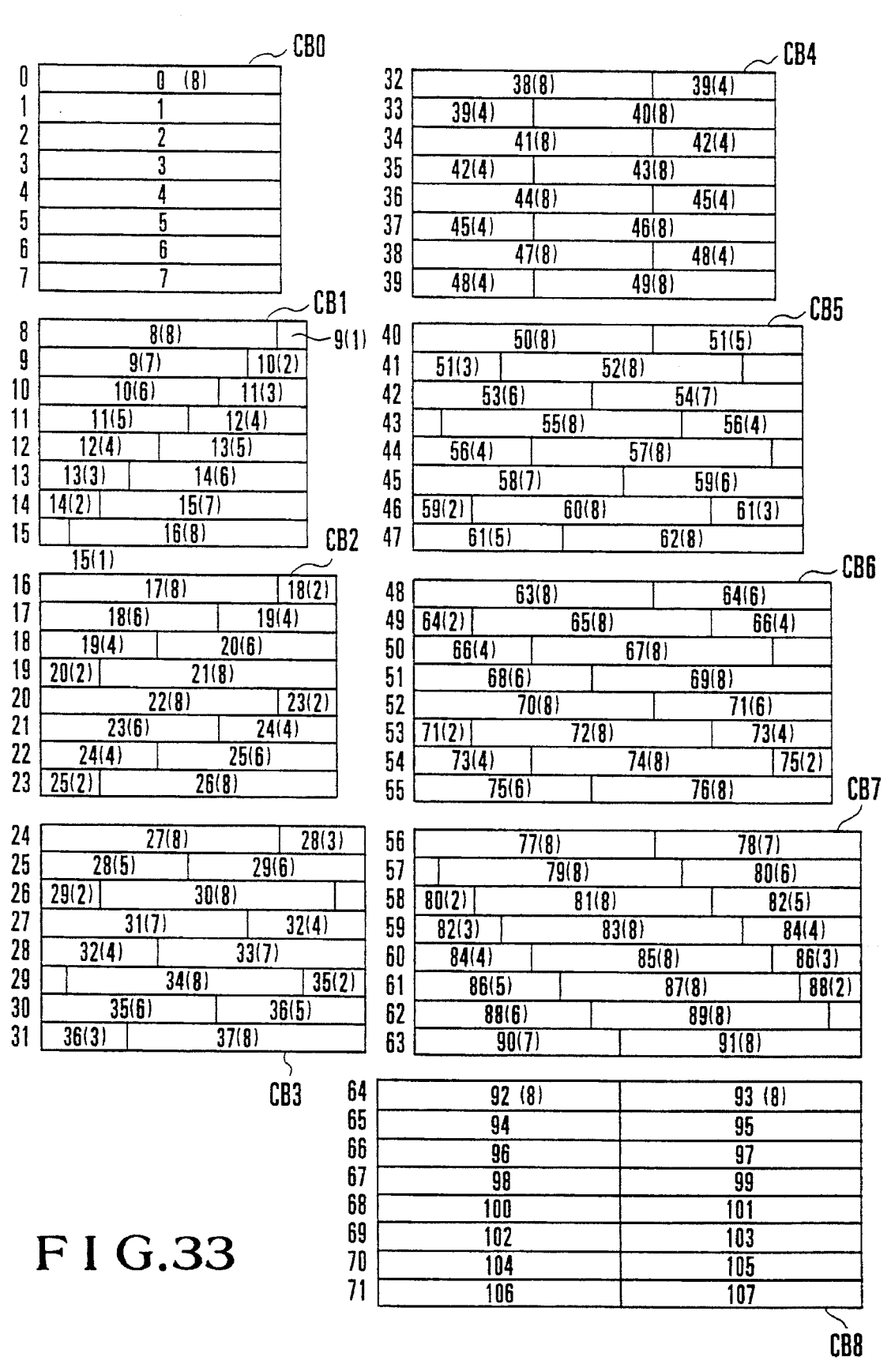

FIG. 33 shows a recording track format.

Table 1 shows the recording field numbers on each track, and the number of recording sync blocks (SBs) in each field. Referring to Table 1, pause track 0 represents the conventional scheme; and pause track 1, an embodiment of the present invention.

TABLE 1

| Clock Block (CB) | Clock Frequency (MHz) | Total Number of Recording Field SBs | Track Number (TRNO) | Field Number 0 (FLDNO) | Number of Recording SBs (0) | Field Number 1 (FLDNO) | Number of Recording SBs (1) | Field Number 2 (FLDNO) | Number of Recording SBs (2) | Cumulative Number of SBs | Pause Track 0 | R | Pause Track 1 |
|---|---|---|---|---|---|---|---|---|---|---|---|---|---|
| 0 | 8 | 8 | 0 | 0 | 8 | | | | | 0 | | 16 | |
| | | | 1 | 1 | 8 | | | | | 0 | | 16 | |
| | | | 2 | 2 | 8 | | | | | 0 | | 16 | |
| | | | 3 | 3 | 8 | | | | | 0 | | 16 | |
| | | | 4 | 4 | 8 | | | | | 0 | | 16 | |
| | | | 5 | 5 | 8 | | | | | 0 | | 16 | |
| | | | 6 | 6 | 8 | | | | | 0 | | 16 | |
| | | | 7 | 7 | 8 | | | | | 0 | | 16 | |
| 1 | 9 | 9 | 8 | 8 | 7 | 9 | 1 | | | 1 | | 15 | |
| | | | 9 | 9 | 6 | 10 | 2 | | | 2 | | 14 | |
| | | | 10 | 10 | 5 | 11 | 3 | | | 3 | | 13 | |
| | | | 11 | 11 | 4 | 12 | 4 | | | 4 | | 12 | |
| | | | 12 | 12 | 3 | 13 | 5 | | | 5 | | 11 | |
| | | | 13 | 13 | 2 | 14 | 6 | | | 6 | | 10 | |
| | | | 14 | 14 | 1 | 15 | 7 | | | 7 | | 9→17 | * |
| 2 | 10 | 10 | 15 | 15 | 8 | 16 | 8 | | | 8→0 | * | 16 | |
| | | | 16 | 17 | 6 | 18 | 2 | | | 2 | | 14 | |
| | | | 17 | 18 | 4 | 19 | 4 | | | 4 | | 12 | |
| | | | 18 | 19 | 2 | 20 | 6 | | | 6 | | 10→18 | * |
| | | | 19 | 20 | 8 | 21 | 8 | | | 8→0 | * | 16 | |
| | | | 20 | 22 | 6 | 23 | 2 | | | 2 | | 14 | |
| | | | 21 | 23 | 4 | 24 | 4 | | | 4 | | 12 | |
| 3 | 11 | 11 | 22 | 24 | 2 | 25 | 6 | | | 6 | | 10→18 | * |
| | | | 23 | 25 | 8 | 26 | 8 | | | 8→0 | * | 16 | |
| | | | 24 | 27 | 5 | 28 | 3 | | | 3 | | 13 | |
| | | | 25 | 28 | 2 | 29 | 6 | | | 6 | | 10→18 | * |
| | | | 26 | 29 | 7 | 30 | 8 | 31 | 1 | 9→1 | * | 15 | |
| | | | 27 | 31 | 4 | 32 | 4 | | | 4 | | 12 | |
| | | | 28 | 32 | 1 | 33 | 7 | | | 7 | | 9→17 | * |
| 4 | 12 | 12 | 29 | 33 | 6 | 34 | 8 | 35 | 2 | 10→2 | * | 14 | |
| | | | 30 | 35 | 5 | 36 | 8 | | | 5 | | 11→19 | * |
| | | | 31 | 36 | 3 | 37 | 5 | | | 8→0 | * | 16 | |
| | | | 32 | 38 | 8 | 39 | 8 | | | 4 | | 12→20 | * |
| | | | 33 | 39 | 4 | 40 | 4 | | | 8→0 | * | 16 | |
| | | | 34 | 41 | 8 | 42 | 8 | | | 4 | | 12→20 | * |
| | | | 35 | 42 | 4 | 43 | 4 | | | 8→0 | * | 16 | |
| | | | 36 | 44 | 8 | 45 | 8 | | | 4 | | 12→20 | * |
| 5 | 13 | 13 | 37 | 45 | 4 | 46 | 4 | | | 8→0 | * | 16 | |
| | | | 38 | 47 | 8 | 48 | 8 | | | 4 | | 12→20 | * |
| | | | 39 | 48 | 4 | 49 | 4 | | | 8→0 | * | 16 | |
| | | | 40 | 50 | 8 | 51 | 5 | | | 5 | | 11→19 | * |
| | | | 41 | 51 | 3 | 52 | 8 | 53 | 2 | 10→2 | * | 14 | |
| | | | 42 | 53 | 6 | 54 | 7 | | | 7 | | 9→17 | * |
| | | | 43 | 54 | 1 | 55 | 8 | 56 | 4 | 12→4 | * | 12→20 | * |
| | | | 44 | 56 | 4 | 57 | 8 | 58 | 1 | 9→1 | * | 15 | |
| | | | 45 | 58 | 7 | 59 | 6 | | | 6 | | 10→18 | * |

TABLE 1-continued

| Clock Block (CB) | Clock Frequency (MHz) | Total Number of Recording Field SBs | Track Number (TRNO) | Field Number 0 (FLDNO) | Number of Recording SBs (0) | Field Number 1 (FLDNO) | Number of Recording SBs (1) | Field Number 2 (FLDNO) | Number of Recording SBs (2) | Cumulative Number of SBs | Pause Track 0 | R | Pause Track 1 |
|---|---|---|---|---|---|---|---|---|---|---|---|---|---|
| 6 | 14 | 14 | 46 | 59 | 2 | 60 | 8 | 61 | 3 | 11→3 | * | 13→21 | * |
|   |   |   | 47 | 61 | 5 | 62 | 8 |   |   | 8→0 | * | 16 |   |
|   |   |   | 48 | 63 | 8 | 64 | 6 |   |   | 6 |   | 10→18 | * |
|   |   |   | 49 | 64 | 2 | 65 | 8 | 66 | 4 | 12→4 | * | 12→20 | * |
|   |   |   | 50 | 66 | 4 | 67 | 8 | 68 | 2 | 10→2 | * | 14→22 | * |
|   |   |   | 51 | 68 | 6 | 69 | 8 |   |   | 8→0 | * | 16 |   |
|   |   |   | 52 | 70 | 8 | 71 | 6 |   |   | 6 |   | 10→18 | * |
|   |   |   | 53 | 71 | 2 | 72 | 8 | 73 | 4 | 12→4 | * | 12→20 | * |
|   |   |   | 54 | 73 | 4 | 74 | 8 | 75 | 2 | 10→2 | * | 14→22 | * |
| 7 | 15 | 15 | 55 | 75 | 6 | 76 | 8 |   |   | 8→0 | * | 16 |   |
|   |   |   | 56 | 77 | 8 | 78 | 7 |   |   | 7 |   | 9→17 | * |
|   |   |   | 57 | 78 | 1 | 79 | 8 | 80 | 6 | 14→6 | * | 10→18 | * |
|   |   |   | 58 | 80 | 2 | 81 | 8 | 82 | 5 | 13→5 | * | 11→19 | * |
|   |   |   | 59 | 82 | 3 | 83 | 8 | 84 | 4 | 12→4 | * | 12→20 | * |
|   |   |   | 60 | 84 | 4 | 85 | 8 | 86 | 3 | 11→3 | * | 13→21 | * |
|   |   |   | 61 | 86 | 5 | 87 | 8 | 88 | 2 | 10→2 | * | 14→22 | * |
|   |   |   | 62 | 88 | 6 | 89 | 8 | 90 | 1 | 9→1 | * | 15→23 | * |
| 8 | 16 | 16 | 63 | 90 | 7 | 91 | 8 |   |   | 8→0 | * | 16 |   |
|   |   |   | 64 | 92 | 8 | 93 | 8 |   |   | 8→0 | * | 8→16 | * |
|   |   |   | 65 | 94 | 8 | 95 | 8 |   |   | 8→0 | * | 8→16 | * |
|   |   |   | 66 | 96 | 8 | 97 | 8 |   |   | 8→0 | * | 8→16 | * |
|   |   |   | 67 | 98 | 8 | 99 | 8 |   |   | 8→0 | * | 8→16 | * |
|   |   |   | 68 | 00 | 8 | 01 | 8 |   |   | 8→0 | * | 8→16 | * |
|   |   |   | 69 | 02 | 8 | 03 | 8 |   |   | 8→0 | * | 8→16 | * |
|   |   |   | 70 | 04 | 8 | 05 | 8 |   |   | 8→0 | * | 8→16 | * |
|   |   |   | 71 | 06 | 8 | 07 | 8 |   |   | 8→0 | * | 8→16 | * |

Assume that 1-field data, i.e., 8-SB data, is recorded on each of the 0th to 7th tracks, and these tracks are defined as CB0. In CB0, the data of the 0th to 7th fields, i.e., a total of 8-field data, are recorded.

Assume that 9-SB data are recorded on each of the 8th to 15th tracks, and these tracks are defined as CB1. A total of 9 SBs (8 SBs of the 8th field data+1 SB of the 9th field data) are recorded on the 8th track. SBs are recorded on the subsequent tracks, as indicated by Table 1, and a total of 9 SBs (1 SB of the 15th field data+8 SBs of the 16th field data) are recorded on the 15th track. In CB1, the data of the 8th to 16th fields, i.e., a total of 9-field data, are recorded.

Assume that 10-SB data are recorded on each of the 16th to 23rd tracks, and these tracks are defined as CB2. In CB2, the data of the 17th to 26th fields, i.e., a total of 10-field data, are recorded.

Assume that 11-SB data are recorded on each of the 24th to 31st tracks, and these tracks are defined as CB3. In CB3, the data of the 27th to 37th fields, i.e., a total of 11-field data, are recorded.

Assume that 12-SB data are recorded on each of the 32nd to 39th tracks, and these tracks are defined as CB4. In CB4, the data of the 38th to 49th fields, i.e., a total of 12-field data, are recorded.

Assume that 13-SB data are recorded on each of the 40th to 47th tracks, and these tracks are defined as CB5. In CB5, the data of the 50th to 62nd fields, i.e., a total of 13-field data, are recorded.

Assume that 14-SB data are recorded on each of the 48th to 55th tracks, and these tracks are defined as CB6. In CB6, the data of the 63rd to 76th fields, i.e., a total of 14-field data, are recorded.

Assume that 15-SB data are recorded on each of the 56th to 63rd tracks, and these tracks are defined as CB7. In CB7, the data of the 77th to 91st fields, i.e., a total of 15-field data, are recorded.

Assume that 16-SB data are recorded on each of the 64th to 71st tracks, and these tracks are defined as CB8. In CB8, the data of the 92nd to 107th fields, i.e., a total of 16-field data, are recorded.

With this recording operation, a record having nine clock blocks is completed.

FIGS. 13A to 13J, 14A to 14J, 15A to 15J, 16A to 16J, and 17A to 17J explain the ninth embodiment in the recording scheme shown in FIG. 33 and Table 1. Each of these timing charts shows a field sync signal timing, a track processing signal timing, and a track sync signal timing.

Field numbers and the number of SBs (sync blocks) constituting each field number are shown in correspondence with the field sync signal timing.

Field numbers to be processed between track processing signal timings, and the total numbers of SBs to be recorded on the corresponding tracks are shown in correspondence with these track processing signal timings. These field numbers and total numbers of SBs are temporarily written in the buffer.

A track sync signal is a sync signal which is synchronized with the rotation of the optical disk and is used to record data read out from the buffer on the disk. In this case, the track sync signal is identical to the field sync signal. Field numbers and the numbers of SBs to be recorded between track sync signal timings, and the corresponding track numbers are shown in correspondence with these track sync signal timings. The lowest row shows clock blocks.

The timing at which a pause track indicated by the symbol "*" is generated will be described next.

Referring to pause track 0 in Table 1, the difference between "the number of SBs input to the system per revolution of the optical disk" and "the number of recording SBs" is accumulated, and a pause track is generated every time the cumulative value reaches "the number of input SBs". At this time, "the number of input SBs" is subtracted from the cumulative value. In Table 1, the SB cumulative values are shown on the left side of pause track 0.

Consider pause track 1. Letting CT be the track number in each CB in Table 1, P be the number of recording SBs per track, Q be the number of SBs per track on the innermost periphery, RI be the constant determined by the buffer capacity, and R be the parameter for calculation, RI is substituted into R when CB0 and CT=0.

R–(P–Q) is then substituted into R. If R>P–Q·Int[(P–Q)/Q], no pause track is generated, and CT is incremented. If R≦P–Q·Int[(P–Q)/Q], a pause track is generated. R+Q is then substituted into R, and CT is incremented. This operation is repeated for each CT and each CB. Note that Int[(P–Q)/Q] indicates an integer obtained by rounding off the decimal part of (P–Q)/Q.

For example, in CB0, P=8, Q=8, RI=16, and P–Q·Int[(P–Q)/Q]=8. In an initial state, R=RI=16. Thereafter, R always becomes 16, and no pause track is generated, as shown in FIGS. 13A to 13J.

In CB1, P=9, Q=8, RI=16, and P–Q·Int[(P–Q)/Q]=9. If CT=0, R becomes R–(P–Q)=15. Subsequently, if CT is 1, 2, 3, 4, and 5, R becomes 14, 13, 12, 11, and 10, respectively. During this period, no pause track is generated, as shown in FIGS. 13A to 13J. If CT=6, then R=9. Since R≦9, a pause track is generated for the first time, as shown in FIGS. 14A to 14J. Then, R=17. If CT=7, then R=16, and hence no pause track is generated.

In CB3 shown in FIGS. 14A to 14J and 15A to 15J, P=11, Q=8, RI=16, and P–Q·Int[(P–Q)/Q]=11. If CT=0, R becomes R–(P–Q)=13. If CT=1, R becomes R–(P–Q)=10. Since R≦11, a pause track is generated, and R becomes R+Q=18. If CT=2, R is R–(P–Q)=15. If CT=3, R is R–(P–Q)=12. If CT=4, R is R–(P–Q)=9. Since R≦11, a pause track is generated, and R becomes R+Q=17. If CT=5, R is R–(P–Q)=14. If CT=6, R is R–(P–Q)=11. Since R≦11, a pause track is generated, and R becomes R+Q=19. If CT=6, R is R–(P–Q)=16, and the processing is completed.

That is, in this case, pause tracks are generated when CT is 1, 4, and 6.

Similarly, in CB7, pause tracks are generated at the timings shown in FIGS. 15A to 15J, 16A to 16J, and 17A to 17J.

Finally, in CB8 shown in FIGS. 17A to 17J, P=16, Q=8, RI=16, and P–Q·Int[(P–Q)/Q]=8. If CT=0, R is R–(P–Q)=8. Since R≦8, a pause track is generated, and R becomes R+Q=16. Subsequently, if CT is 1, 2, 3, 4, 5, 6, and 7, R becomes R–(P–Q)=8. Since R≦8, pause tracks are generated at the respective timings, and the processing is terminated.

That is, in this case, a pause track is generated for every track corresponding to CT=0 to 7.

As described above, by substituting proper values into RI, pause tracks can be generated at optimal positions on the optical disk for the jitter absorbing buffer capacity. By inserting pause tracks indicated by the symbol "*" in this manner, the recording operation shown in FIG. 33 can be realized with constant angular velocity rotation.

Consider the used diameter range in FIG. 33. Although the outermost periphery is sufficiently used, a vacant area is present on the innermost periphery. This is because one field per track is determined on the innermost periphery.

By using this vacant area, the recording time or recording bit rate is increased. In order to realize this, (1−α) fields are recorded per track in CB0 on the innermost periphery, instead of recording one field per track. After a little while, a CB in which one field is recorded per track is caused to appear.

Assume that data to be recorded is image data having undergone inter-field fixed length coding, and each field consists of 8 SBs. The optical disk is rotated at 8/7 the field frequency.

The recording area is divided into 10 CBs. In CB0 on the innermost periphery, 7/8 fields are recorded per track, and a total of 7-field data are recorded. In CB1, one field is recorded per track, and a total of 8-field data are recorded. In CBn, (7/8 fields+nSBs) are recorded per track, and a total of (7+n)-field data are recorded. Subsequently, data is recorded in the same manner. In CB9 on the outermost periphery, two fields are recorded per track, and a total of 16-field data are recorded.

Figure 18:
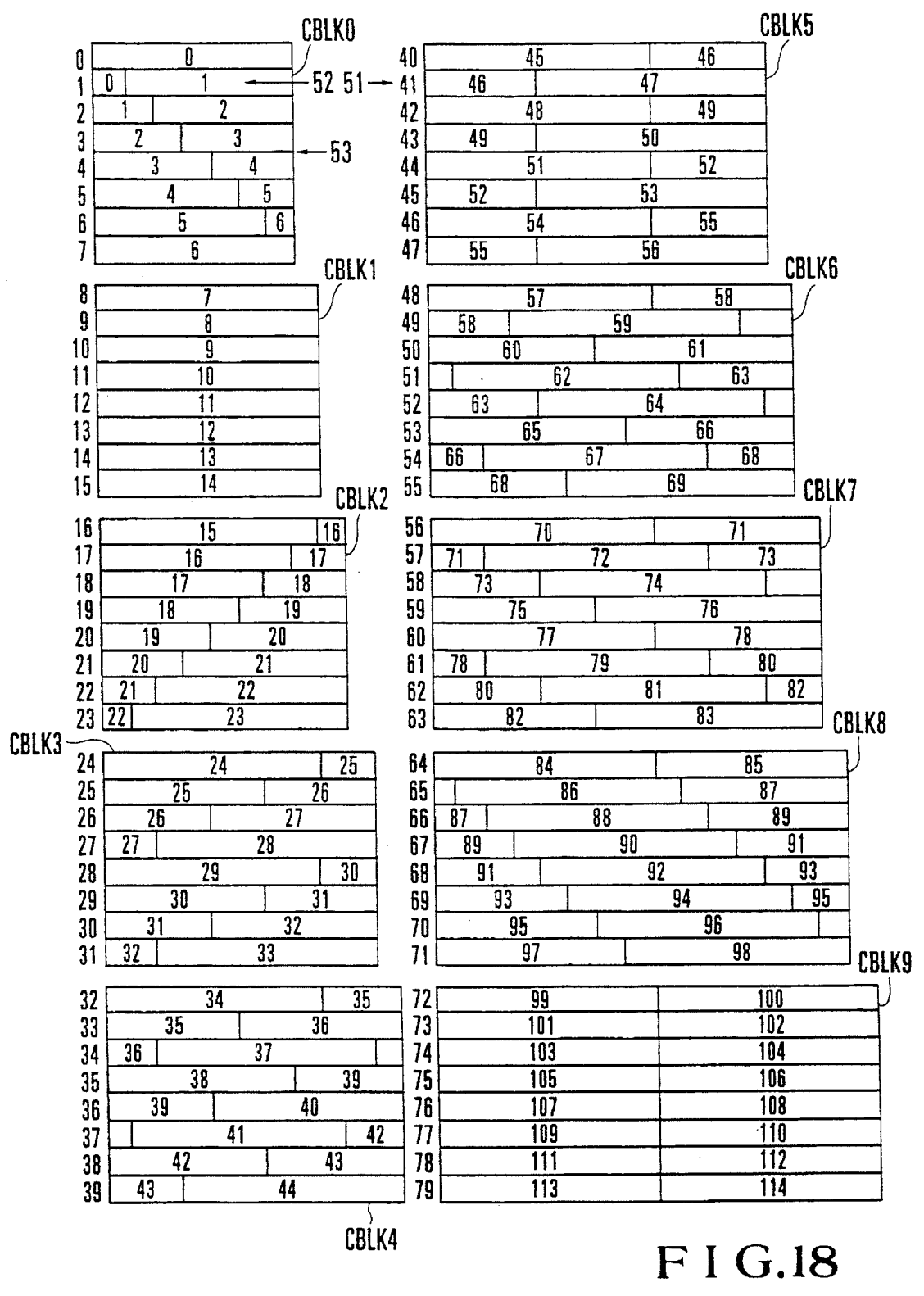

FIG. 18 shows a recording track format. The numerical value indicated by an arrow 51 represents a track number (0 to 79); the numerical value indicated by an arrow 52, a field number (0 to 144); and the numerical value indicated by an arrow 53, a clock block number (CB0 to CB9).

Table 2 shows the recording field numbers on each track, and the number of recording sync blocks (SBs) of each field.

TABLE 2

| Clock Block (CB) | Clock Frequency (MHz) | Total Number of Recording Field SBs | Track Number (TRNO) | Field Number 0 (FLDNO) | Number of Recording SBs (0) | Field Number 1 (FLDNO) | Number of Recording SBs (1) | Field Number 2 (FLDNO) | Number of Recording SBs (2) | Cumulative Number of SBs | Pause Track 0 | R | Pause Track 1 |
|---|---|---|---|---|---|---|---|---|---|---|---|---|---|
| 0 | 7 | 7 | 0 | 0 | 7 | | | | | 0 | | 14 | |
| | | | 1 | 0 | 1 | 1 | 6 | | | 0 | | 14 | |
| | | | 2 | 1 | 2 | 2 | 5 | | | 0 | | 14 | |
| | | | 3 | 2 | 3 | 3 | 4 | | | 0 | | 14 | |
| | | | 4 | 3 | 4 | 4 | 3 | | | 0 | | 14 | |
| | | | 5 | 4 | 5 | 5 | 2 | | | 0 | | 14 | |
| | | | 6 | 5 | 6 | 6 | 1 | | | 0 | | 14 | |
| | | | 7 | 6 | 7 | | | | | 0 | | 14 | |
| | | | 8 | 7 | 8 | | | | | 1 | | 13 | |
| | | | 9 | 8 | 8 | | | | | 2 | | 12 | |
| | | | 10 | 9 | 8 | | | | | 3 | | 11 | |
| | | | 11 | 10 | 8 | | | | | 4 | | 10 | |
| | | | 12 | 11 | 8 | | | | | 5 | | 9 | |
| | | | 13 | 12 | 8 | | | | | 6 | * | 8→15 | |
| | | | 14 | 13 | 8 | | | | | 7→0 | | 14 | |
| | | | 15 | 14 | 7 | | | | | 1 | | 13 | |
| 1 | 8 | 8 | 16 | 15 | 6 | 16 | 1 | | | 3 | | 11 | |
| | | | 17 | 16 | 5 | 17 | 2 | | | 5 | * | 8→15 | * |
| | | | 18 | 17 | 4 | 18 | 3 | | | 7→0 | | 14 | |
| | | | 19 | 18 | 3 | 19 | 4 | | | 2 | | 13 | |
| | | | 20 | 19 | 2 | 20 | 5 | | | 4 | | 11 | |
| | | | 21 | 20 | 1 | 21 | 6 | | | 6 | * | 8→16 | * |
| | | | 22 | 21 | 8 | 22 | 7 | | | 1 | | 14 | |
| 2 | 9 | 9 | 23 | 22 | 6 | 23 | 8 | | | 3 | | 12 | |
| | | | 24 | 24 | 4 | 25 | 2 | | | 5 | | 10 | |
| | | | 25 | 25 | 2 | 26 | 4 | | | 7→0 | * | 8→15 | * |
| | | | 26 | 26 | 8 | 27 | 6 | | | 2 | | 13 | |
| | | | 27 | 27 | 6 | 28 | 8 | | | 4 | | 11 | |
| 3 | 10 | 10 | 28 | 29 | 4 | 30 | 2 | | | 6 | * | 8→15 | * |
| | | | 29 | 30 | 2 | 31 | 4 | | | 8→1 | | 12 | |
| | | | 30 | 31 | 8 | 32 | 6 | | | 3 | | 9→16 | * |
| | | | 31 | 32 | 6 | 33 | 8 | | | 6 | | 13 | |
| | | | 32 | 34 | 4 | 35 | 2 | | | 9→2 | * | 10→17 | * |
| 4 | 11 | 11 | 33 | 35 | 2 | 36 | 4 | | | 5 | | 14 | |
| | | | 34 | 36 | 8 | 37 | 6 | | | 8→1 | * | 11 | |
| | | | 35 | 38 | 5 | 39 | 8 | 38 | 1 | 4 | | 8→15 | * |
| | | | 36 | 39 | 2 | 40 | 4 | | | 7→0 | * | 11→18 | * |
| | | | 37 | 40 | 7 | 41 | 7 | | | 3 | | 14 | |
| 5 | 12 | 12 | 38 | 42 | 4 | 43 | 8 | 42 | 2 | 6 | | 10→17 | * |
| | | | 39 | 43 | 1 | 44 | 5 | | | 9→2 | * | 13 | |
| | | | 40 | 44 | 6 | 46 | 8 | | | 5 | | 9→16 | * |
| | | | 41 | 45 | 3 | 47 | 8 | | | 6 | | 12 | |
| | | | 42 | 47 | 8 | 49 | 4 | | | 10→3 | * | 8→15 | * |
| | | | 43 | 48 | 4 | 50 | 8 | | | 8→1 | * | 11→18 | * |
| | | | 44 | 49 | 8 | 52 | 4 | | | 6 | | 13 | |
| | | | 45 | 51 | 4 | 53 | 8 | | | 11→4 | * | 8→15 | * |
| | | | | | | | | | | 9→2 | * | 10→17 | * |
| | | | | | | | | | | 7→0 | * | 12→19 | * |
| | | | | | | | | | | | | 14 | |
| | | | | | | | | | | 5 | | 9→16 | * |

TABLE 2-continued

| Clock Block (CB) | Clock Frequency (MHz) | Total Number of Recording Field SBs | Track Number (TRNO) | Field Number 0 (FLDNO) | Number of Recording SBs (0) | Field Number 1 (FLDNO) | Number of Recording SBs (1) | Field Number 2 (FLDNO) | Number of Recording SBs (2) | Cumulative Number of SBs | Pause Track 0 | R | Pause Track 1 |
|---|---|---|---|---|---|---|---|---|---|---|---|---|---|
| 6 | 13 | 13 | 46 | 54 | 8 | 55 | 4 | | | 10→3 | * | 11→18 | * |
| | | | 47 | 55 | 4 | 58 | 8 | | | 8→1 | * | 13 | * |
| | | | 48 | 57 | 8 | 58 | 5 | | | 7→0 | | 7→14 | * |
| | | | 49 | 58 | 3 | 59 | 8 | | | 6 | | 8→15 | * |
| | | | 50 | 60 | 6 | 61 | 7 | | | 12→5 | * | 9→16 | * |
| | | | 51 | 61 | 1 | 62 | 8 | 60 | 2 | 11→4 | * | 10→17 | * |
| | | | 52 | 63 | 4 | 64 | 8 | | | 10→3 | * | 11→18 | * |
| | | | 53 | 65 | 7 | 66 | 6 | 63 | 4 | 9→2 | * | 12→19 | * |
| | | | 54 | 66 | 2 | 67 | 8 | 65 | 1 | 8→1 | * | 13→20 | * |
| | | | 55 | 68 | 5 | 69 | 8 | | | 7→0 | * | 14 | |
| 7 | 14 | 14 | 56 | 70 | 8 | 71 | 6 | 68 | 3 | 7→0 | * | 7→14 | * |
| | | | 57 | 71 | 2 | 72 | 8 | | | 7→0 | * | 7→14 | * |
| | | | 58 | 73 | 4 | 74 | 8 | 73 | 4 | 7→0 | * | 7→14 | * |
| | | | 59 | 75 | 6 | 76 | 6 | 75 | 2 | 7→0 | * | 7→14 | * |
| | | | 60 | 77 | 8 | 78 | 8 | | | 7→0 | * | 7→14 | * |
| | | | 61 | 78 | 2 | 79 | 8 | 80 | 4 | 7→0 | * | 7→14 | * |
| | | | 62 | 80 | 4 | 81 | 8 | 82 | 2 | 7→0 | * | 7→14 | * |
| | | | 63 | 82 | 6 | 83 | 8 | | | 7→0 | * | 7→14 | * |
| 8 | 15 | 15 | 64 | 84 | 8 | 85 | 7 | | | 8→1 | * | 6→13 | * |
| | | | 65 | 85 | 1 | 86 | 8 | 87 | 6 | 9→2 | * | 5→12 | * |
| | | | 66 | 87 | 2 | 88 | 8 | 89 | 5 | 10→3 | * | 4→11 | * |
| | | | 67 | 89 | 3 | 90 | 8 | 91 | 4 | 11→4 | * | 3→10 | * |
| | | | 68 | 91 | 4 | 92 | 8 | 93 | 3 | 12→5 | * | 2→9 | * |
| | | | 69 | 93 | 5 | 94 | 8 | 95 | 2 | 13→6 | * | 1→15 | ** |
| | | | 70 | 95 | 6 | 96 | 8 | 97 | 1 | 14→0 | ** | 7→14 | * |
| | | | 71 | 97 | 7 | 98 | 8 | | | 8→1 | * | 6→13 | * |
| 9 | 16 | 16 | 72 | 99 | 8 | 100 | 8 | | | 10→3 | * | 4→11 | * |
| | | | 73 | 101 | 8 | 102 | 8 | | | 12→5 | * | 2→16 | ** |
| | | | 74 | 103 | 8 | 104 | 8 | | | 14→0 | ** | 7→14 | * |
| | | | 75 | 105 | 8 | 106 | 8 | | | 9→2 | * | 5→12 | * |
| | | | 76 | 107 | 8 | 108 | 8 | | | 11→4 | * | 3→10 | * |
| | | | 77 | 109 | 8 | 110 | 8 | | | 13→6 | * | 1→15 | ** |
| | | | 78 | 111 | 8 | 112 | 8 | | | 15→1 | ** | 6→13 | * |
| | | | 79 | 113 | 8 | 114 | 8 | | | 10→3 | * | 4→11 | * |

Assume that ⅞-field data, i.e., 7-SB data, are recorded on each of the 0th to 7th tracks, and these tracks are defined as clock block 0 (CB0). In CB0, the data of the 0th to 6th fields, i.e., a total of 7-field data, are recorded.

Assume that 1-field data, i.e., 8-SB data, is recorded on each of the 8th to 15th tracks, and these tracks are defined as CB1, which corresponds to CB0 in Table 1. In CB1, the data of the 7th to 14th fields, i.e., a total of 8-field data, are recorded.

Assume that 9-SB data are recorded on each of the 16th to 23rd tracks, and these tracks are defined as CB2. A total of 9 SBs (8 SBs of the 15th field data+1 SB of the 16th field data) are recorded on the 16th track. Subsequently, SBs are recorded in the manner shown in FIG. 18, and a total of 9 SBs (1 SB of the 22nd field data+8 SBs of the 23rd field data) are recorded on the 23rd track. In CB2, the data of the 15th to 23rd fields, i.e., a total of 9-field data, are recorded.

Assume that 10-SB data are recorded on each of the 24th to 31st tracks, and these tracks are defined as CB3. In CB3, the data of the 24th to 33rd fields, i.e., a total of 10-field data, are recorded.

Assume that 11-SB data are recorded on each of the 32nd to 39th tracks, and these tracks are defined as CB4. In CB4, the data of the 34th to 44th fields, i.e., a total of 11-field data, are recorded.

Assume that 12-SB data are recorded on each of the 40th to 47th tracks, and these tracks are defined as CB5. In CB5, the data of the 45th to 56th fields, i.e., a total of 12-field data, are recorded.

Assume that 13-SB data are recorded on each of the 48th to 55th tracks, and these tracks are defined as CB6. In CB6, the data of the 57th to 69th fields, i.e., a total of 13-field data, are recorded.

Assume that 14-SB data are recorded on each of the 56th to 63rd tracks, and these tracks are defined as CB7. In CB7, the data of the 70th to 83rd fields, i.e., a total of 14-field data, are recorded.

Assume that 15-SB data are recorded on each of the 64th to 71st tracks, and these tracks are defined as CB8. In CB8, the data of the 84th to 98th fields, i.e., a total of 15-field data, are recorded.

Assume that 16-SB data are recorded on each of the 72nd to 79th tracks, and these tracks are defined as CB9. In CB9, the data of the 99th to 114th fields, i.e., a total of 16-field data, are recorded.

With this recording operation, a record having 10 clock blocks is completed.

In the format shown in FIG. 33, 8 SBs are recorded per track on the innermost periphery. In contrast to this, in the format shown in FIG. 18, data recording on the innermost periphery is started from a rate of 7 SBs per track. Therefore, in comparison with the innermost periphery in FIG. 33, CB0 in FIG. 18 can be on the further inner side, and the recording density can be increased. Note that Table 2 also shows recording clock frequencies.

FIGS. 19A to 19J, 20A to 20J, 21A to 21J, 22A to 22J, and 23A to 23J explain the 10th embodiment in the recording scheme shown in FIG. 18 and Table 2. Each of these timing charts shows a field sync signal timing, a track processing signal timing, and a track sync signal timing.

Field numbers and the number of SBs (sync blocks) constituting each field number are shown in correspondence with the field sync signal timing.

Field numbers to be processed between track processing signals, and the total numbers of SBs to be recorded on the corresponding tracks are shown in correspondence with these track processing signal timings. These field numbers and total numbers of SBs are temporarily written in the buffer.

A track sync signal is a sync signal which is synchronized with the rotation of the optical disk and is used to record data read out from the buffer on the disk. In this case, the track sync signal has ⅞ times the period of the field sync signal. Field numbers and the numbers of SBs to be recorded between track sync signal timings, and the corresponding track numbers are shown in correspondence with these track sync signal timings. The lowest row shows clock blocks.

The timing at which a pause track indicated by the symbol "*" is generated will be described next.

Referring to pause track 0 in Table 2, the difference between "the number of SBs input to the system per revolution of the optical disk" and "the number of recording SBs" is accumulated, and a pause track is generated every time the cumulative value reaches "the number of input SBs". At this time, "the number of input SBs" is subtracted from the cumulative value. In Table 2, the SB cumulative values are shown on the left side of pause track 0. Unlike in Table 1, these cumulative values are not completed in the CBs.

Since the rotational speed of the optical disk corresponds to ⅞ fields, a pause track is generated in even CB1 in which one field is recorded per revolution.

In addition, pause track 0 generated twice on the 70th, 74th, and 78th tracks.

Consider pause track 1. Letting CT be the track number in each CB in Table 2, P be the number of recording SBs per track, Q be the number of SBs per track on the innermost periphery, RI be the constant determined by the buffer capacity, and R be the parameter for calculation, RI is substituted into R when CB0 and CT=0.

R−(P−Q) is then substituted into R. If R>P−Q·Int[(P−Q)/Q], no pause track is generated, and CT is incremented. If R≦P−Q·Int[(P−Q)/Q], a pause track is generated. R+Q is then substituted into R, and CT is incremented. This operation is repeated for each CT and each CB. Note that Int[(P−Q)/Q] indicates an integer obtained by rounding off the decimal part of (P−Q)/Q.

For example, in CB0, P=7, Q=7, RI=14, and P−Q·Int[(P−Q)/Q]=7. In an initial state, R=RI=14. Thereafter, R always becomes 14, and no pause track is generated, as shown in FIGS. 19A to 19J.

In CB1, P=8, Q=7, RI=14, and P−Q·Int[(P−Q)/Q]=8. If CT=0, R becomes R−(P−Q)=13. Subsequently, if CT is 1, 2, 3, and 4, R becomes 12, 11, 10, and 9, respectively. During this period, no pause track is generated. If CT=5, then R=8. Since R≦8, a pause track is generated for the first time, as shown in FIGS. 20A to 20J. Then, R=15. If CT is 6 and 7, R is 14 and 13, respectively, and hence no pause track is generated.

In CB3 shown in FIGS. 20A to 20J and 21A to 21J, P=10, Q=7, RI=11, and P−Q·Int[(P−Q)/Q]=10. If CT=0, R becomes R−(P−Q)=8. Since R≦10, a pause track is generated, and R becomes R+Q =15. If CT=1, R is R−(P−Q)=12. If CT=2, R is R−(P−Q)=9. Since R≦9, a pause track is generated, and R becomes R+Q=16. If CT=3, R is R−(P−Q)=13. If CT=4, R is R−(P−Q)=10. Since R≦10, a pause track is generated, and R becomes R+Q=17. If CT=5, R is R−(P−Q)=14. If CT=6, R is R−(P−Q)=11. If CT=7, R is R−(P−Q)=8. Since R≦10, a pause track is generated, and R becomes R+Q=15. The processing is then terminated.

That is, in this case, pause tracks are generated when CT is 0, 2, 4, and 7.

Similarly, in CB4 to CB8, pause tracks are generated at the timings shown in FIGS. 21A to 21J, 22A to 22J, and 23A to 23J.

Finally, in CB9 shown in FIGS. 23A to 23J, P=16, Q=7, RI=13, and P−Q·Int[(P−Q)/Q]=9. If CT=0, R is R−(P−Q)=4. Since R≦9, a pause track is generated, and R becomes R+Q=11. When CT=1, R is R−(P−Q)=2. Since R≦9, a pause track is generated, and R becomes R+Q=9. Since R≦9, a pause track is generated again, and R becomes R+Q=16. If CT=2, R is R (P−Q)=7. Since R≦9, a pause track is generated, and R becomes R+Q=14. If CT=3, R is R−(P−Q)=5. Since R≦9, a pause track is generated, and R becomes R+Q=12. If CT=4, R is R−(P−Q)=3. Since R≦9, a pause track is generated, and R becomes R+Q=1. Since R≦9, a pause track is generated, and R becomes R+Q=8. Since R≦9, a pause track is generated again, and R becomes R+Q=15. If CT=6, R is R−(P−Q)=6. Since R≦9, a pause track is generated, and R becomes R+Q=13. If CT=7, R is R−(P−Q)=4. Since R≦9, a pause track is generated, and R becomes R+Q=11. The processing is then terminated.

That is, in this case, a pause track is generated twice when CT is 1 and 5, and is generated once in other cases.

As described above, by substituting proper values into RI, pause tracks can be generated at optimal positions on the optical disk for the jitter absorbing buffer capacity. By inserting pause tracks indicated by the symbol "*" in this manner, the recording operation shown in Table 2 can be realized with constant angular velocity rotation.

Consider a case wherein speech signals, error correction codes, sync signals, IDs, and the like are respectively added to a 525/60 signal (a component television signal in the NTSC zone; to be referred to as a 525 signal hereinafter) and a 625/50 signal (a component television signal in the PAL zone; to be referred to as a 625 signal hereinafter), and the resultant signals are recorded on tracks of an optical disk.

Assume that the number of pixels per field is 720×240 (525 signal) and 720×288 (625 signal), and the field frequency is 60/1.001 Hz (525 signal) and 50 Hz (625 signal). In this case, the bit rate ratio between the two signals is 1:1.001. Even in performing data compression, this ratio undergoes no change as long as the compression ratio remains the same.

In this case, a recording format common to the 525 signal and the 625 signal is designed as follows.

① For the 525 signal, the rotational speed of an optical disk is set to be 60/1.001 rps so as to be matched with the field frequency. For the 625 signal, the rotational speed is set to be 60 rps so as to be matched with 6/5 the field frequency. That is, the rotational speed ratio is 1:1.001.

② The video (+audio) bit rat ratio between the 525 signal and the 625 signal is set to be 1:1.001, so is the recording bit rate.

③ The recording time ratio between the 525 signal and the 625 signal is set to be 1.001:1.

Figure 24:
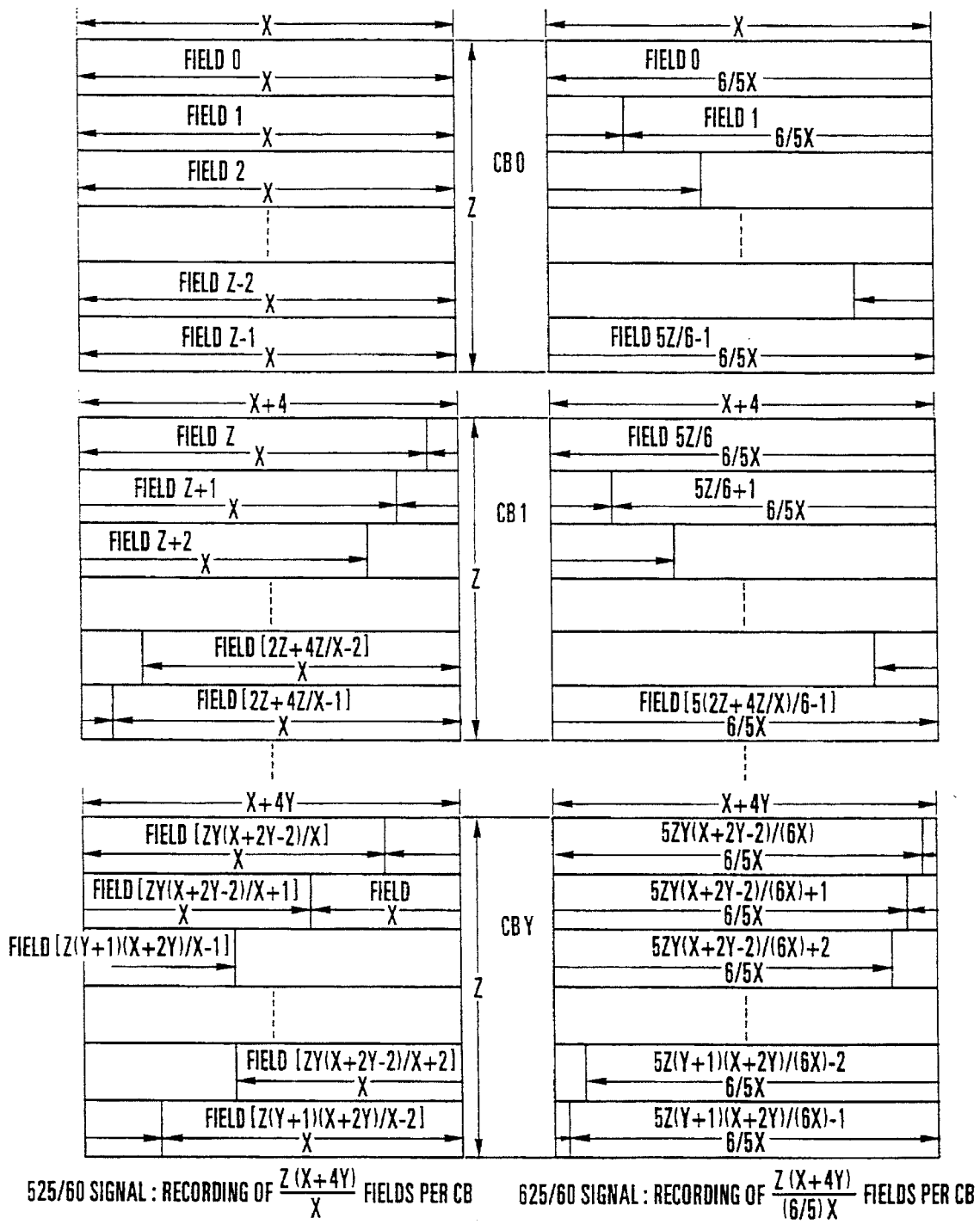
FIG. 24 is a track division chart for recording 1-field data per track on the innermost periphery.

FIG. 24 shows a track division chart, providing that one field is recorded on the innermost periphery per track. It is apparent from FIG. 24, that a common recording format can be formed.

Letting Z be the number of tracks per clock block, X be the number of sync blocks of the 525 signal per field, 6X/5 be the number of sync blocks of the 625 signal per field, and (X+WY) be the number of recording sync blocks per track in the Y clock block, the number of recording fields of the 525 signal per CB is given as Z(X+WY)/X, and the number of fields of the 625 signal per CB is given as Z(X+WY)/(6X/5). In order to make these numbers integral, the numbers of recording fields must satisfy the following conditions, in addition to conditions ① to ③ described above.

④ X, Y, and Z must have the following relations:

(I) Z can be divided by six (matching the boundary of each field with that of each CB (625 signal)).

(II) WZ can be divided by X (making the number of fields per CB integral (525 signal)).

(III) WZ can be divided by 6X/5 (making the number of fields per CB integral (625 signal)).

(IV) X can be divided by W (to facilitate signal processing).

(V) X can be divided by five (to realize a common recording format for the 525 signal and the 625 signal).

Note that condition ④-(IV) need not be satisfied.

In addition, if the boundary of each field need not be matched with that of each CB, conditions ④-(I), ④-(II), and ④-(III) need not be satisfied.

With regard to conditions ④, if, for example, W=4 and X and Z are about 300 to 400, the values of X and Y may be combined as six schemes, as shown in Table 3.

TABLE 3

| Scheme No. | X | (6/5)X | Z |
|---|---|---|---|
| 1 | 300 | 360 | 450 |
| 2 | 320 | 384 | 480 |
| 3 | 340 | 408 | 510 |
| 4 | 360 | 432 | 540 |
| 5 | 380 | 456 | 570 |
| 6 | 400 | 480 | 600 |

In order to clarify the above case, the following conditions are added:

⑤ Providing that an area, of an optical disk having a diameter of 130 mm, which is defined by diameters from 58.6 mm to 120.8 mm is used, the shortest recording wavelength and the track pitch are respectively set to be 0.33 μm and 0.6 μm. In order to attain a recording time of 20 minutes or more on one surface of the optical disk, the number of recording fields is set to be 72,000 or more for the 525 signal; and 60,000 or more for the 625 signal.

⑥ The shortest recording wavelength is minimized throughout the disk surface.

⑦ The recording bit rate is maximized as long as conditions ① to ⑥ are satisfied.

Conditions ① to ⑦ are applied to schemes 1 to 6. Table 4 shows the CBs, the total number of tracks of the optical disk, and the total number of fields which are required for each scheme.

TABLE 4

| Scheme No. | X | (6/5)X | Z | C | T | F (NTSC) | F (PAL) |
|---|---|---|---|---|---|---|---|
| 1 | 300 | 360 | 450 | 98 | 44100 | 72618 | 60515 |
| 2 | 320 | 384 | 480 | 95 | 45600 | 72390 | 60325 |
| 3 | 340 | 408 | 510 | 92 | 46920 | 72036 | 60030 |
| 4 | 360 | 432 | 540 | 90 | 48600 | 72630 | 60525 |
| 5 | 380 | 456 | 570 | 87 | 49590 | 72036 | 60030 |
| 6 | 400 | 480 | 600 | 85 | 51000 | 72420 | 60350 |

In calculating values for Table 4, letting Z be the number of tracks per CB, C be the total number of CBs, T be the total number of tracks with respect to C, and F be the total number of fields, $T = ZC$ $F = ZC + [4Z + 8Z + \ldots + 4Z(C-1)]/X = ZC(X+2C-2)/X;$ 525 signal $F = 5ZC/6 + 5[4Z + 8Z + \ldots + 4Z(C-1)]/6X = 5ZC(X+2C-2)/(6X);$ 625 signal The minimum value of C is obtained from condition ⑤ while F (525 signal)≧72000 and F (625 signal)≧60000 are satisfied. The values of T, F (525 signal), and F (625 signal) are calculated again, and the shortest recording wavelength and recording bit rates are calculated. Table 5 shows an example of scheme 5 as scheme 5-1.

TABLE 5

| Item | Scheme 5-1 | Scheme 5-2 |
|---|---|---|
| Total Number of Tracks | 49590 | 51300 |
| Total Number of CBs | 87 | 60 |
| Number of Tracks per CB | 570 | 570 |
| Number of Recording Fields | 72036 (525/80) | 72090 (525/60) |
| | 60030 (625/50) | 60075 (625/50) |
| Number of SBs per Track | 380–724 | 356–712 |
| Number of SBs per Field | 380 (525/60) | 380 (525/60) |
| | 456 (625/50) | 456 (625/50) |
| Number of Symbols per SB | 184 | 188 |
| Used Diameter Range | 61.292–120.800 mmφ | 59.240–120.800 mmφ |
| Video (Audio) Bit Rate | 28.625 Mbps (525/60) | 29.324 Mbps (525/60) |
| | 28.654 Mbps (625/50) | 29.353 Mbps (625/50) |
| Recording Bit Rate | 33.528 Mbps (525/60) | 34.257 Mbps (525/60) |
| | 33.562 Mbps (625/50) | 34.291 Mbps (625/50) |
| Recording Time | 1201.80 sec (525/60) | 1202.70 sec (525/60) |
| | 1200.60 sec (625/50) | 1201.50 sec (625/50) |

Figure 25:
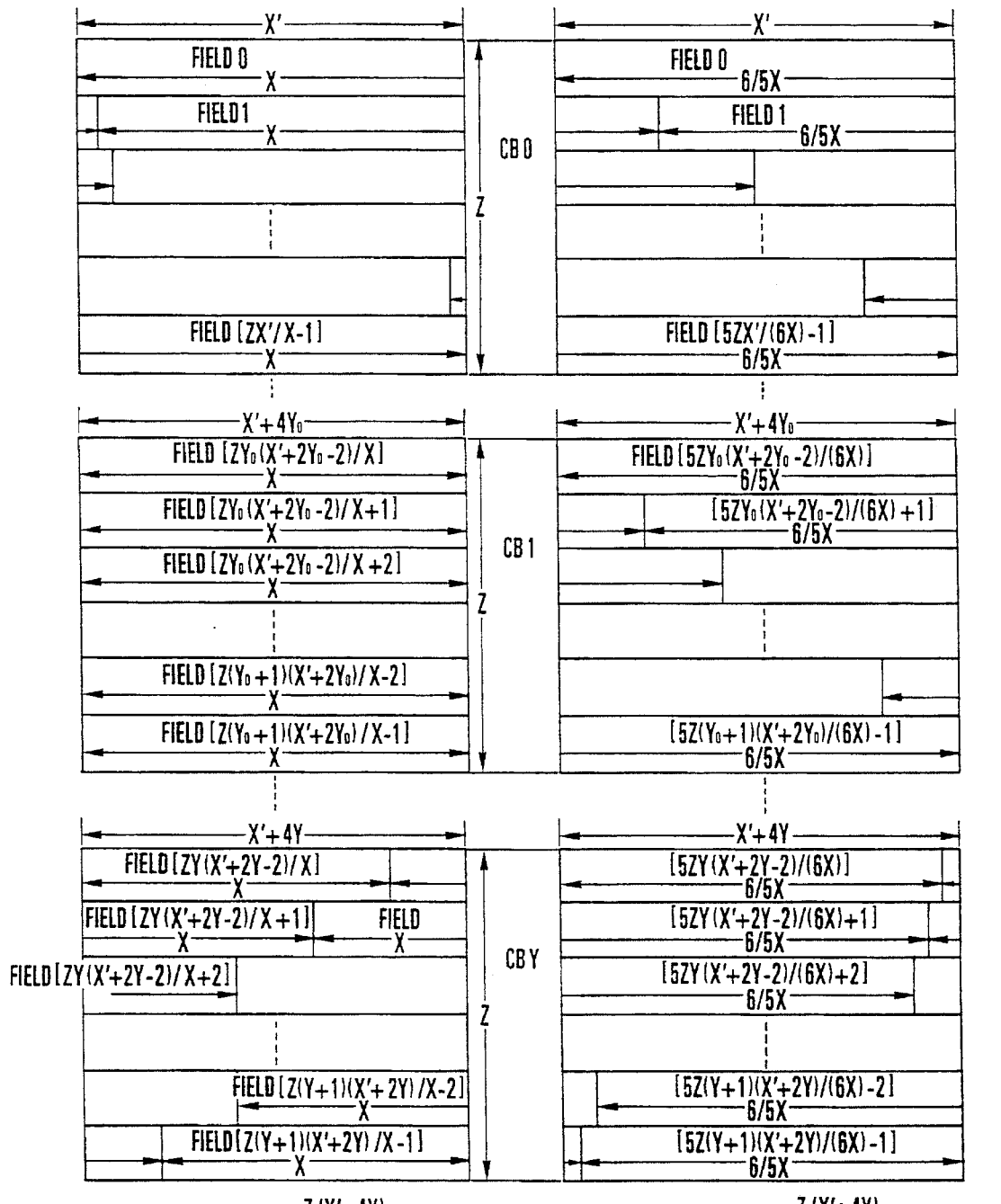
FIG. 25 is a track division chart for recording 1-field data per (1+α) tracks on the innermost periphery.

With regard to a common format for the 525 signal and the 625 signal, a vacant area of the innermost periphery is used to increase the recording bit rates. FIG. 25 shows a track division chart.

Referring to FIG. 25, let Z be the number of tracks per clock block, X be the number of sync blocks of the 525 signal per field, (6/5)X be the number of sync blocks of the 625 signal per field, and (X'+WY) be the number of recording sync blocks per track in the Y clock block. In this case, X' represents the number of sync blocks per track on the innermost periphery, and X'<X.

In innermost CB0 for the 525 signal, since X'<X, (1−α)-field data is written per track. Thereafter, in CBY$_0$, 1-field data is written per track. In this case, Y$_0$=(X−X')/W. Subsequently, (1−α)-field data is written per track.

For the 525 signal, the number of recording fields per CB is Z(X'+WY)/X. For the 625 signal, the number of recording fields per CB is Z(X'+WY)/(6X/5). In order to make these numbers integral, the following conditions ④' corresponding to the conditions ④ are obtained, in addition to conditions ① to ③:

④", X, X', Y, and Z must have the following relations:
(I) Z can be divided by six.
(II) WZ can be divided by X.
(III) WZ can be divided by 6X/5.
(IV) X' can be divided by W.
(V) X can be divided by five.
Note that condition ④-(IV) need not be satisfied.

In addition, if the boundary of each field need not be matched with that of each CB, conditions ④'-(I), ④'-(II), and ④'-(III) need not be satisfied.

With regard to conditions ④', if, for example, W=4 and X and Z are about 300 to 400, the values of X and Y may be combined as six schemes. The above conditions, including X'=356, are applied to the scheme based on scheme 5-1 in table 5. The result is shown as scheme 5-2 in Table 5. In Table 5, the diameter of the innermost periphery is 61.292 mm in scheme 5-1; and 59.240 mm in scheme 5-2. That is, scheme 5-2 allows more efficient use of the inner peripheral portion of the optical disk.

Figure 26:
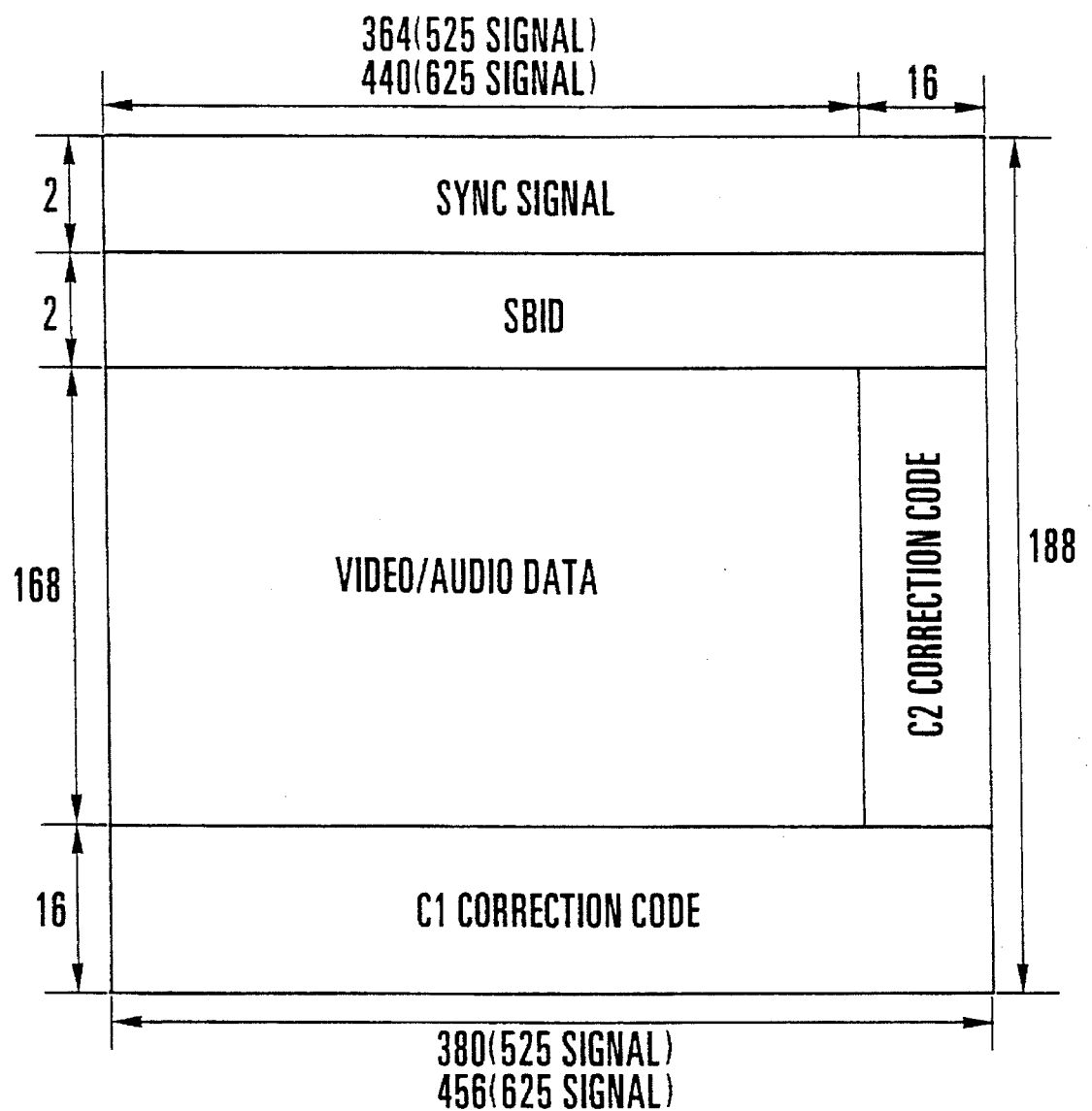
FIG. 26 is a field data map corresponding to scheme 5-2 in Table 5.

FIG. 26 shows a field data format for realizing scheme 5-2 in Table 5. One sync block consists of a 2-byte sync signal, a 2-byte SBID (sync block ID code), 168-byte video/audio data, and a 16-byte C1 correction code, i.e., a total of 188 bytes in the vertical direction. One field consists of 380 sync blocks.

The relationship between the following values in scheme 5-2 in Table 5 will be described: track number TR, clock block number CB, an increase W in the number of SBs recorded per track in each CB, X, X', and Z in FIG. 25, field numbers F0, F1, and F2 recorded on track TR, and the numbers (SB0, SB1, and SB2) of recording sync blocks with respect to the respective fields. For the 525 signal, $$N = \frac{X' + W \cdot CB}{X} [TR \bmod Z] + \quad (1)$$

$$\frac{Z}{X} [X' \cdot CB + 2 \cdot CB(CB-1)]$$

F0=Int(N), F1=F0+1, F2=F0+2, and FF=N−F0. In this case,
If FF=0 and X'+W·CB≧X, then SB0=X, SB1=X'+W·CB−X, and SB2=0. If FF=0 and X'+W·CB<X, then SB0=X'+W·CB, SB1=0, and SB2=0.
Also,
If FF≠0 and X'+W·CB<X·(1−FF), then SB0=X'+W·CB, SB1=0, and SB2=0. If FF≠0 and X'+W·CB≧X·(1−FF) and X'+W·CB−X·(1−FF)≧X, then SB0=X·(1−FF), SB1=X, and SB2=X'+W·CB−X·(1−FF)−X. If FF≠0, X'+W·CB≧X·(1−FF), and X'+W·CB−X·(1−FF)<X, then SB0=X·(1−FF), SB1=X'+W·CB−X·(1−FF), and SB2=0.
For the 625 signal, $$N = \frac{X' + W \cdot CB}{6X/5} [TR \bmod Z] + \quad (2)$$

$$\frac{Z}{6X/5} [X' \cdot CB + 2 \cdot CB(CB-1)]$$

F0=Int(N), F1=F0+1, F2=F0+2, and FF=N−F0. In this case,
if FF=0 and X'+W·CB≧6X/5, then SB0=6X/5, SB1=X'+W·CB−6X/5, and SB2=0. If FF=0 and X'+W·CB<6X/5, then SB0=X'+W·CB, SB1=0, and SB2=0.
Also,
If FF≠0 and X'+W·CB<(6X/5)·(1−FF), then SB0=X'+W·CB, SB1=0, and SB2=0.
If FF≠0, X'+W·CB≧(6X/5)·(1−FF), and X'+W·CB−(6X/5)·(1−FF)≧6X/5, then SB0=(6X/5)·(1−FF), SB1=6X/5, and SB2=X'+W·CB−(6X/5)·(1−FF)−6X/5. If FF≠0, X'+W·CB≧(6X/5)·(1−FF), and X'+W·CB−(6X/5)·(1−FF)<6X/5, then SB0=(6X/5)·(1−FF), SB1=X'+W·CB−(6X/5)·(1−FF), and SB2=0.

The relationship in scheme 5-2 in Table 5 will be described. In the above equation, W=4, X=380, X'=356, and 6X/5=456. For the 525 signal, the relationship between track number TR, clock block number CB, fields F0, F1, and F2, and the numbers (SB0, SB1, and SB2) of recording sync blocks with respect to the respective fields is represented as follows:

$$N = \frac{356 + 4 \cdot CB}{380} [TR \bmod 570] + \quad (3)$$

$$\frac{570}{380} [356 \cdot CB + 2 \cdot CB(CB-1)]$$

F0=Int(N), F1=F0+1, F2=F0+2, and FF=N−F0. In this case, if FF=0 and 356+4·CB≧380, then SB0=380, SB1=356+ 4·CB−380, and SB2=0. If FF=0 and 356+4·CB<380, then SB0=356+4·CB, SB1=0, and SB2=0.

Also, if FF≠0 and 356+4·CB<380·(1−FF), then SB0=356+ 4·CB, SB1=0, and SB2=0. If FF≠0, 356+ 4·CB≧380·(1−FF), and 356+4·CB−380·(1−FF)≧380, then SB0=380·(1−FF), SB1=380, and SB2=356+ 4·CB−380·(1−FF)−380. If FF≠0, 356+4·CB≧380·(1−FF), and 356+4·CB−380·(1−FF)<380, then SB0= 380·(1−FF), SB1=356+4·CB−380·(1−FF), and SB2=0.

For the 625 signal, $$N = \frac{356 + 4 \cdot CB}{458} [TR \bmod 570] + \frac{570}{458} [356 \cdot CB + 2 \cdot CB(CB-1)] \quad (4)$$

F0=Int(N), F1=F0+1, F2=F0+1, and FF=N−F0. In this case, if FF=0 and 356+4·CB≧456, then SB0=456, SB1=356+ 4·CB−456, and SB2=0. If FF=0 and 356+4·CB<456, then SB0=356+4·CB, SB1=0, and SB2=0.

Also, if FF≠0 and 356+4·CB<456·(1−FF), SB0=356+4·CB, SB1=0, and SB2=0. If FF≠0, 356+4·CB≧456·(1−FF), and 356+4·CB−456·(1−FF)≧456, then SB0=456·(1−FF), SB1=456, and SB2=356+4·CB−456·(1−FF)−456. If FF≠0, 356+4·CB≧456·(1−FF), and 356+4·CB−456·(1−FF)<456, then SB0=456·(1−FF), SB1=356+ 4·CB−456·(1−FF), and SB2=0.

Shuffling will be described next.

When, for example, non-compressed image data is to be recorded on an optical disk or the like, shuffling is generally performed in units of pixels. When, however, image data compressed by a compression scheme such as a DCT+ intrafield fixed length coding scheme represented by JPEG is to be recorded, shuffling is performed in units of macro-blocks.

In this case, a macro-block is constituted by, e.g., a luminance (Y) signal consisting of 2 blocks (horizontal)×2 blocks (vertical), each block consisting of 8 pixels×8 lines, and color difference (U and V) signals consisting of 2 blocks and sampled in an amount half that of the Y signal in the horizontal and vertical direction, i.e., a total of 6 blocks.

Such an arrangement is employed because when an error which cannot be corrected occurs in a recording device, the recording efficiency can be improved by intensively performing interpolation in a macro-block. Macro-block numbers MBs are assigned downward from the upper left to the upper right on a frame. The 525 signal includes 720×240 pixels and 675 macro-blocks per field. The 625 signal includes 720×288 pixels and 810 macro-blocks per field. If the recording order is represented by RC in this case, RC=(32·MB)mod 675; 525 signal RC=(37·MB)mod 810; 625 signal As described above, shuffling of the 525 signal and the 625 signal is performed in units of fields and macro-blocks independently of tracks. In addition, shuffling of the 525 signal and the 625 signal can be performed by using almost identical equations.

Figure 28:
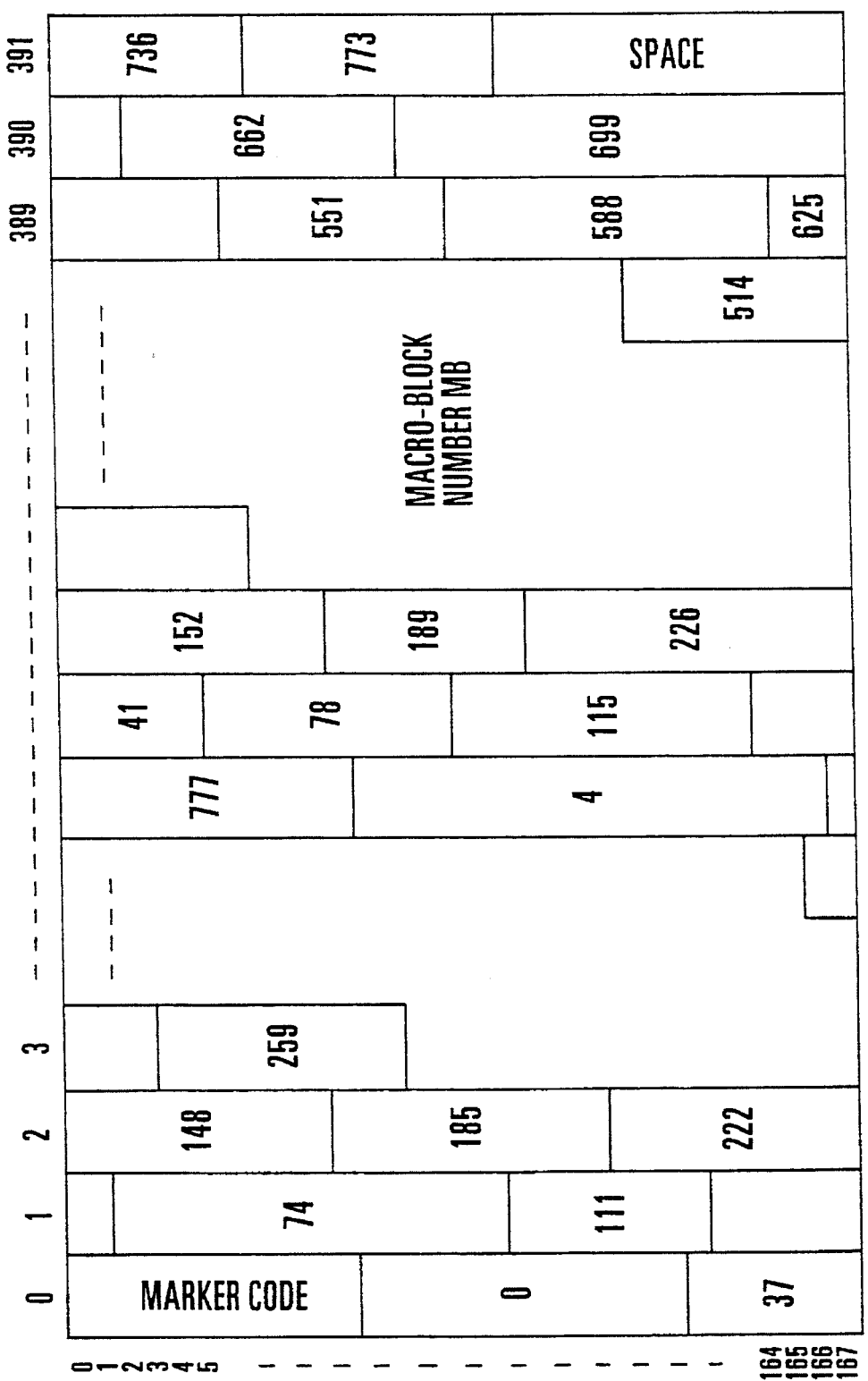
FIG. 28 is a view showing another example of shuffling for the 525 signal.

FIG. 27 shows an example of shuffling of the 525 signal. FIG. 28 shows an example of shuffling of the 625 signal. The numerical values in FIGS. 27 and 28 are macro-block numbers MB. The recording orders are based on RC. FIGS. 27 and 28 respectively show 320 columns (525 signal) and 392 columns (625 signal), which are obtained by extracting only the video area from the arrangement shown in FIG. 26.

As described above, according to the present invention, the recording area is divided into m equal areas in the track direction, and 1-field or (1−α)-field (0<α<1) data is recorded per track on the 0th area as the innermost periphery. The amount of data to be recorded on the first and subsequent areas is increased by W blocks per track. With this operation, the inner peripheral portion of the optical disk can be effectively used to allow high-efficiency use of the optical disk and high-capacity recording.

In addition, when the optical disk rotates at a constant angular velocity, a track number in one recording area is represented by CT; the number of recording blocks per track, P; the number of recording blocks per track on the innermost periphery, Q; and the constant determined by the buffer capacity, RI. A pause track is determined from CT, P, Q, and RI. Therefore, by adjusting RI, the optimal pause tracks for the jitter absorbing buffer capacity can be generated.

The rotational speed ratio between the 526/60 component television signal and the 625/50 component television signal is set to be 1:1.001; the video (+audio) bit rate ratio, 1:1.001; and the recording time ratio, 1.001:1. With this arrangement, the requirement for a common recording format for the 525 signal and the 625 signal can be satisfied.

Furthermore, since shuffling is performed in units of macro-blocks within a field, the optimal shuffling for this recording scheme can be performed.

Double-speed reproduction, half-speed reproduction, and the like will be described next.

When data recorded in the recording track format shown in FIG. 33 or 18 is to be reproduced by a variable speed reproduction scheme such as a double- or half-speed reproduction scheme, complicated reproduction control is required. When, for example, data recorded in the recording track format shown in FIG. 33 is to be reproduced by the double-speed reproduction scheme, reproduction may be controlled such that track jumps are performed to reproduce only even-numbered fields. However, since the amount of data per track increases for each clock block, and 1-field data is separately recorded on two tracks more often, complicated control is required to reproduce data while performing track jumps. For this reason, some data portions are not reproduced to degrade the image quality. Especially when compressed image is to be reproduced, since important information associated with data compression is arranged on the start portion of each field data, considerable degradation in image quality occurs when the data on such start portions are not reproduced.

Assume that data is recorded in the recording track format shown in FIG. 18 while the rotational speed of the optical disk is set to be different from the field frequency. In this case, reproduction control is further complicated, and the ratio of field data which is not reproduced increases, resulting in further degradation in image quality.

The 11th embodiment designed to perform variable speed reproduction will be described below with reference to the accompanying drawings. Since an optical disk apparatus of the 11th embodiment has the same arrangement as that shown in FIG. 10, a description thereof will be omitted. A pause track generator 5b and a repeat track generator 8b shown in FIG. 10 respectively generate a pause track control signal Cw2 and a repeat track control signal Cr2 at the following timings to perform recording/reproduction control.

Double-speed reproduction in the recording track format shown in FIG. 33 will be described first. Assume that double-speed reproduction is performed by reproducing only even-numbered fields.

Figure 29:
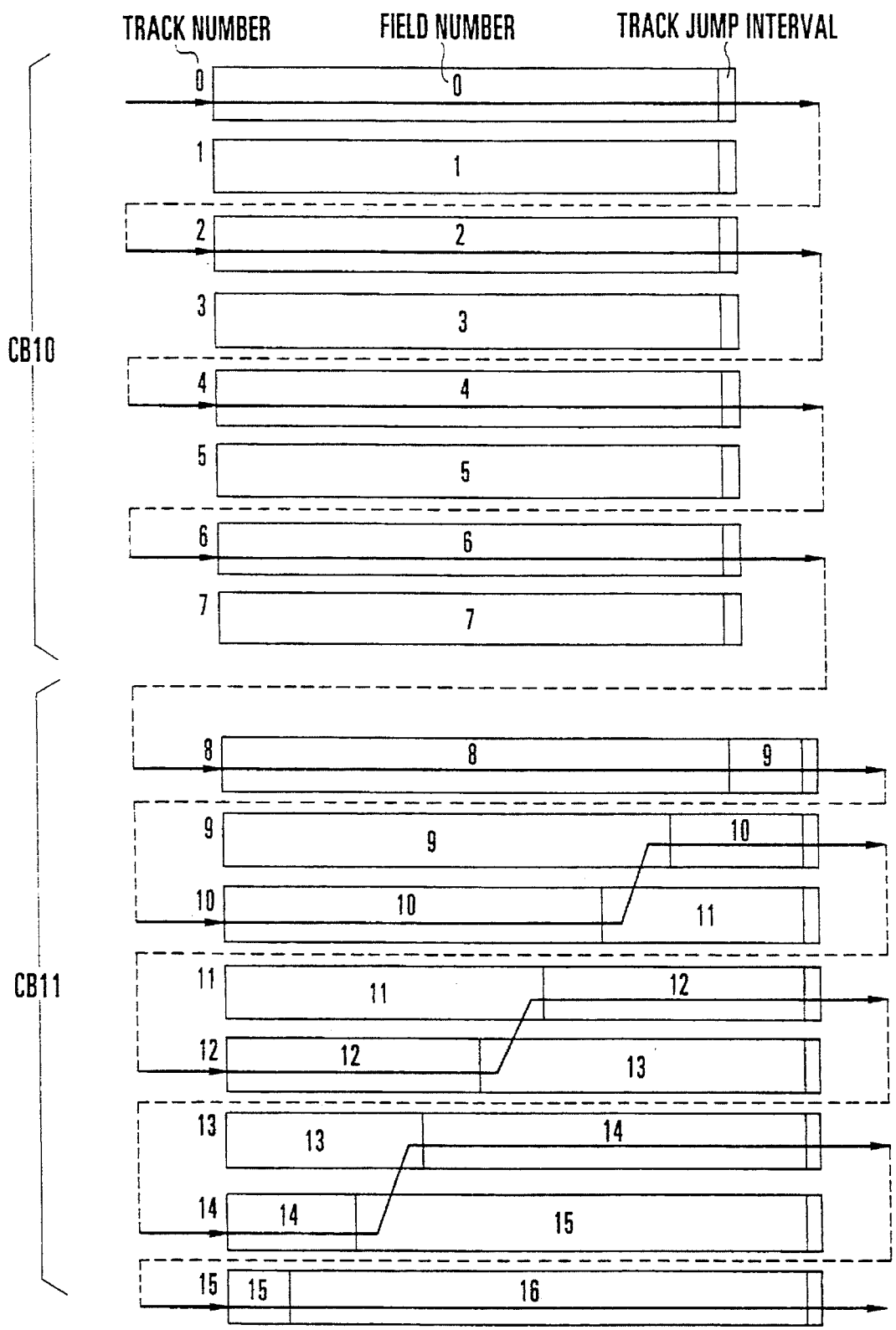
FIG. 29 is a timing chart showing double-speed reproduction based on the track format shown in FIG. 33 and Table 6 to explain the 11th embodiment of the present invention.

In CB10, as shown in FIG. 29, after field #0 is reproduced by scanning track #0, one track jump is performed in a track jump interval arranged at the end of each track, and field #2 is reproduced by scanning track #2. Subsequently, reproduction after one track jump is repeated in the same manner to reproduce even-numbered fields #0, #2, #4, and #6.

In the next CB11, after field #8 is reproduced by scanning track #8, one track jump is performed in a track jump interval, and the second half of field #10 is reproduced from track #10. Upon completion of this reproduction, the optical head is moved backward by one track to reproduce the first half of field #10 from track #10. In this case, a track jump from track #10 to track #9 is completed within the interval between the end of reproduction of the second half of field #10 from track #10 and the start of reproduction of the first half of field #10 from track #9, thereby always allowing reproduction from the start portion of field data. This is because important information is arranged on the start portion of each field data in many cases. For example, in compressed image data, information associated with data compression is arranged on the start portion of each field data.

Subsequently, a 2-track jump is performed in a track jump interval to jump to track #12 to reproduce the second half of field #12. Upon completion of this reproduction, the optical head is moved backward by one track to reproduce the first half of field #12 from track #11. Thereafter, a track jump and a repeat track operation are performed with respect to even-numbered field #14 separately recorded on two tracks to reproduce the second half and the first half of field #14. Finally, track #15 is scanned to reproduce field #16.

In CB12 and the subsequent CBs, track jumps and repeat track operations are performed in the same manner as described above to reproduce even-numbered fields.

TABLE 6

| Clock Block (CB) | Total Number Recording Fields | Track Number | Double-speed Reproduction Field Number/Track Number | Quadruple-speed Reproduction Field Number/Track Number | Slow Reproduction Field Number/Track Number | Field Number/Track Number |
|---|---|---|---|---|---|---|
| 10 | 8 | 0 | • 0/0 | • 0/0 | ▲ 0/0 | |
|  |  | 1 |  |  | ▲ 1/1 | |
|  |  | 2 | • 2/2 |  | ▲ 2/2 | |
|  |  | 3 |  |  | ▲ 3/3 | |
|  |  | 4 | • 4/4 | • 4/4 | ▲ 4/4 | |
|  |  | 5 |  |  | ▲ 5/5 | |
|  |  | 6 | • 6/6 |  | ▲ 6/6 | |
|  |  | 7 |  |  | ▲ 7/7 | |
| 11 | 9 | 8 | • 8/8 | • 8/8 | ▲ 8/8 | |
|  |  | 9 |  |  | ▲ 9/9→8 | |
|  |  | 10 | • 10/10→9 |  | ▲ 10/10→9 | |
|  |  | 11 |  |  | ▲ 11/11→10 | |
|  |  | 12 | • 12/12→11 | • 12/12→11 | ▲ 12/12→11 | |
|  |  | 13 |  |  | ▲ 13/13→12 | |
|  |  | 14 | • 14/14→13 |  | ▲ 14/14→13 | |
|  |  | 15 | • 16/15 | • 16/15 | ▲ 15/15→14 | ▲ 16/15 |
| 12 | 10 | 16 |  |  | ▲ 17/16 | |
|  |  | 17 | • 18/17→16 |  | ▲ 18/17→16 | |
|  |  | 18 |  |  | ▲ 19/18→17 | |
|  |  | 19 | • 20/19→18 | • 20/19→18 | ▲ 20/19→18 | |
|  |  | 20 | • 22/20 |  | ▲ 22/20 | ▲ 21/19 |
|  |  | 21 |  |  | ▲ 23/21→20 | |
|  |  | 22 | • 24/22→21 | • 24/22→21 | ▲ 24/22→21 | |
|  |  | 23 | • 26/23 |  | ▲ 25/23→22 | ▲ 26/23 |
| 13 | 11 | 24 |  |  | ▲ 27/24 | |
|  |  | 25 | • 28/25→24 | • 28/25→24 | ▲ 28/25→24 | |
|  |  | 26 | • 30/26 |  | ▲ 29/26→25 | ▲ 30/26 |
|  |  | 27 |  |  | ▲ 31/27 | |
|  |  | 28 | • 32/28→27 | • 32/28→27 | ▲ 32/28→27 | |
|  |  | 29 | • 34/29 |  | ▲ 33/29→28 | ▲ 34/29 |
|  |  | 30 |  |  | ▲ 35/30→29 | |
|  |  | 31 | • 36/31→30 | • 36/31→30 | ▲ 36/31→30 | ▲ 37/31 |
| 14 | 12 | 32 | • 38/32 |  | ▲ 38/32 | |
|  |  | 33 | • 40/33 |  | ▲ 39/33→32 | ▲ 40/33 |
|  |  | 34 |  |  | ▲ 41/34 | |
|  |  | 35 | • 42/35→34 |  | ▲ 42/35→34 | ▲ 43/35 |
|  |  | 36 | • 44/36 | • 44/36 | ▲ 44/36 | |
|  |  | 37 | • 44/37 |  | ▲ 45/37→36 | ▲ 46/37 |
|  |  | 38 |  |  | ▲ 47/38 | |
|  |  | 39 | • 48/39→38 | • 48/39→38 | ▲ 48/39→38 | ▲ 49/38 |
| 15 | 13 | 40 | • 50/40 |  | ▲ 50/40 | |
|  |  | 41 | • 52/41 | • 52/41 | ▲ 51/41→40 | ▲ 52/41 |
|  |  | 42 |  |  | ▲ 53/42→41 | |
|  |  | 43 | • 54/43→42 |  | ▲ 54/43→42 | ▲ 55/43 |
|  |  | 44 | • 56/44→43 | • 56/44→43 | ▲ 56/44→43 | ▲ 57/44 |
|  |  | 45 | • 58/45→44 |  | ▲ 58/45→44 | |
|  |  | 46 | • 60/46 | • 60/46 | ▲ 59/46→45 | ▲ 60/46 |
|  |  | 47 | • 62/47 |  | ▲ 61/47→46 | ▲ 62/47 |
| 16 | 14 | 48 |  |  | ▲ 63/48 | |
|  |  | 49 | • 64/49→48 | • 64/49→48 | ▲ 64/49→48 | ▲ 65/49 |
|  |  | 50 | • 66/50→49 |  | ▲ 66/50→49 | ▲ 67/50 |
|  |  | 51 | • 68/51→50 | • 68/51→50 | ▲ 68/51→50 | ▲ 69/51 |

TABLE 6-continued

| Clock Block (CB) | Total Number Recording Fields | Track Number | Double-speed Reproduction Field Number/Track Number | Quadruple-speed Reproduction Field Number/Track Number | Slow Reproduction Field Number/Track Number | Slow Reproduction Field Number/Track Number |
|---|---|---|---|---|---|---|
| | | 52 | ● 70/52 | | ▲ 70/52 | |
| | | 53 | ● 72/53 | ● 72/53 | ▲ 71/53→52 | ▲ 72/53 |
| | | 54 | ● 74/54 | | ▲ 73/54→53 | ▲ 74/54 |
| | | 55 | ● 76/55 | ● 76/55 | ▲ 75/55→54 | ▲ 76/55 |
| 17 | 15 | 56 | | | ▲ 77/56 | |
| | | 57 | ● 78/57→56 | | ▲ 78/57→56 | ▲ 79/57 |
| | | 58 | ● 80/58→57 | ● 80/58→57 | ▲ 80/58→57 | ▲ 81/58 |
| | | 59 | ● 82/59→58 | | ▲ 82/59→58 | ▲ 83/59 |
| | | 60 | ● 84/60→59 | ● 84/60→59 | ▲ 84/60→59 | ▲ 85/60 |
| | | 61 | ● 86/61→60 | | ▲ 86/61→60 | ▲ 87/61 |
| | | 62 | ● 88/62→61 | ● 88/62→61 | ▲ 88/62→61 | ▲ 89/62 |
| | | 63 | ● 90/63→62 | | ▲ 90/63→62 | ▲ 91/63 |
| 18 | 16 | 64 | ● 92/64 | ● 92/64 | ▲ 92/64 | ▲ 93/64 |
| | | 65 | ● 94/65 | | ▲ 94/65 | ▲ 95/65 |
| | | 66 | ● 96/66 | ● 96/66 | ▲ 96/66 | ▲ 97/66 |
| | | 67 | ● 98/67 | | ▲ 98/67 | ▲ 99/67 |
| | | 68 | ● 100/68 | ● 100/68 | ▲ 100/68 | ▲ 101/68 |
| | | 69 | ● 102/69 | | ▲ 102/69 | ▲ 103/69 |
| | | 70 | ● 104/70 | ● 104/70 | ▲ 104/70 | ▲ 105/70 |
| | | 71 | ● 108/71 | | ▲ 106/71 | ▲ 107/71 |

Table 6 shows "double-speed reproduction", "quadruple-speed reproduction", and "slow reproduction" in the recording track format shown in FIG. 33. In Table 6, data to be reproduced are indicated by reproduction field numbers and scanning track numbers in each clock block. In this case, each of the symbols "●" in the columns of "double-speed reproduction" and "quadruple-speed reproduction" indicates the first track to be scanned upon a track jump, and numerals "A/B→C" written beside this symbol indicate that track #B is scanned first, and the optical head jumps first to track #C to reproduce field #A. For example, in the column of "double-speed reproduction", "●18/17→16" is written with respect to track #17 of CB12. This indicates that in order to reproduce field #18, track #17 is scanned first to reproduce the second half data of field #18, and the optical head is then moved backward by one track to scan track #16 to reproduce the second half of field #18.

As described above, when field data to be reproduced is recorded within one track, the track is scanned to reproduce the data. When field data to be reproduced is separately recorded on two tracks, the optical head jumps first to a track including the second half of the field data to reproduce the second half data, and then moves backward by one track to reproduce the first half, starting from the start portion of the field data which contains important information. With this operation, double-speed reproduction can be performed without degrading the image quality. Note that if control information such as track addresses for reproduction and track numbers to which the optical head is to jump is stored in a recording device such as ROM in advance, double-speed reproduction control can be reliably executed.

Quadruple-speed reproduction in the recording track format shown in FIG. 33 will be described next.

In quadruple-speed reproduction, the track jump width is set to be larger than that in double-speed reproduction, and data is reproduced by properly performing repeat track operations, while the data of even-numbered field data is thinned out by 50%. As shown in the column of "quadruple-speed reproduction" in Table 6, for example, in CB10, after field #0 is reproduced by scanning track #0, a 4-track jump is performed to scan track #4 to reproduce field #4. In the next CB11, after field #8 is reproduced by scanning track #8, the optical head jumps to track #12 to reproduce the second half of field #12. Upon completion of this reproduction, the optical head is moved backward by one track to reproduce the first half of field #12 from track 11, starting from the start portion of the field data. Thereafter, the optical head jumps to track #15 to reproduce field #16. In CB12 and the subsequent CBs, data is reproduced in the same manner as described above.

In general, in k-fold-speed reproduction (k is an integer equal to or larger than two), reproduction may be performed in the same manner as described above upon thinning out field data for every k fields. In this case, if control information such as track addresses for reproduction and track numbers to which the optical head is to jump is stored in a recording device such as ROM in advance, k-fold-speed reproduction control can be reliably executed.

Half-speed reproduction in the recording track format shown in FIG. 33 will be described next.

In half-speed reproduction, each field may be reproduced twice. In this case, when field data to be reproduced is separately recorded on two tracks, a track including the second half of the field data is scanned first to reproduce the second half data, and the optical head is then moved backward by one track to reproduce the first half of the field data, starting from the start portion of the field data. This operation is repeated twice.

Figure 30:
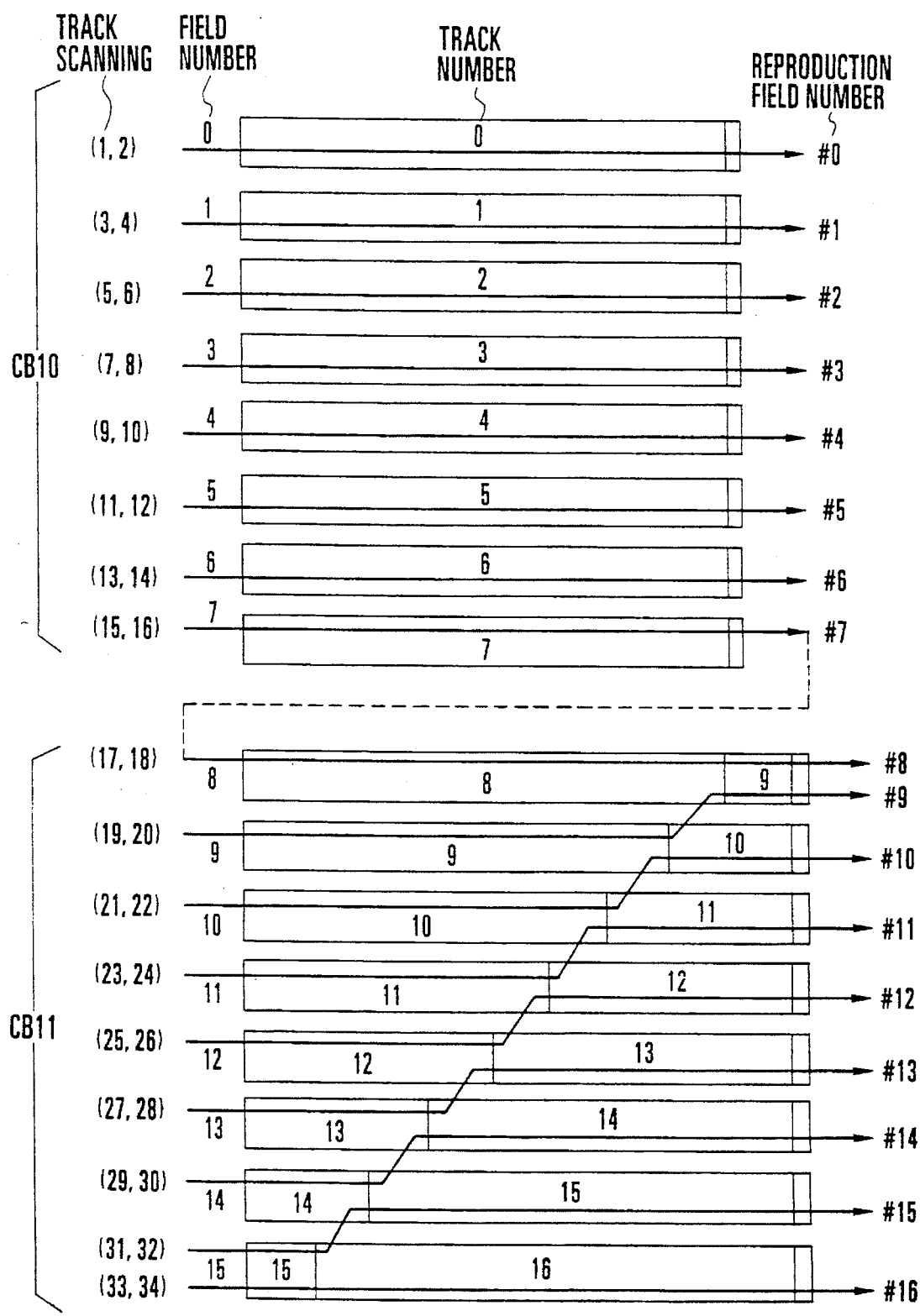
FIG. 30 is a timing chart showing half-speed reproduction based on the track format shown in FIG. 33 and Table 6 to explain the 11th embodiment of the present invention.

In CB10, as shown in FIG. 30, tracks #0 to #7 are consecutively scanned twice to consecutively reproduce fields #0 to #7 twice. In the next CB11, track #8 is scanned twice to reproduce field #8 twice. Thereafter, track #9 is scanned to reproduce the second half of field #9. Upon completion of this reproduction, the optical head is moved backward by one track to reproduce the first half of field #8, starting from the start portion of the field data. The optical head jumps to track #9 again to reproduce the second half of field #9. The optical head then returns to track #8 to reproduce the first half of field #9 to reproduce field #9 twice.

In CB12 and the subsequent CBs, data is reproduced in the manner shown in the column of "slow reproduction" in Table 6. In this case, each symbol "▲" in the column of "slow reproduction" indicates a track to be continuously scanned twice, and numerals "A/B→C" written beside this symbol indicate that in order to reproduce field #A, track #B is scanned first to reproduce recorded field #A, and the optical head then jumps to track #C to reproduce field #A. For example, "▲18/17→16" is written with respect to track #17 in CB12. This indicates that the following operation is performed twice to reproduce field #18. Track #17 is scanned first to reproduce the recorded data of field #18, and the optical head is then moved backward by one track to scan track #16.

In general, in 1/k-fold-speed reproduction (k is an integer equal to or larger than two), a track indicated by the symbol "▲" in the column of "slow reproduction" is continuously scanned k times. For example, in ⅓-reproduction, since "▲18/17→16" is written with respect to track #17 in CB12, in order to reproduce field #18, track #17 is scanned first to reproduce the data of field #18, and the optical head then returns to track #16 to reproduce the recorded data of field #18. This reproducing operation is continuously performed three times. Thereafter, the optical head is moved to track #18.

In this case, if control information such as track addresses for reproduction and track numbers to which the optical head is to jump is stored in a recording device such as ROM in advance for each slow reproduction speed, 1/k-fold-speed reproduction control can be reliably executed.

Double-speed reproduction in the recording track format shown in FIG. 18 will be described next.

Reproduction control is basically the same as that in the case of the recording track format shown in FIG. 33. More specifically, when field data to be reproduced is recorded within one track, the track is scanned to reproduce the data. When field data to be reproduced is separately recorded on two tracks, the optical head jumps first to a track including the second half of the field data to reproduce the second half data, and then moves backward by one track to reproduce the first half of the field data, starting from the start portion of the field data. In the innermost clock block, the amount of recording data per track is smaller than the amount of 1-field data, and the rotational speed of the optical disk is 8/7 the field frequency. For this reason, there are differences between reproducing operations in the recording formats shown in FIGS. 18 and 33.

Figure 31:
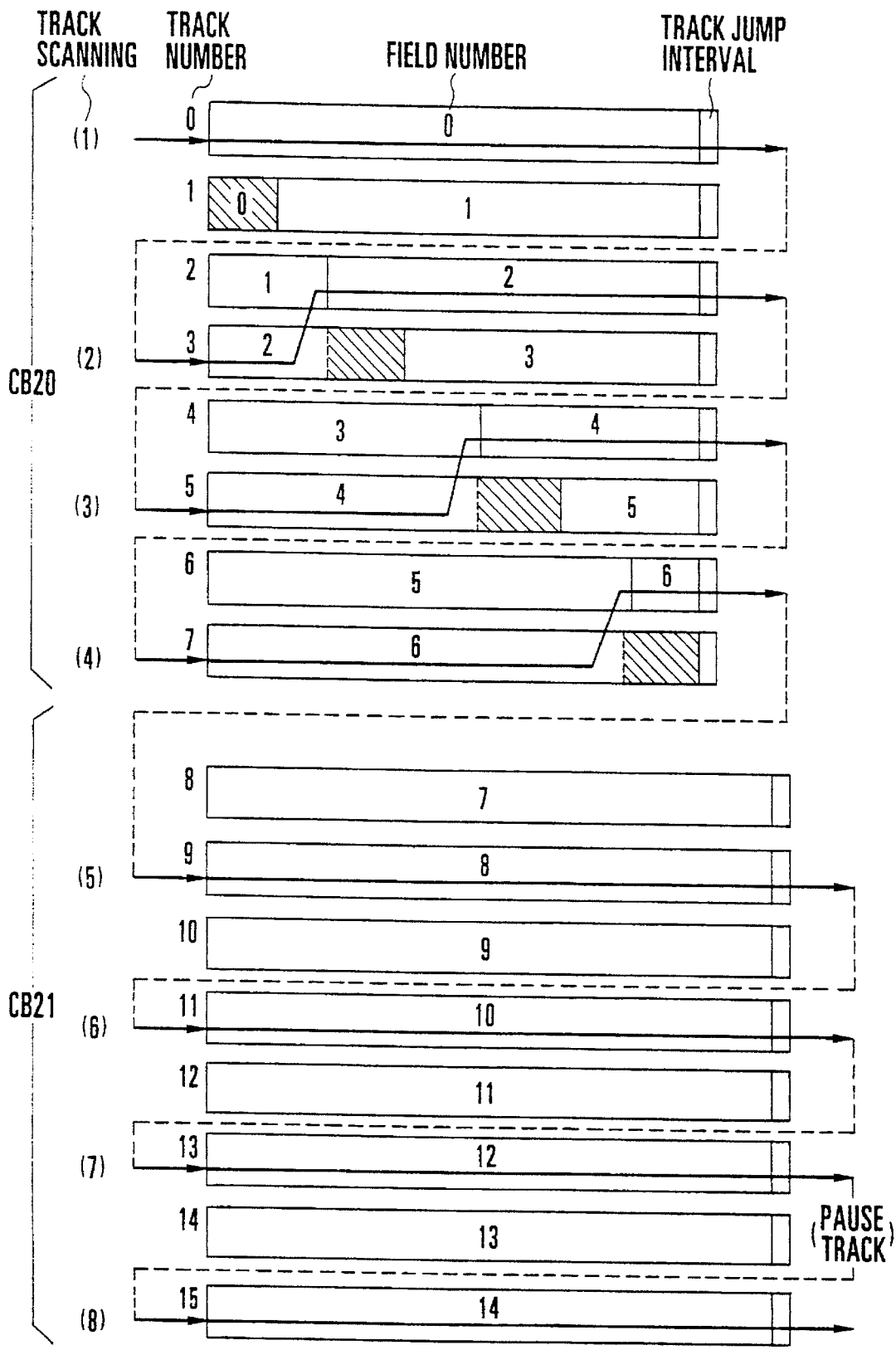
FIG. 31 is a timing chart showing double-speed reproduction based on the track format shown in FIG. 18 and Table 7 to explain the 11th embodiment of the present invention.

First of all, as shown in FIG. 31, in CB20, after the first half of field #0 is reproduced by scanning track #0, the optical head jumps to track #3 disregarding track #1 containing the second half of field #0. Before reproduction of the second half of field #2 is completed, the optical head is moved backward by one track to return to track #2 to reproduce the first half of field #2 from track #2, starting from the start portion of the field data. That is, a track jump is performed at the timing at which the first half of the field data can be reproduced from its start portion. For this reason, the last portion (the hatched portion in FIG. 31) of field #2 is omitted. However, in compressed data or the like, important information is contained in the start portion of 1-block data (1-field data in this case), and the omission of the last portion hardly affects the image quality. Although the second half data of field #0 is also omitted, the image quality is hardly affected for the same reason. Subsequently, even-numbered fields #4 and #6 are reproduced by performing track jumps and repeat track operations in the same manner as described above.

In CB21, the optical head jumps to tracks #9, #11, #13, and #15 to scan them, respectively, to reproduce even-numbered fields #8, #10, #12, and #14. In this case, since the rotational speed of the optical disk is 8/7 the field frequency, the time required to scan one track of the disk corresponds to 7/8 the field period, and 7-field data is reproduced in the time required to scan eight tracks. If, therefore, 1-field data is reproduced per track, a pause track operation of stopping reproduction for the time required to scan one track needs to be performed. In this case, a pause track operation is performed after scanning of track #13 corresponding to the 7th track to be scanned from the start of scanning of track #0.

Note that to stop reproduction of one track after seven tracks are scanned is equivalent to move the optical head backward by one track after eight tracks are reproduced, and continue reproduction. Therefore, this operation may be expressed as generating a pause track every time eight tracks are scanned.

In the next CB22, similar to the field data in CB11 shown in FIG. 29, there is a time interval, in field data separately recorded on two tracks, between the end of reproduction of the second half of the field data and the start of reproduction of the first half of the field data. Therefore, by completing a track jump within this time interval, the field data can be reproduced from its start portion without sacrificing the last portion of the field data, unlike the case of CB20.

Such a double-speed reproduction operation is shown in the column of "double-speed reproduction" in Table 7. The symbol "*" in the column of "double-speed reproduction" indicates a pause track. The remaining symbols and numerals have the same meanings as those in Table 6. More specifically, for example, "●26/26→25 *" is written with respect to track #26 in CB23. This means that in order to reproduce field #26, track #26 is scanned first to reproduce the recorded data of field #26, the optical head is then moved backward by one track to scan track #25 to reproduce the data of field #26, and a pause track operation is executed after track #25 is scanned. Note that a pause track is generated after seven tracks are scanned, starting from track #0.

TABLE 7

| Clock Block (CB) | Total Number Recording Fields | Track Number | Double-speed Reproduction Field Number/Track Number | Quadruple-speed Reproduction Field Number/Track Number | Slow Reproduction | |
|---|---|---|---|---|---|---|
| | | | | | Field Number/ Track Number | Field Number/ Track Number |
| 20 | 7 | 0 | ● 0/0 | ● 0/0 | ▲ 0/0 | |
| | | 1 | | | | |
| | | 2 | | | ▲ 1/2→1 | |
| | | 3 | ● 2/3→2 | | ▲ 2/3→2 | |
| | | 4 | | | ▲ 3/4→3 | |
| | | 5 | ● 4/5→4 | ● 4/5→4 | ▲ 4/5→4 | |
| | | 6 | | | ▲ 5/6→5 | |
| | | 7 | ● 6/7→6 | | ▲ 6/7→6 | |
| 21 | 8 | 8 | | | ▲ 7/8 | |
| | | 9 | ● 8/8 | ● 8/8 | ▲ 8/9 | |

TABLE 7-continued

| Clock Block (CB) | Total Number Recording Fields | Track Number | Double-speed Reproduction Field Number/Track Number | Quadruple-speed Reproduction Field Number/Track Number | Slow Reproduction Field Number/Track Number | Slow Reproduction Field Number/Track Number |
|---|---|---|---|---|---|---|
| | | 10 | | | ▲ 9/10 | |
| | | 11 | • 10/11 | | ▲ 10/11 | |
| | | 12 | | | ▲ 11/12 | |
| | | 13 | • 12/13* | • 12/13 | ▲ 12/13 | |
| | | 14 | | | ▲ 13/14 | |
| | | 15 | • 14/15 | | ▲ 14/15 | |
| 22 | 9 | 16 | | | ▲ 15/16 | |
| | | 17 | • 16/17→16 | • 16/17→16 | ▲ 16/17→16 | |
| | | 18 | | | ▲ 17/18→17 | |
| | | 19 | • 18/19→18 | | ▲ 18/19→18 | |
| | | 20 | | | ▲ 19/20→19 | |
| | | 21 | • 20/21→20 | • 20/21→20 | ▲ 20/21→20 | |
| | | 22 | | | ▲ 21/22→21 | |
| | | 23 | • 22/23→22 | | ▲ 22/23→22 | ▲ 23/23 |
| 23 | 10 | 24 | • 24/24 | • 24/24* | ▲ 24/24 | |
| | | 25 | | | ▲ 25/25→24 | |
| | | 26 | • 26/28→25* | | ▲ 26/26→25 | |
| | | 27 | • 28/27 | • 28/27 | ▲ 27/27→26 | ▲ 28/27 |
| | | 28 | | | ▲ 29/28 | |
| | | 29 | • 30/29→28 | | ▲ 30/29→28 | |
| | | 30 | | | ▲ 31/30→29 | |
| 24 | 11 | 31 | • 32/31→30 | • 32/31→30 | ▲ 32/31→30 | ▲ 33/31 |
| | | 32 | • 34/32 | | ▲ 34/32 | |
| | | 33 | | | ▲ 35/33→32 | |
| | | 34 | • 36/34→33 | • 36/34→33 | ▲ 36/34→33 | ▲ 37/34 |
| | | 35 | • 38/35→34 | | ▲ 38/35→34 | |
| | | 36 | | | ▲ 39/36→35 | |
| | | 37 | • 40/37→36* | • 40/37→36 | ▲ 40/37→36 | ▲ 41/37 |
| | | 38 | • 42/38→37 | | ▲ 42/38→37 | |
| 25 | 12 | 39 | • 44/39 | • 44/39 | ▲ 48/39→38 | ▲ 44/38 |
| | | 40 | | | ▲ 45/40 | |
| | | 41 | • 46/41→40 | | ▲ 46/41→40 | ▲ 47/41 |
| | | 42 | • 48/42 | • 48/42 | ▲ 48/42 | |
| | | 43 | • 50/43 | | ▲ 49/43→42 | ▲ 50/43 |
| | | 44 | | | ▲ 51/44 | |
| | | 45 | • 52/45→44 | • 52/45→44* | ▲ 52/45→44 | ▲ 53/45 |
| | | 46 | • 54/46* | | ▲ 54/46 | |
| 26 | 13 | 47 | • 56/47 | • 56/47 | ▲ 55/47→6 | ▲ 56/47 |
| | | 48 | | | ▲ 57/48 | |
| | | 49 | • 58/49→48 | | ▲ 58/49→48 | ▲ 59/49 |
| | | 50 | • 60/50→49 | • 60/50→49 | ▲ 60/50→49 | |
| | | 51 | • 62/51 | | ▲ 61/51→50 | ▲ 62/51 |
| | | 52 | • 64/52 | • 64/52 | ▲ 63/52→51 | ▲ 64/52 |
| | | 53 | | | ▲ 65/53→52 | |
| | | 54 | • 66/54→53 | | ▲ 66/54→53 | ▲ 67/54 |
| | | 55 | • 68/55→54* | • 68/55→54 | ▲ 68/55→54 | ▲ 69/55 |
| 27 | 14 | 56 | • 70/56 | | ▲ 70/56 | |
| | | 57 | • 72/57 | • 72/57 | ▲ 71/57→56 | ▲ 72/57 |
| | | 58 | • 74/58 | | ▲ 73/58→57 | ▲ 74/58 |
| | | 59 | • 76/59 | • 76/59 | ▲ 75/59→58 | ▲ 76/59 |
| | | 60 | | | ▲ 77/60 | |
| | | 61 | • 78/61→60 | | ▲ 78/61→60 | ▲ 79/61 |
| | | 62 | • 80/62→61 | • 80/62→61* | ▲ 80/62→61 | ▲ 81/62 |
| | | 63 | • 82/63→62* | | ▲ 82/63→62 | ▲ 83/63 |
| 28 | 15 | 64 | • 84/64 | • 84/64 | ▲ 84/64 | |
| | | 65 | • 86/65 | | ▲ 85/65→64 | ▲ 86/65 |
| | | 66 | • 88/66 | • 88/66 | ▲ 87/66→65 | ▲ 88/66 |
| | | 67 | • 90/67 | | ▲ 89/67→66 | ▲ 90/67 |
| | | 68 | • 92/68 | • 92/68 | ▲ 91/68→67 | ▲ 92/68 |
| | | 69 | • 94/69 | | ▲ 93/69→68 | ▲ 94/69 |
| | | 70 | • 96/70* | • 96/70 | ▲ 95/70→69 | ▲ 96/70 |
| | | 71 | • 98/71 | | ▲ 97/71→70 | ▲ 98/71 |
| 29 | 16 | 72 | • 100/72 | • 100/72 | ▲ 99/72 | ▲ 100/72 |
| | | 73 | • 102/73 | | ▲ 101/7 | ▲ 102/73 |
| | | 74 | • 104/74 | • 104/74 | ▲ 103/74 | ▲ 104/74 |
| | | 75 | • 106/75 | | ▲ 105/75 | ▲ 106/75 |
| | | 76 | • 108/76 | • 108/76* | ▲ 107/76 | ▲ 108/76 |
| | | 77 | • 110/77* | | ▲ 109/77 | ▲ 110/77 |
| | | 78 | • 112/78 | • 112/78 | ▲ 111/78 | ▲ 112/78 |
| | | 79 | • 114/79 | | ▲ 113/79 | ▲ 114/79 |

If control information such as track addresses for reproduction and track numbers to which the optical head is to jump is stored in a recording device such as ROM in advance for each slow reproduction speed, double-speed reproduction control can be easily and reliably executed.

In CB20, as shown in FIG. 31, the data of the last portions of fields #0, #2, #4, and #6 are omitted. However, the omitted data of the last portions can be reproduced by performing track scanning in pause track intervals. In this case, the reproduced data of the last portions is temporarily stored in a memory having a capacity corresponding to seven fields, and interpolation processing is performed for the data read out from the memory. With this operation, degradation in image quality can be minimized.

Quadruple-speed reproduction in the recording track format shown in FIG. 18 will be described next.

In quadruple-speed reproduction, as indicated by the column of "quadruple-speed reproduction" in Table 7, the track jump width is set to be larger than that in double-speed reproduction. Similar to the case of double-speed reproduction, when field data to be reproduced is separately recorded on two tracks, the optical head jumps first to a track containing the second half of the field data to reproduce the second half data, and then moves backward by one track to reproduce the first half of the field data. In addition, pause track operations are properly performed to thin out the data of even-numbered fields by 50%, thereby performing reproduction. In reproducing the first half of field data, the optical head is always moved backward by one track at the timing at which the field data can be reproduced from its start portion. In addition, a pause track operation is performed after seven tracks are scanned.

Note that the omitted data of the last portions of the fields in CB20 may be reproduced/stored and interpolated in pause track intervals.

In general, in performing k-fold-speed reproduction, field data may be thinned out for every k fields to reproduce data in the above-described manner. In this case, if control information such as track addresses for reproduction and track numbers to which the optical head jumps is stored in a recording device such as ROM in advance for each reproduction speed, k-fold-speed reproduction control can be easily and reliably executed.

Half-speed reproduction in the recording track format shown in FIG. 18 will be described next.

In half-speed reproduction, each field is reproduced twice. In this case, when field data to be reproduced is separately recorded on two tracks, the optical head jumps first to a track containing the second half of the field data to reproduce the second half data, and then moves backward by one track to reproduce the first half of the field data. This operation is performed twice.

In CB20, track #0 is scanned twice to reproduce the first half data of field #0 twice. In this case, the second half data of field #0 is neglected. The optical head then jumps to track #2 to start reproducing the second half data of field #1, but returns to track #1 before reproduction of the second half data of field #1 is completed, thereby reproducing the first half of field #1, starting from its start portion. This operation is performed twice. Subsequently, a reproducing operation is performed in the same manner as described above.

Although the data of the last portions of fields #0, #1, #2, #3, #4, #5, and #6 are omitted, the influence of this omission on image quality is small because the importance of the last portion of 1-block data (1-field data in this case) as compressed data or the like is low in many cases. In addition, a pause track operation corresponding to a 1-track scanning interval is executed after seven tracks are scanned from the beginning of a track scanning operation, or a pause track operation corresponding to a 2-track scanning interval is executed after 14 tracks are scanned. Note that the omitted data of the last portions of fields #0 to #6 may be reproduced/stored and interpolated in pause track intervals.

With regard to CB21 and the subsequent CBs, half-speed reproduction can be performed in the same manner as described above by repeatedly reproducing each field data twice.

Similarly, with regard to CB21 and the subsequent CBs, data is reproduced in the manner indicated by the column of "slow reproduction" in Table 7. In this case, each symbol "▲" in the column of "slow reproduction" indicates a track to be continuously scanned twice, and numerals "A/B→C" written beside this symbol indicate that in order to reproduce field #A, track #B is scanned first to reproduce recorded field #A, and a track jump to track #C is then performed to reproduce field #A.

In general, in 1/k-fold-speed reproduction (k is an integer equal to or larger than two), a track indicated by the symbol "▲" in the column of "slow reproduction" of Table 1 is continuously scanned k times. For example, in ⅓-reproduction, since "▲30/29→28" is written with respect to track #29 in CB23, in order to reproduce field #30, track #29 is scanned first to reproduce the data of field #30, and the optical head then returns to track #28 to reproduce the recorded data of field #30. This reproducing operation is continuously performed three times. Thereafter, the optical head is moved to track #31. In this case, a pause track operation corresponding to a 1-track scanning interval may be executed after seven tracks are scanned, or a pause track corresponding to k-track scanning interval may be executed after 7 k tracks are scanned.

Note that if control information such as track addresses for reproduction and track numbers to which track jumps are to be performed is stored in a recording device such as ROM in advance for each slow reproduction speed, 1/k-fold-speed reproduction control can be reliably executed.

Another example of half-speed reproduction in the recording track format shown in FIG. 18 will be described next.

Figure 32A:
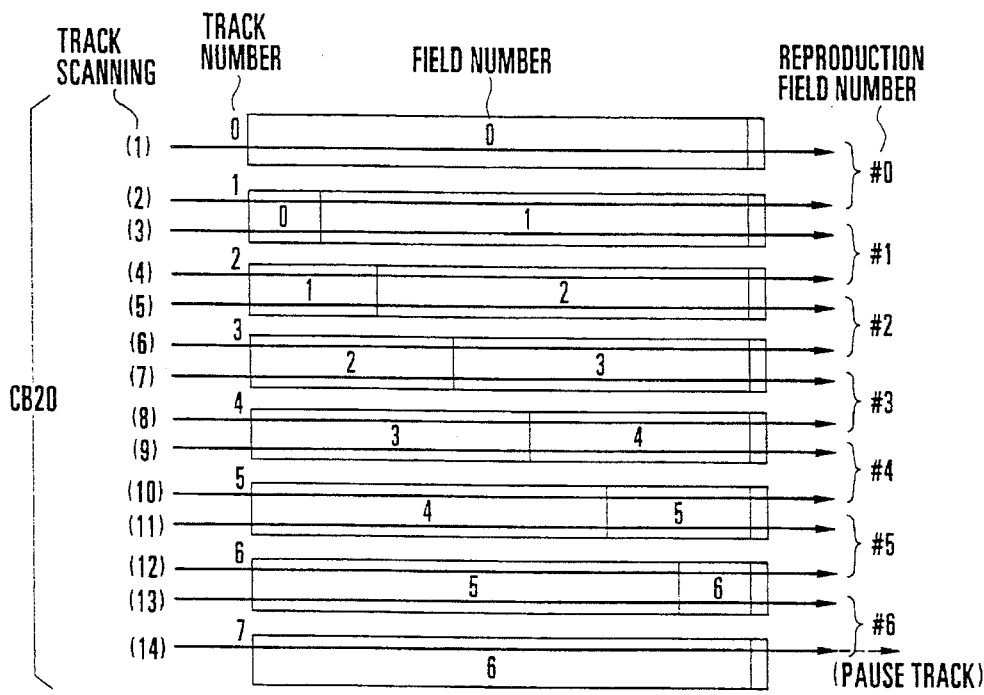
FIGS. 32A and 32B are timing charts showing another example of half-speed reproduction based on the track format shown in FIG. 18.

First of all, in CB20, as shown in FIG. 32A, track #0 is scanned first to reproduce the first half data of field #0, and track #1 is then scanned to reproduce the second half data of field #0. Thereafter, track #1 is scanned to reproduce the first half data of field #1. Track #2 is scanned to reproduce the second half data of field #1. Subsequently, field data separately recorded on two tracks is reproduced by respectively scanning the two tracks. After track #7 as the 14th track is scanned, a pause track operation corresponding to a 2-track scanning interval is executed.

In CB21, each of tracks #8, #9, #10, #11, #12, #13, #14, and #15 is consecutively scanned twice to reproduce each of fields #7, #8, #9, #10, #11, #12, #13, and #14 twice. In this case, after track #14 is scanned twice (the 28th track scanning operation), a pause track operation corresponding to a 2-track scanning interval is executed.

Figure 32B:
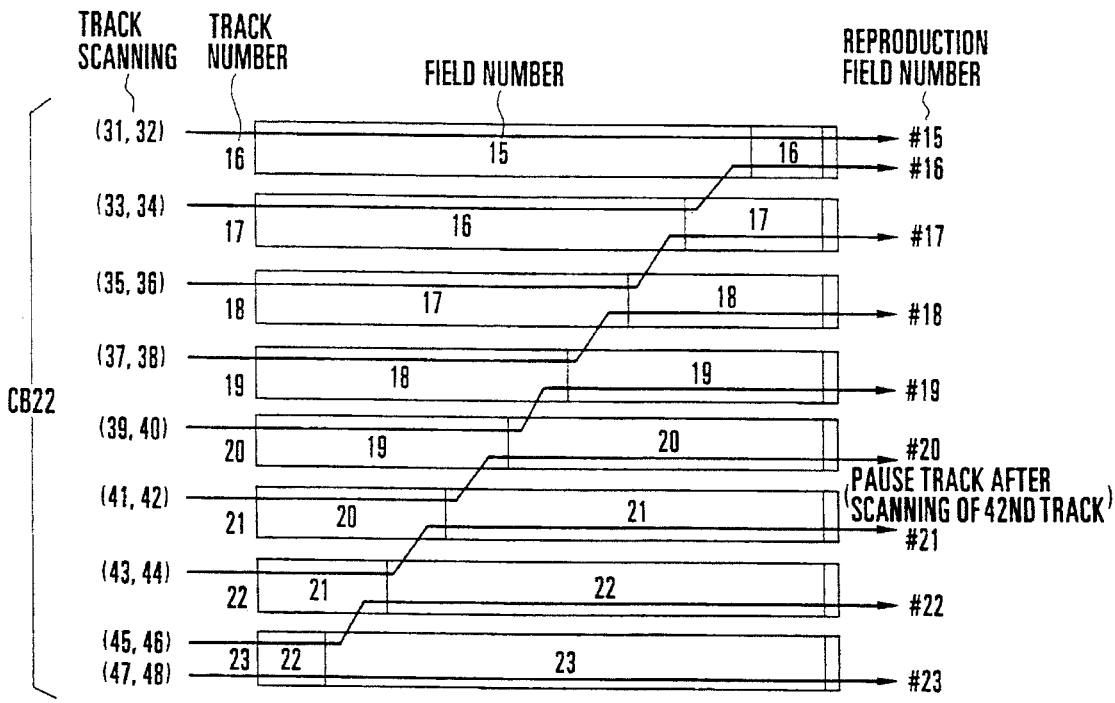

In CB22, as shown in FIG. 32B, track #16 is scanned twice to reproduce field #15 twice. Thereafter, track #17 is scanned to reproduce the second half data of field #16. Upon completion of this reproduction, the optical head returns to track #16 to reproduce the first half data of field #16, starting from its start portion. This operation is performed twice to reproduce field #16 twice. Subsequently, a track scanning operation is performed twice to reproduce each field twice. Finally, track #23 is scanned twice to reproduce field #23 twice. In this case, after track #20 for the 42nd track scanning operation is scanned, a pause track operation corresponding to a 2-track scanning interval is executed.

In general, in 1/k-fold-speed reproduction (k is an integer equal to or larger than two), a track scanning operation may be performed k times to reproduce 1-field (or frame) data k times. In addition, a pause track operation corresponding to a 1-track scanning interval may be executed after seven tracks are scanned, or a pause track operation corresponding to a k-track scanning interval may be executed after 7 k tracks are scanned. Also, data omitted during a pause track interval may be reproduced. If control information such as track addresses for reproduction and track numbers to which track jumps are to be performed is stored in a recording device such as ROM in advance for each reproduction speed, 1/k-fold-speed reproduction control can be reliably executed.

In an actual recording operation, 1-field data is sometimes recorded over three tracks or more. In this case, the first two tracks are scanned with priority being given to their start portions, but the data on tracks which cannot be scanned are omitted.

A track number to which the optical head is to jump in producing target field data will be calculated as follows.

Assume that the number of tracks of each of m equal clock blocks obtained by dividing the recording area of an optical disk in the radial direction is represented by CTR. Also, assume that 1-SB data is recorded per track in the innermost clock block, and the amount of data to be recorded per track is increased by W (SBs) for each clock block. In this case, the amount of data (SBs) per track in the nth (n=0, 1, 2, ..., m−1) CBn is given by $$ISB + n \cdot W \tag{5}$$

Letting FSB (SBs) be the amount of data per field, the number of fields per track in CBn is given by $$(ISB + n \cdot W)/FSB \tag{6}$$

Letting FIELD be the total number of fields to be recorded on the area from innermost CB0 to CBn−1, $$FIELD = (CTR/FSB) \times \{n \cdot ISB + n \cdot (n-1) \cdot W/2\} \tag{7}$$

Note that the value of FIELD coincides with the first field number of CBn.

Letting n be the clock block number to which a target field belongs, n is given according to equation (7) as follows:

$$n = Int\left[ \frac{1}{2} \left\{ \left(1 - \frac{2 \cdot ISB}{W}\right) + \sqrt{\left(\frac{2 \cdot ISB}{W} - 1\right)^2 + \left(\frac{8 \cdot FSB \cdot FIELD}{CTR \cdot W}\right)} \right\} \right] \tag{8}$$

If, therefore, the number of the target field is FLD (FLD=0, 1, 2, ...), clock block number n to which the target field belongs can be obtained by substituting FLD for FIELD of equation (8). In addition, if clock block number n is obtained, the first field number of this clock block can be given by equation (7).

In the clock block containing the target field, the position of the start portion of the target field is given by the number (TR0) (real number) of tracks counted from the start point of this clock block as follows:

$$TR0 = \frac{FLD - FIELD}{\left(\frac{ISB + n \cdot w}{FSB}\right)} \tag{9}$$

Letting TR1 (RT1=0, 1, 2, ...) be the track number from innermost CB0, $$TR1 = Int[TR0] + n \cdot CTR \tag{10}$$

When field data separately recorded on two tracks is to be reproduced, the optical head must jump first to a track containing the second half of the field data to reproduce the second half data, and then must move backward by one track to reproduce the first half of the field data, starting from its start portion. For this reason, when a repeat track operation is to be executed, a predetermined value or more is required as a timing margin in consideration of the timing of the repeat track operation.

Letting RSB (SBs) be the amount of data of a target field in track number TR1, $$RSB = Int[\{1 + Int(TR0) - TR0\} \cdot (ISB + n \cdot W)] \tag{11}$$

If the value of RSB is equal to or larger than the value of FSB, since 1-field data is recorded on one track, no repeat track operation is required. If, however, the value of RSB is less than the value of FSB, the data of a target field is separately recorded on two tracks. In this case, if there is a timing margin for a repeat track operation, the optical head can jump by one track first, and a repeat track operation can be executed. If, however, there is no timing margin, a repeat track operation cannot be executed.

In this case, the amount of data before the target field in track number TR1 is given by $$(ISB + n \cdot W) - RSB \tag{12}$$

If the value of equation (12) is equal to or larger than a predetermined value set in advance for a repeat track operation, a repeat track operation is executed.

That is, if the value of RSB is larger than the value of FSB, or the value of RSB is less than the value of FSB and the value of equation (12) is less than a predetermined value required for a repeat track operation, a repeat track operation is not executed, but jump destination track number TRK= TR1 is set. Otherwise, TRK=TR1+1 is set.

In the case of the recording track format shown in FIG. 18, for example, a jump destination track number for the reproduction of target field #97 will be calculate as follows.

In this case, the amount of data (SBs) per track in CBn is ISB+n·W=350+50n, data amount FSB per field is 400 (SBs), and the number (CTR) of tracks per clock block is 8. In addition, assume that a timing margin required for a repeat track operation is 60 (SBs).

Clock block n to which field #97 belongs is calculated according to equation (8) as follows:

$$n = Int\left[ \left(\frac{1}{2}\right) \cdot (-13 + \sqrt{13 \times 13 + 776}) \right] = 8 \tag{12}$$

That is, field #97 belongs to 8th CB8.

A track number containing field #97 is obtained next.

The total number (FIELD) of fields of CBs before CB8 is obtained according to equation (7) as follows:

$$FIELD = (8/400) \times (8 \times 350 + 8 \times 7 \times 50/2) = 84$$

Therefore, according to equation (9), $$TR0 = ((97 - 84)/(350 + 8 \times 50)) \times 400 = 6.933$$

That is, the start portion of field #97 is located at the position corresponding to 6.933 as the number of tracks counted from the start point of CB8. Consequently, according to equation (10), track number TR1 of the start portion of field #97 is given as follows:

$$TR1=Int(6.933)+8\times 8=70$$

In obtaining jump destination number TRK, data amount RSB of field #97 within track #70 is calculated according to equation (11) as follows:

$$RSB=Int[(1+6-6.933)\times(350+8\times 50)]=50$$

In this case, since the value of RSB is less than the value of FSB (400), the data of field #97 is separately recorded on two tracks.

According to equation (12), the data amount of target field #97 within track number #70 is (ISB+n·W)−RSB=(350+8×50)−50=700. Since the timing margin required for a repeat track operation is 60 or more, the optical head jumps forward by one track. Therefore, jump destination track number TRK=TR1+1=70+1=71. That is, the jump destination track for reproduction of field #97 is track #71.

The jump destination track number for reproduction of field #1 is calculated in the same manner as described above.

According to equation (8), clock block number n to which field #1 belongs is calculated as follows:

$$n = INT\left[\left(\frac{1}{2}\right)\cdot(-13+\sqrt{13\times 13+8}\,)\right]=0 \quad (13)$$

That is, field #1 belongs to CB0. In addition, since CB0 is the first clock block, FIELD=0. Therefore, according to equation (9), TR0=((1−0)/350)×400=1.1428. That is, the start portion of field #1 is located at the position corresponding to 1.1428 as the number of tracks counted from the start point of CB0. Track number TR1 including field #97 is TR1=Int(1.1428)+0×8=1 according to equation (10). That is, the start portion of field #1 is contained in track #1.

In addition, data amount RSB of field #1 within track #1 is calculated according to equation (7) as follows:

RSB=Int[(1+1−1.1428)×(350+0×50)]=350 Since the value of RSB is less than the value of FSB, the data of field #1 is separately recorded on two tracks. In addition, $$(ISB+n\cdot W)-RSB=(350-299)=51$$

Since this value is less than 60 which is the timing margin required for a repeat track operation, a repeat track operation is not executed. Therefore, jump destination track number TRK=TR1=1.

When image data to be recorded is image data compressed by a DCT (discrete cosine transform)+intrafield fixed length coding scheme or the like represented by JPEG, the last portion of data separately recorded on two tracks are sometimes omitted in variable speed reproduction. If, however, compression and recording are performed in the frame order, only the lower right portions of frames are omitted, for example. As a result, degradation in image quality becomes conspicuous. In order to eliminate such an inconvenience, shuffling is performed in units of blocks to make the recording order of data random. With this operation, omitted portions can be dispersed on frames. Alternatively, different formulae for shuffling are used in accordance with tracks or fields to change the positions of data to be omitted for each track or field, thereby reducing the degradation in image quality. Furthermore, an omitted portion can be interpolated by using the preceding field to minimize the degradation in image quality.

When, for example, a signal corresponding to 525 scanning lines is to be used, the number of pixels and the number of macro-blocks per field are respectively set to be 720×240 and 675. When a signal corresponding to 625 scanning lines is to be used, the number of pixels and the number of macro-blocks per field are respectively set to be 720×288 and 810. If macro-block numbers MBs are assigned upward from left to right on each frame, and the recording order is represented by RC,

| | |
|---|---|
| 525 signal: | RC = (32 × MB) mod 675 |
| 625 signal: | RC = (37 × MB) mod 810 |
| first field of 525 signal: | RC = (32 × MB) mod 675 |
| second field of 525 signal: | RC = 675 − (32 × MB) mod 675 |
| first field of 625 signal: | RC = (37 × MB) mod 810 |
| second field of 625 signal: | RC = 810 − (32 × MB) mod 810 |

As has been described above, in the optical disk apparatus according to the present invention, the recording track area of an optical disk which rotates at a predetermined rotational speed is divided into equal areas in the radial direction, and the amount of recording data per track is increased by a predetermined amount for each recording area in accordance with the radius of each track, thereby recording data with an almost constant recording wavelength. In this apparatus, in variable speed reproduction, when field (or frame) data to be reproduced is separately recorded on two tracks, the optical head jumps first to a track containing the second half data of the field (or frame) to reproduce the second half data, and then moves backward by one track to reproduce the first half data, starting from its start portion. If, however, the amount of the second half data is less than a predetermined value, only the first half data is reproduced, starting from its start portion, thereby reliably performing a reproducing operation from the start portion, of the field (or frame) data, in which important data information is arranged. Therefore, degradation in image quality due to the data reproduction omission can be prevented.

When data is recorded at a disk rotational speed different from a field frequency, the data is reproduced by executing a proper pause track operation. The data of a last portion which is not reproduced is read out and interpolated by using this pause track interval, thereby minimizing the degradation in image quality.

Furthermore, recording data is shuffled in units of blocks, tracks, or fields (or frames) to record the data in a random order. With this operation, the data of omitted last portions can be dispersed on frames in double-speed reproduction. Therefore, degradation in image quality can be suppressed.

What is claimed is:

1. An optical disk apparatus comprising:

an optical disk has a recording area constituted by a plurality of equal clock blocks obtained by dividing a track area in a radial direction, the optical disk rotates at a constant rotational speed in synchronism with one of a frame frequency and a field frequency of recording data;

an optical head for optically recording data on said optical disk;

recording buffer memory in which data to be recorded on said optical disk is temporarily written at a constant bit rate;

recording control means for reading out the data from said recording buffer memory while changing the bit rate for each clock block of said optical disk, and recording the readout recording data on said optical disk with an almost constant recording wavelength; and pause track calculation means for setting a track next to a track defined by R<Nt as a pause track for performing timing adjustment by moving said optical head backward by one track, wherein a track number in a clock block is Ct (Ct=0, 1, 2, ..., n), the number of data blocks per track is Nt, the number of data blocks per frame or field is Nf, a constant determined by a capacity of said buffer memory is R, and a value of R−(Nt−Nf) is substituted into a value of the constant R as track number Ct is sequentially incremented from 0, and notifying said recording control means of a pause track timing upon setting a track next to a track defined by R<Nt as a pause track when the value of R−(Nt−Nt) is substituted into an updated value of the constant R obtained by adding the number (Nf) of data blocks to the value of the constant R obtained when timing adjustment is performed as track number Ct is incremented with respect to all track numbers in each of subsequent clock blocks.

2. An apparatus according to claim 1, further comprising head drive means for driving said optical head, and wherein said recording control means includes a recording control signal generator for outputting a recording clock signal on the basis of a track position, and outputting a pause track control signal for designating a pause track to said head drive means in accordance with a timing notified from said pause track calculation means, and a recording data processor for performing predetermined recording data processing including video/audio synthesis and addition of an error correction code with respect to data to temporarily write the data in said recording data memory, and reading out recording data from said recording data memory in units of tracks in accordance with a recording clock signal and a pause track control signal from said recording control signal generator to output the recording data to said optical head.

3. An optical disk apparatus comprising:

an optical disk which has a recording area constituted by a plurality of block blocks obtained by dividing a track area in a radial direction and rotates;

an optical head for optically recording/reproducing data on/from said optical disk;

recording buffer memory means in which data to be recorded on said optical disk is temporarily written at a constant bit rate;

recording control means for reading out the data from said recording buffer memory means while changing the bit rate for each clock block of said optical disk, and recording the readout data on said optical disk with an almost constant recording wavelength;

first timing generator for generating a normal track recording timing in normal rotation of said optical disk; and first timing comparing means for comparing a track recording timing in actual rotation of said optical disk with the normal track recording timing from said timing generator, wherein said recording control means performs timing adjustment by moving said optical head backward by one track on the basis of the comparison result from said first timing comparing means to absorb a rotational speed shift caused when a rotational speed of said optical disk is higher than a normal rotational speed, thereby performing a recording operation.

4. An apparatus according to claim 3, wherein said optical disk rotates at a constant rotational speed, and said recording control means changes a period of a recording clock in accordance with the rotational speed of said optical disk to record data on said optical disk with the almost constant recording wavelength.

5. An apparatus according to claim 3, wherein the rotational speed of said optical disk changes in accordance with a recording track area, and said recording control means records data on said optical disk with the almost constant recording wavelength by using a recording clock having a constant period.

6. An apparatus according to claim 3, wherein all the tracks of said optical disk have track jump gaps for absorbing variations in data recording wavelength due to rotational speed shifts of said optical disk.

7. An apparatus according to claim 3, further comprising:

reproduction buffer memory means in which data reproduced from said optical disk is written and from which the data is read out at a constant bit rate;

reproduction control means for reproducing data from said optical disk while changing the bit rate for each of the clock blocks, and recording the reproduced data in said reproduction buffer memory means;

second timing generating means for generating a normal track reproduction timing in normal rotation of said optical disk; and second timing comparing means for comparing a track recording timing in actual rotation of said optical disk with the normal track recording timing from said timing generating means, said reproduction control means performing timing adjustment by moving said optical head backward by one track on the basis of the comparison result from said second timing comparing means to absorb a rotational speed shift caused when the rotational speed of said optical disk is higher than a normal rotational speed, thereby performing a reproducing operation.

8. An optical disk apparatus comprising:

an optical disk which has a recording area constituted by a plurality of block blocks obtained by dividing a track area in a radial direction and rotates;

an optical head for optically recording/reproducing data on/from said optical disk;

recording buffer memory means in which data to be recorded on said optical disk is written at a constant bit rate;

recording control means for reading out the data from said recording buffer memory means while changing the bit rate for each clock block of said optical disk, and recording the readout data on said optical disk with an almost constant recording wavelength;

first timing generator for generating a normal track recording timing in normal rotation of said optical disk;

write means for writing data in said recording buffer memory means in accordance with the normal track recording timing from said first timing generating means;

read means for reading out data from said recording buffer memory means in accordance with the track recording timing in actual rotational of said optical disk; and first detection means for detecting that an amount of data stored in said recording buffer memory means is smaller than a data amount corresponding to a predetermined number of tracks, wherein said recording control means performs timing adjustment by moving said optical head backward by one track on the basis of a detection output from said first detection means to absorb a rotational speed shift caused when the rotational speed of said optical disk is higher than a normal rotational speed.

9. An apparatus according to claim 8, wherein said optical disk rotates at a constant rotational speed, and said recording control means records data on said optical disk with the almost constant recording wavelength while changing a period of a recording clock in accordance with the rotational speed of said optical disk.

10. An apparatus according to claim 8, wherein the rotational speed of said optical disk changes in accordance with a recording track area, and said recording control means records data on said optical disk with the almost constant recording wavelength by using a recording clock having a constant period.

11. An apparatus according to claim 8, wherein all the tracks of said optical disk have track jump gaps for absorbing variations in data recording wavelength due to rotational speed shifts of said optical disk.

12. An apparatus according to claim 8, further comprising:

reproduction buffer memory means in which data reproduced from said optical disk is written and from which the data is read out at a constant bit rate;

reproduction control means for reproducing data from said optical disk while changing the bit rate for each of the clock blocks, and recording the reproduced data in said reproduction buffer memory means;

second timing generating means for generating a normal track reproduction timing in normal rotation of said optical disk;

write means for writing data in said reproduction buffer memory means in accordance with a track reproduction timing in actual rotation of said optical disk;

read means for reading out data from said reproduction buffer memory means in accordance with the normal track reproduction timing from said second timing generator; and second detection means for detecting that an amount of data stored in said reproduction buffer memory means is larger than a data amount corresponding to a predetermined number of tracks, said reproduction control means performing timing adjustment by moving said optical head backward by one track on the basis of a detection output from said second detection means to absorb rotational speed shift caused when the rotational speed of said optical disk is higher than a normal rotational speed, thereby performing a reproducing operation.

13. An optical disk apparatus comprising:

an optical disk which has a recording area constituted by a plurality of m equal clock blocks obtained by dividing a track area in a radial direction;

an optical head for optically recording data on said optical disk; and recording control means for recording data of all A fields in a 0th clock block as an innermost periphery at a rate of one field per track, recording data of all (A+nB) fields in an nth clock block at a rate of one field+nW blocks per track, and recording data of all (A+(m−1)B) fields in a (m−1)th clock block as an outermost periphery at a rate of one field+(m−1)W blocks per track.

14. An apparatus according to claim 13, wherein providing that a track number in a clock block is CT, the number of recording blocks per track is P, the number of recording blocks per track on an innermost periphery is Q, a constant determined by a buffer capacity is RI, and a parameter for a calculation is R, if R>P−Q·Int((P−Q)/Q), a pause track, which is a track at which said optical head is moved backward by one track and a recording operation is stopped while said optical disk rotates at a constant angular speed, is not generated, and CT is incremented when RI is substituted into R only in an initial state, and CT=0 is set for a 0th clock block; and if R≦P−Q·Int((P−Q)/Q), a pause track is generated, R+Q is substituted into R, and CT is incremented, thereby repeating a pause track operation for all CTs and clock blocks.

15. An apparatus according to claim 12, wherein the rotational speed of said optical disk is set to be 60/1.001 rps so as to be matched with a filed frequency for a 525/60 component television signal (hereinafter referred to as a "525 signal"), and 60 rps so as to be matched with 6/5 the field frequency for a 625/50 component television signal (hereinafter referred to as a "625 signal"), thereby setting a rotational speed ratio to be 1:1.001, a video (+audio) bit rate ratio and recording bit rate ratio between the 525 signal and the 625 signal is set to be 1:1.001, and a recording time ratio between the 525 signal and the 625 signal is set to be 1.001:1, thereby allowing the 525 signal and the 625 signal to be recorded.

16. An apparatus according to claim 15, wherein providing that the number of tracks per clock block is Z; the number of blocks per field, X (for the 525 signal) and 6X/5 (for the 625 signal); and, the number of recording blocks per track in a Yth clock block, X+WY, when Z is divisible by six, WZ can be divided by X, WZ can be divided by 6X/5, X can be divided by W, and X can be divided by five.

17. An apparatus according to claim 13, wherein a relationship, for the 525 signal, between track number TR, clock block number CB, the number (Z) of tracks per clock block, the number (X) of blocks per field (525 signal), the number (X') of blocks per track on an innermost periphery, the number (X'+WY) of recording blocks per track in Y clock blocks, field numbers F0, F1, and F2 to be recorded on track TR, and the numbers (SB0, SB1, and SB2) of recording blocks with respect to the respective fields is given by $$N = \frac{X' + W \cdot CB}{X} (TR \bmod Z) + \frac{Z}{X}(X' \cdot CB + 2 \cdot CB(CB-1))$$

and F0=Int(N), F1=F0+1, F2=F0+2, and FF=N−F0, so that
 if FF=0 and X'+W·CB≧X, then SB0=X, SB1=X'+W·CB−X, and SB2=0, and if FF=0 and X'+W·CB<X, then SB0=X'+W·CB, SB1=0, and SB2=0, also,
 if FF≠0 and X'+W·CB<X·(1−FF), then SB0=X'+W·CB, SB1=0, and SB2=0, if FF≠0 and X'+W·CB≧X·(1−FF) and X'+W·CB−X·(1−FF)≧X, then SB0=X·(1−FF), SB1=X, and SB2=X'+W·CB−X·(1−FF)−X, and if FF≠0, X'+W·CB≧X·(1−FF), and X'+W·CB−X·(1−FF)<X, then SB0=X·(1−FF), SB1=X'+W·CB−X·(1−FF), and SB2=0, and the relationship for the 625 signal is given by $$N = \frac{X' + W \cdot CB}{6X/5} (TR \bmod Z) +$$

$$\frac{Z}{6X/5}(X' \cdot CB + 2 \cdot CB(CB-1))$$

and F0=Int(N), F1=F0+1, F2=F0+2, and FF=N−F0, so that
  if FF=0 and X'+W·CB≧6X/5, then SB0=6X/5, SB1=X'+W·CB−6X/5, and SB2=0, and if FF=0 and X'+W·CB<6X/5, then SB0=X'+W·CB, SB1=0, and SB2=0,
also,
  if FF≠0 and X'+W·CB<(6X/5)·(1−FF), then SB0=X'+W·CB, SB1=0, and SB2=0, if FF≠0, X'+W·CB≧(6X/5)·(1−FF), and X'+W·CB−(6X/5)·(1−FF)≧6X/5, then SB0=(6X/5)·(1−FF), SB1=6X/5, and SB2=X'+W·CB−(6X/5)·(1−FF)−6X/5, and if FF≠0, X'+W·CB≧(6X/5)·(1−FF), and X'+W·CB−(6X/5)·(1−FF)<6X/5, then SB0=(6X/5)·(1−FF), SB1=X'+W·CB−(6X/5)·(1−FF), and SB2=0.

18. An apparatus according to claim 13, wherein shuffling is performed in units of macro-blocks.

19. An apparatus according to claim 18, wherein shuffling is performed within a field.

20. An apparatus according to claim 18, wherein the number of macro-blocks is set to 675 for the 525 signal and 810 for the 625 signal, and recording orders are set as follows:
  RC=(K·MB) mod 675 where K is an integer; 525 signal
  RC=(K·MB) mod 810 where K is an integer; 625 signal.

21. An apparatus according to claim 20, wherein K=32 for the 525 signal, and K=37 for the 625 signal.

22. An optical disk apparatus comprising:
  an optical disk which has a recording area constituted by a plurality of m equal clock blocks obtained by dividing a track area in a radial direction;
  an optical head for optically recording data on said optical disk; and
  recording control means for recording data of all A fields in a 0th clock block as an innermost periphery at a rate of 1−α(0<α<1) fields per track, recording data of all (A+nB) fields in an nth clock block at a rate of (1−α)+nW blocks per track, and recording data of all (A+(m−1)B) fields in a (m−1)th clock block as an outermost periphery at a rate of (1−α) fields+(m−1)W blocks per track.

23. An apparatus according to claim 22, wherein providing that the number of blocks per field is X; and the number of blocks per track on an innermost periphery, X', the rotational speed of said optical disk is set to be (60X)/(1.001X') rps for a 525/60 component television signal (hereinafter referred to as a "525 signal"), and (60X)/X' rps for a 625/50 component television signal (hereinafter referred to as a "625 signal"), thereby setting a rotational speed ratio to be 1:1.001, a video (+audio) bit rate ratio and recording bit rate ratio between the 525 signal and the 625 signal is set to be 1:1.001, and a recording time ratio between the 525 signal and the 625 signal is set to be 1.001:1, thereby allowing the 525 signal and the 625 signal to be recorded.

24. An apparatus according to claim 23, wherein providing that the number of tracks per clock block is Z; the number of blocks per field, X (for the 525 signal) and 6X/5 (for the 625 signal); the number of blocks per track on an innermost periphery, X'; and, the number of recording blocks per track in a Yth clock block, X'+WY, when Z is divisible by six, WZ can be divided by X, WZ can be divided by 6X/5, X' can be divided by W, and X' can be divided by five.

25. An apparatus according to claim 22, wherein a relationship, for the 525 signal, between track number TR, clock block number CB, the number (Z) of tracks per clock block, the number (X) of blocks per field (525 signal), the number (X') of blocks per track on an innermost periphery, the number (X'+WY) of recording blocks per track in Y clock blocks, field numbers F0, F1, and F2 to be recorded on track TR, and the numbers (SB0, SB1, and SB2) of recording blocks with respect to the respective fields is given by $$N = \frac{X' + W \cdot CB}{X}(TR \bmod Z) +$$

$$\frac{Z}{X}(X' \cdot CB + 2 \cdot CB(CB-1))$$

and F0=Int(N), F1=F0+1, F2=F0+2, and FF=N−F0, so that
  if FF=0 and X'+W·CB≧X, then SB0=X, SB1=X'+W·CB−X, and SB2=0, and if FF=0 and X'+W·CB<X, then SB0=X'+W·CB, SB1=0, and SB2=0,
also,
  if FF≠0 and X'+W·CB<X·(1−FF), then SB0=X'+W·CB, SB1=0, and SB2=0, if FF≠0 and X'+W·CB≧X·(1−FF) and X'+W·CB−X·(1−FF)≧X, then SB0=X·(1−FF), SB1=X, and SB2=X'+W·CB−X·(1−FF)−X, and if FF≠0, X'+W·CB≧X·(1−FF), and X'+W·CB−X·(1−FF)<X, then SB0=X·(1−FF), SB1=X'+W·CB−X·(1−FF), and SB2=0, and
the relationship for the 625 signal is given by $$N = \frac{X' + W \cdot CB}{6X/5}(TR \bmod Z) +$$

$$\frac{Z}{6X/5}(X' \cdot CB + 2 \cdot CB(CB-1))$$

and F0=Int(N), F1=F0+1, F2=F0+2, and FF=N−F0, so that
  if FF=0 and X'+W·CB≧6X/5, then SB0=6X/5, SB1=X'+W·CB−6X/5, and SB2=0, and if FF=0 and X'+W·CB<6X/5, then SB0=X'+W·CB, SB1=0, and SB2=0,
also,
  if FF≠0 and X'+W·CB<(6X/5)·(1−FF), then SB0=X'+W·CB, SB1=0, and SB2=0, if FF≠0, X'+W·CB≧(6X/5)·(1−FF), and X'+W·CB−(6X/5)·(1−FF)≧6X/5, then SB0=(6X/5)·(1−FF), SB1=6X/5, and SB2=X'+W·CB−(6X/5)·(1−FF)−6X/5, and if FF≠0, X'+W·CB≧(6X/5)·(1−FF), and X'+W·CB−(6X/5)·(1−FF)<6X/5, then SB0=(6X/5)·(1−FF), SB1=X'+W·CB−(6X/5)·(1−FF), and SB2=0.

26. An apparatus according to claim 22, wherein shuffling is performed in units of macro-blocks.

27. An apparatus according to claim 26, wherein shuffling is performed within a field.

28. An apparatus according to claim 27, wherein the number of macro-blocks is set to 675 for the 525 signal and 810 for the 625 signal, and recording orders are set as follows:
  RC=(K·MB) mod 675 where K is an integer; 525 signal
  RC=(K·MB) mod 810 where K is an integer; 625 signal.

29. An apparatus according to claim 28, wherein K=32 for the 525 signal, and K=37 for the 625 signal.

30. An optical disk apparatus comprising:
  an optical disk which has a recording area constituted by a plurality of equal clock blocks obtained by dividing a track area in a radial direction, and rotates at a constant rotational speed in synchronism with one of a frame frequency and field frequency of recording data, said optical disk having a clock block on an innermost periphery on which 1-field/frame data is recorded per track, and said optical disk allowing data to be recorded with an almost constant recording wavelength while an amount of data to be recorded per track is increased by a constant amount for each clock block in accordance with a track radius;

an optical head for optical recording/reproducing data on/from said optical disk, and reproduction control means for reproducing data while thinning out data for every k fields/frames in k-fold-speed reproduction (k is an integer not less than two), reproducing data of a reproduction field/frame from a start portion to a last portion thereof when the data of the reproduction field/frame is recorded within the track, and causing said optical head to jump first to a track containing second half data of a reproduction field/frame to reproduce the second half data and to then move backward by one track to reproduce first half data of the reproduction field/frame, starting from a start portion thereof, when the data of the reproduction field/frame are separately recorded on two tracks.

31. An apparatus according to claim 30, further comprising means for repeatedly reproducing data of each field/frame in 1/k-fold-speed reproduction k times, repeatedly scanning a track k times to reproduce data of a reproduction field/frame, from a start portion to a last portion thereof, k times when the data of the reproduction field/frame is recorded within the track, and repeatedly performing a given operation k times when data of a reproduction field/frame is separately recorded on two tracks, the given operation including causing said optical head to jump first to a track containing second half data of the reproduction field/frame to reproduce the second half data and then to move backward by one track to reproduce first half data of the reproduction field/frame, starting from a start portion thereof.

32. An optical disk apparatus comprising:

an optical disk which has a recording area constituted by a plurality of equal clock blocks obtained by dividing a track area in a radial direction, and rotates, said optical disk having a clock block on an innermost periphery on which $1-\alpha$ ($0<\alpha<1$) field/frame data are recorded per track, said optical disk having a rotational speed equal to field/frame frequency x $(1-\alpha)$ and allowing 1-field/frame data to be separately recorded on not less than two tracks, and said optical head allowing data to be recorded with an almost constant recording wavelength while an amount of data to be recorded per track is increased by a constant amount for each clock block in accordance with a track radius;

an optical head for optical recording/reproducing data on/from said optical disk, and reproduction control means for, when k-fold-speed reproduction (k is an integer not less than two) is performed, reproducing data while thinning out data for every k fields/frames and performing a pause track operation of stopping data reproduction and moving said optical head backward by one track every time $1/\alpha$ tracks are scanned; when data of a reproduction field/frame is recorded within one track, scanning the track to reproduce the data of the reproduction field/frame from start data to last data thereof; and when data of reproduction field/frame is separately recorded on two tracks, scanning the preceding track containing first half data of the reproduction field/frame and the subsequent track containing second half data of the reproduction field/frame to reproduce the second half data from the preceding track first, and then reproduce the first half data from start data upon moving said optical head backward by one track at a timing at which the data can be reproduced, starting from the start data, if an amount of data contained in the preceding track is not less than a predetermined value, and to produce only the start data if the amount of data contained in the preceding track is less than the predetermined value.

33. An apparatus according to claim 32, wherein said reproduction control means reproduces data of a last portion of a reproduction field/frame which is not reproduced in k-fold-speed reproduction by using a pause track operation interval.

34. An apparatus according to claim 32, wherein said reproduction control means shuffles recording data to record the data in a random order.

35. An apparatus according to claim 32, wherein said reproduction control means repeatedly reproduces data of each field/frame k times and performs a pause track operation for every $1/\alpha$ tracks in 1/k-fold-speed reproduction, scans a track k times to repeatedly reproduce data of a reproduction field/frame from start data to last data thereof k times when the data of the reproduction field/frame is recorded within the track, and when data of a reproduction field/frame is separately recorded on two tracks, said reproduction control means scans the preceding track containing start data and the subsequent track in such a manner that if an amount of data contained in the subsequent track is not less than a predetermined value, said reproduction control means performs a given operation k times, the given operation including scanning the preceding track first to reproduce the data of the reproduction field/frame, and then moving said optical head backward by one track at a start data reproducible timing to reproduce the data, starting from the start data, and if the amount of data contained in the preceding track is less than the predetermined value, said reproduction control means scans only the preceding track k times to reproduce the data.

36. An apparatus according to claim 35, wherein said reproduction control means reproduces data of a last portion of a reproduction field/frame which is not reproduced in 1/k-fold-speed reproduction by using a pause track operation interval.

37. An apparatus according to claim 32, wherein said reproduction control means scans a track k times to repeatedly reproduce 1-field/frame data k times, and performs a pause track operation for every $1/\alpha$ tracks in 1/k-fold-speed reproduction; scans a track k times to repeatedly reproduce data of a reproduction field/frame from start data to last data thereof k times when the data of the reproduction field/frame is recorded within the track; and alternately scans a preceding track containing start data and a subsequent data a total of k times to repeatedly reproduce data of a reproduction field/frame k times when the data of the reproduction field/frame is separately recorded on two tracks.

38. An apparatus according to claim 37, wherein said reproduction control means reproduces data of a last portion of a reproduction field/frame which is not reproduced in 1/k-fold-speed reproduction by using a pause track operation interval.

39. An optical disk apparatus comprising:

an optical disk which has a recording area constituted by m equal clock blocks obtained by dividing a track area in a radial direction, and rotates, said optical disk having a 0th recording area on an innermost periphery on which data of ISB (ISB is an integer not less than one) blocks are recorded per track, and allowing data to be recorded with an almost constant recording wavelength by increasing an amount of recording data by W (W is an integer not less than one) blocks per track for each recording area and recording data of (ISB+n·W) blocks per track on an nth (n=0, 1 2, . . . , m−1) recording area; and calculation means for, when an amount of data of one field/frame is FSB (FSB is an integer not less than one) blocks and the number of tracks per recording area is CTR (CTR is an integer not less than one), calculating recording area number n at which an FLDth target field data is recorded, according to $$n = Int\left(\frac{1}{2}\left\{\left(1 - \frac{2 \cdot ISB}{W}\right) + \sqrt{\left(\frac{2 \cdot ISB}{W} - 1\right)^2 + \left(\frac{8 \cdot FSB \cdot FIELD}{CTR \cdot W}\right)}\right\}\right)$$

calculating track number TR0 of a target field data start portion in an nth recording area according to $$TR0 = \frac{FLD - \left(\frac{CTR}{FSB}\right)\left\{n \cdot ISB + n(n-1)\left(\frac{W}{2}\right)\right\}}{\left(\frac{ISB + n \cdot W}{FSB}\right)}$$

calculating track number TR1 of each target field data start portion on said entire optical disk according to $$Tr1 = Int(TR0) + n \cdot CTR$$

calculating the number (RSB) of remaining blocks of target field data within track number TR1 according to $$RSB = Int(\{1 + Int(TR0) - TR0\} \cdot (ISB + n \cdot W))$$

and calculating a jump destination track number as TR1 when a value of RSB is not less than a value of FSB, or when the value of RSB is less than the value of FSB and a value of (ISB+n·W)−RSB is less than a predetermined value, and otherwise calculating a jump destination track number as TR1+1.

40. An apparatus according to claim 39, further comprising recording control means for shuffling recording data to record the data in a random order.

41. An optical disk apparatus comprising:

an optical disk which has a recording area constituted by a plurality of equal clock blocks obtained by dividing a track area in a radial direction and rotates at a constant rotational speed in synchronism with one of a frame frequency and a filed frequency of recording data;

an optical head for optically recording data on said optical disk;

recording buffer memory in which data to be recorded on said optical disk is temporarily written at a constant bit rate;

recording control unit for reading out the data from said recording buffer memory while changing the bit rate for each clock block of said optical disk, and recording the readout recording data on said optical disk with an almost constant recording wavelength; and pause track calculator to set a track next to a track defined by R<Nt as a pause track for performing timing adjustment by moving said optical head backward by one track, providing that a track number in a clock block is Ct (Ct=0, 1, 2, . . . , n), the number of data blocks per track is Nt, the number of data blocks per frame or field is Nf, a constant determined by a capacity of said buffer memory is R, and a value of R−(Nt−Nf) is substituted into a value of the constant R as track number Ct is sequentially incremented from 0, and notifying said recording control unit of a pause track timing upon setting a track next to a track defined by R<Nt as a pause track when the value of R−(Nt−Nt) is substituted into an updated value of the constant R obtained by adding the number (Nf) of data blocks to the value of the constant R obtained when timing adjustment is performed as track number Ct is incremented with respect to all track numbers in each of subsequent clock blocks.

* * * * *